United States Patent
Liu et al.

(10) Patent No.: US 11,290,962 B2
(45) Date of Patent: Mar. 29, 2022

(54) TERMINAL APPARATUS, BASE STATION APPARATUS, AND COMMUNICATION METHOD

(71) Applicants: SHARP KABUSHIKI KAISHA, Sakai (JP); FG Innovation Company Limited, Tuen Mun (HK)

(72) Inventors: Liqing Liu, Sakai (JP); Shoichi Suzuki, Sakai (JP); Wataru Ouchi, Sakai (JP); Tomoki Yoshimura, Sakai (JP); Taewoo Lee, Sakai (JP)

(73) Assignees: SHARP KABUSHIKI KAISHA, Sakai (JP); FG Innovation Company Limited, Tuen Mun (HK)

(\*) Notice: Subject to any disclaimer, the term of this patent is extended or adjusted under 35 U.S.C. 154(b) by 9 days.

(21) Appl. No.: 16/760,368

(22) PCT Filed: Nov. 9, 2018

(86) PCT No.: PCT/JP2018/041749
§ 371 (c)(1),
(2) Date: Apr. 29, 2020

(87) PCT Pub. No.: WO2019/093499
PCT Pub. Date: May 16, 2019

(65) Prior Publication Data
US 2021/0136695 A1 May 6, 2021

(30) Foreign Application Priority Data

Nov. 10, 2017 (JP) .............................. JP2017-217077

(51) Int. Cl.
*H04W 52/14* (2009.01)
*H04W 72/04* (2009.01)
(Continued)

(52) U.S. Cl.
CPC ......... *H04W 52/146* (2013.01); *H04L 1/1819* (2013.01); *H04L 5/0055* (2013.01);
(Continued)

(58) Field of Classification Search
None
See application file for complete search history.

(56) References Cited

U.S. PATENT DOCUMENTS

2013/0286948 A1    10/2013   Gao et al.
2013/0329688 A1*   12/2013   Yang ................. H04W 74/0833
                                                                370/329
(Continued)

FOREIGN PATENT DOCUMENTS

WO       2017/048215 A1     3/2017

OTHER PUBLICATIONS

NTT Docomo, "New SID Proposal: Study on New Radio Access Technology", RP-160671, 3GPP TSG RAN Meeting #71, Göteborg, Sweden, Mar. 7-10, 2016.

(Continued)

*Primary Examiner* — Steve R Young
(74) *Attorney, Agent, or Firm* — ScienBiziP, P.C.

(57) ABSTRACT

A terminal apparatus receives one transport block by using a PDSCH, receives RRC information indicating a maximum number X of CBGs, determines transmit power of a PUCCH, and transmits UCI at least including a HARQ-ACK corresponding to the one transport block on the PUCCH. The one transport block includes $N_{CB}$ code blocks. The HARQ-ACK includes the X HARQ-ACKs bits. In a case that a number of bits of the UCI does not exceed a prescribed number of bits, the transmit power of the PUCCH including the UCI is determined at least based on a smaller value of the X and the $N_{CB}$. In a case that the number of bits of the UCI exceeds the prescribed number of bits, the
(Continued)

transmit power of the PUCCH is determined at least based on the number of bits of the UCI.

6 Claims, 21 Drawing Sheets

(51) Int. Cl.
    *H04L 1/18*     (2006.01)
    *H04L 5/00*     (2006.01)
    *H04W 76/27*     (2018.01)

(52) U.S. Cl.
    CPC ... *H04W 72/0413* (2013.01); *H04W 72/0473* (2013.01); *H04W 76/27* (2018.02)

(56) References Cited

U.S. PATENT DOCUMENTS

| | | | |
|---|---|---|---|
| 2018/0006791 A1* | 1/2018 | Marinier | H04W 52/0216 |
| 2018/0184418 A1* | 6/2018 | Takeda | H04W 52/18 |
| 2018/0249458 A1* | 8/2018 | He | H04L 1/1861 |
| 2018/0278366 A1* | 9/2018 | Papasakellariou | H04L 1/0073 |
| 2018/0310298 A1* | 10/2018 | Li | H04L 5/0053 |
| 2020/0076543 A1* | 3/2020 | Yeo | H04L 1/1896 |
| 2020/0154467 A1* | 5/2020 | Gong | H04W 24/08 |

OTHER PUBLICATIONS

LG Electronics, "Consideration on CB group based HARQ operation", R1-1707661, 3GPP TSG RAN WG1 Meeting #89, Hangzhou, P.R. China May 15-19, 2017.

* cited by examiner if $B <= Z$ $L=0$

Number of code blocks: $N_{CB} = 1$ $B' = B$ else $L=24$

Number of code blocks: $N_{CB} = ceil(B/(Z-L))$.

$B' = B + N_{CB} \cdot L$ end if

B: Length of the second sequence $b_k$
Z: Maximum code block size
$N_{CB}$: Number of code blocks
B': Length of the sequence $b_k$ including Third CRC bits
L: Length of the Third CRC bits

FIG. 7

| HARQ-ACK(0) | HARQ-ACK(1) | HARQ-ACK(2) | HARQ-ACK(3) |
|---|---|---|---|
| CBG#1 | CBG#2 | CBG#3 | CBG#4 |
| TRANSPORT BLOCK #0 | | | |

(a) Serving Cell supports 1 transport block

| HARQ-ACK(0) | HARQ-ACK(1) | HARQ-ACK(2) | HARQ-ACK(3) |
|---|---|---|---|
| CBG#1 | CBG#2 | CBG#3 | CBG#4 |
| TRANSPORT BLOCK #0 | | | |

| HARQ-ACK(4) | HARQ-ACK(5) | HARQ-ACK(6) | HARQ-ACK(7) |
|---|---|---|---|
| CBG#1 | CBG#2 | CBG#3 | CBG#4 |
| TRANSPORT BLOCK #1 | | | |

(b) Serving Cell supports 2 transport blocks

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-217077 filed on Nov. 10, 2017, the contents of which are incorporated herein by reference.

BACKGROUND ART

A radio access method and a radio network for cellular mobile communication (hereinafter, referred to as "Long Term Evolution (LTE)," or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as User Equipment (UE). LTE is a cellular communication system in which multiple areas are deployed in a cellular structure, with each of the multiple areas being covered by a base station apparatus. A single base station apparatus may manage multiple cells.

The 3GPP has studied standards for the next generation (New Radio or NR) (NPL 1) to make a proposal for International Mobile Telecommunications (IMT)-2020, a standard for next-generation mobile communication systems, standardized by the International Telecommunications Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

With respect to NR, code block group (CBG)-based transmission has been studied for transmission and/or reception of a large volume of data (NPL 2). The CBG-based transmission may mean transmitting or receiving only some of transport blocks for initial transmission. In the CBG-based transmission, a HARQ-ACK is transmitted for each CBG. Each HARQ-ACK corresponding to a CBG is generated based on the result of decoding of the CBG.

CITATION LIST

Non Patent Literature

NPL 1: "New SID proposal: Study on New Radio Access Technology," RP-160671, NTT docomo, 3GPP TSG RAN Meeting #71, Goteborg, Sweden, 7 to 10 Mar. 2016.

NPL 2: "Consideration on CB group-based HARQ operation," R1-1707661, Hangzhou, China, 15 to 19 May 2017.

SUMMARY OF INVENTION

Technical Problem

One aspect of the present invention provides a terminal apparatus that can efficiently perform uplink and/or downlink communication, a communication method used for the terminal apparatus, a base station apparatus that can efficiently perform uplink and/or downlink communication, and a communication method used for the base station apparatus.

Solution to Problem (1) According to some aspects of the present invention, the following measures are provided. Specifically, a first aspect of the present invention is a terminal apparatus including: a receiver configured to receive one transport block by using a Physical Downlink Shared Channel (PDSCH), and receive Radio Resource Control (RRC) information indicating a maximum number X of Code Block Groups (CBGs) for the one transport block; a controller configured to determine transmit power of a Physical Uplink Control Channel (PUCCH); and a transmitter configured to transmit Uplink Control Information (UCI) at least including a Hybrid Automatic Repeat reQuest (HARQ)-acknowledgement (ACK) corresponding to the one transport block on the PUCCH, wherein the one transport block includes $N_{CB}$ code blocks, the HARQ-ACK includes the X HARQ-ACKs bits, the controller determines, in a case that a number of bits of the UCI does not exceed a prescribed number of bits, the transmit power of the PUCCH, at least based on a smaller value of the X and the $N_{CB}$, and determines, in a case that the number of bits of the UCI exceeds the prescribed number of bits, the transmit power of the PUCCH, at least based on the number of bits of the UCI.

(2) A second aspect of the present invention is the terminal apparatus, wherein the number of bits of the UCI is given at least based on the X.

(3) A third aspect of the present invention is a base station apparatus including: a transmitter configured to transmit one transport block by using a Physical Downlink Shared Channel (PDSCH), and transmit Radio Resource Control (RRC) information indicating a maximum number X of Code Block Groups (CBGs) for the one transport block; and a receiver configured to receive a Hybrid Automatic Repeat reQuest (HARQ)-acknowledgement (ACK) corresponding to the one transport block on the Physical Uplink Control Channel (PUCCH), wherein the one transport block includes $N_{CB}$ code blocks, the HARQ-ACK includes the X HARQ-ACKs bits, in a case that a number of bits of the UCI does not exceed a prescribed number of bits, the transmit power of the PUCCH including the UCI is given at least based on a smaller value of the X and the $N_{CB}$, and in a case that the number of bits of the UCI exceeds the prescribed number of bits, the transmit power of the PUCCH is given at least based on the number of bits of the UCI.

(4) A fourth aspect of the present invention is the base station apparatus, wherein the number of bits of the UCI is given at least based on the X.

(5) A fifth aspect of the present invention is a communication method for a terminal apparatus, the communication method including the steps of: receiving one transport block by using a Physical Downlink Shared Channel (PDSCH), and receiving Radio Resource Control (RRC) information indicating a maximum number X of Code Block Groups (CBGs) for the one transport block; determining transmit power of a Physical Uplink Control Channel (PUCCH); and transmitting Uplink Control Information (UCI) at least including a Hybrid Automatic Repeat reQuest (HARQ)-acknowledgement (ACK) corresponding to the one transport block on the PUCCH, wherein the one transport block includes $N_{CB}$ code blocks, the HARQ-ACK includes the X HARQ-ACKs bits, in a case that a number of bits of the UCI does not exceed a prescribed number of bits, the transmit power of the PUCCH including the UCI is given at least based on a smaller value of the X and the $N_{CB}$, and in a case that the number of bits of the UCI exceeds the prescribed number of bits, the transmit power of the PUCCH is given at least based on the number of bits of the UCI.

(6) A sixth aspect of the present invention is a communication method for a base station apparatus, the communication method including the steps of: transmitting one transport block by using a Physical Downlink Shared Channel (PDSCH), and transmitting Radio Resource Control (RRC) information indicating a maximum number X of Code Block Groups (CBGs) for the one transport block; and receiving the Physical Uplink Control Channel (PUCCH), wherein the one transport block includes $N_{CB}$ code blocks, the HARQ-ACK includes the X HARQ-ACKs bits, in a case that a number of bits of the UCI does not exceed a prescribed number of bits, the transmit power of the PUCCH including the UCI is given at least based on a smaller value of the X and the $N_{CB}$, and in a case that the number of bits of the UCI exceeds the prescribed number of bits, the transmit power of the PUCCH is given at least based on the number of bits of the UCI.

Advantageous Effects of Invention

According to an aspect of the present invention, the terminal apparatus can efficiently perform uplink and/or downlink communication. Furthermore, the base station apparatus can efficiently perform uplink and/or downlink communication.

BRIEF DESCRIPTION OF DRAWINGS

FIG. 7 is a diagram illustrating an example of a first procedure for calculating the number of code blocks in a code block segmentation unit 4011 according to an aspect of the present embodiment.

FIG. 10 is a diagram illustrating an example of mapping of HARQ-ACKs (j), CBGs, and transport blocks according to the present embodiment.

FIG. 12 is a diagram illustrating another example of the mapping of HARQ-ACKs (j), CBGs, and transport blocks according to the present embodiment.

DESCRIPTION OF EMBODIMENTS

Embodiments of the present invention will be described below. The expression "given" included in the following description may be construed as "determined" or "configured."

Figure 1:
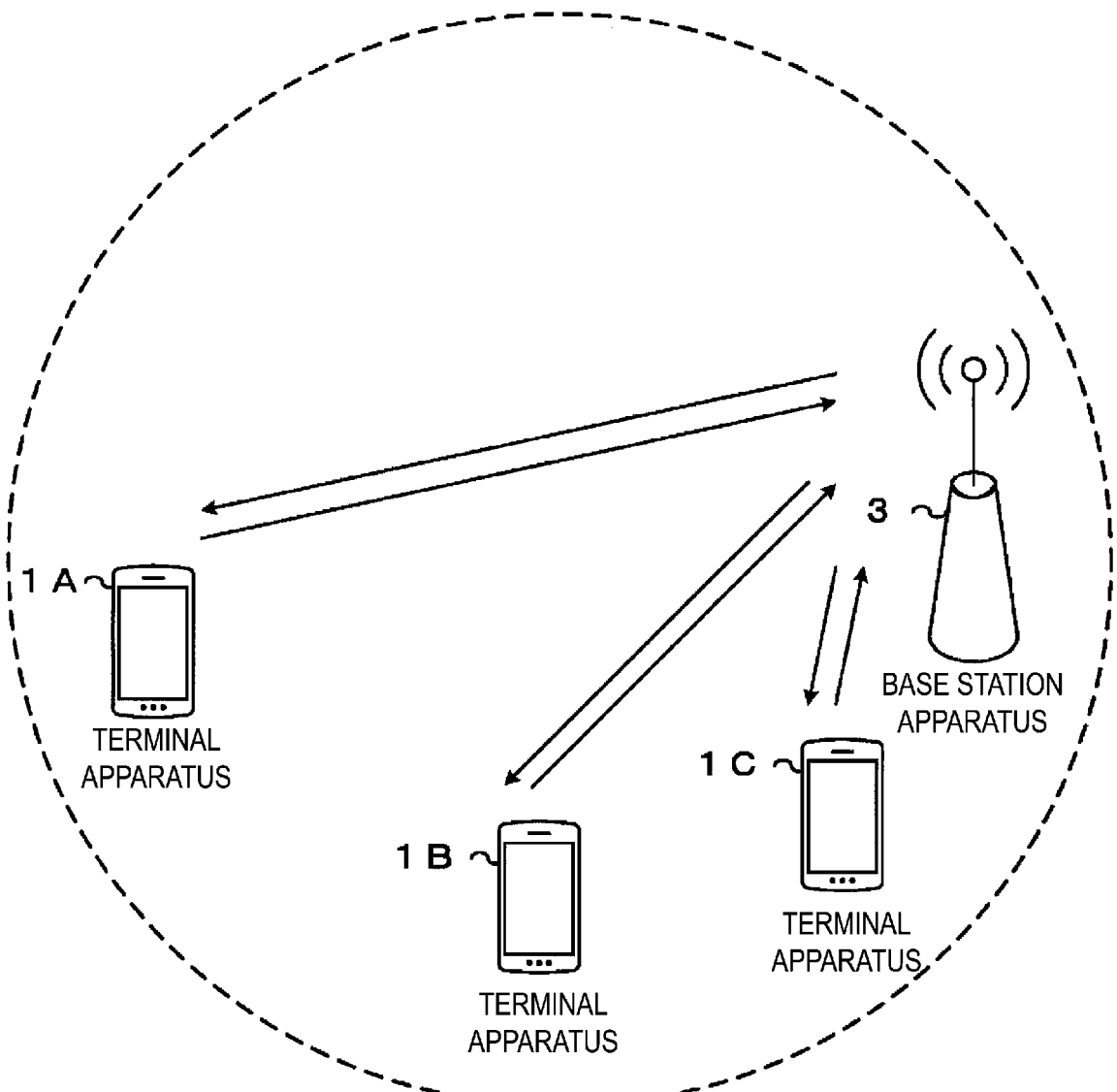
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

Hereinafter, carrier aggregation will be described.

According to the present embodiment, one or multiple serving cells are configured for the terminal apparatus 1. A technology in which the terminal apparatus 1 communicates via the multiple serving cells is referred to as cell aggregation or carrier aggregation. The multiple serving cells may include one primary cell and one or multiple secondary cells. The primary cell is a serving cell in which an initial connection establishment procedure has been performed, a serving cell in which a connection re-establishment procedure has been initiated, or a cell indicated as a primary cell in a handover procedure. Here, the primary cell may be used for transmission on a PUCCH. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

Here, the base station apparatus 3 may configure one or multiple serving cells through higher layer signaling (e.g., RRC signaling, and RRC information). For example, one or multiple secondary cells may be configured to form a set of multiple serving cells with a primary cell. In the present embodiment, the carrier aggregation is applied to the terminal apparatus 1, unless specified otherwise. The terminal apparatus 1 performs channel transmission and/or reception in the multiple serving cells.

An example of a configuration of a radio frame according to the present embodiment will be described below.

Figure 2:
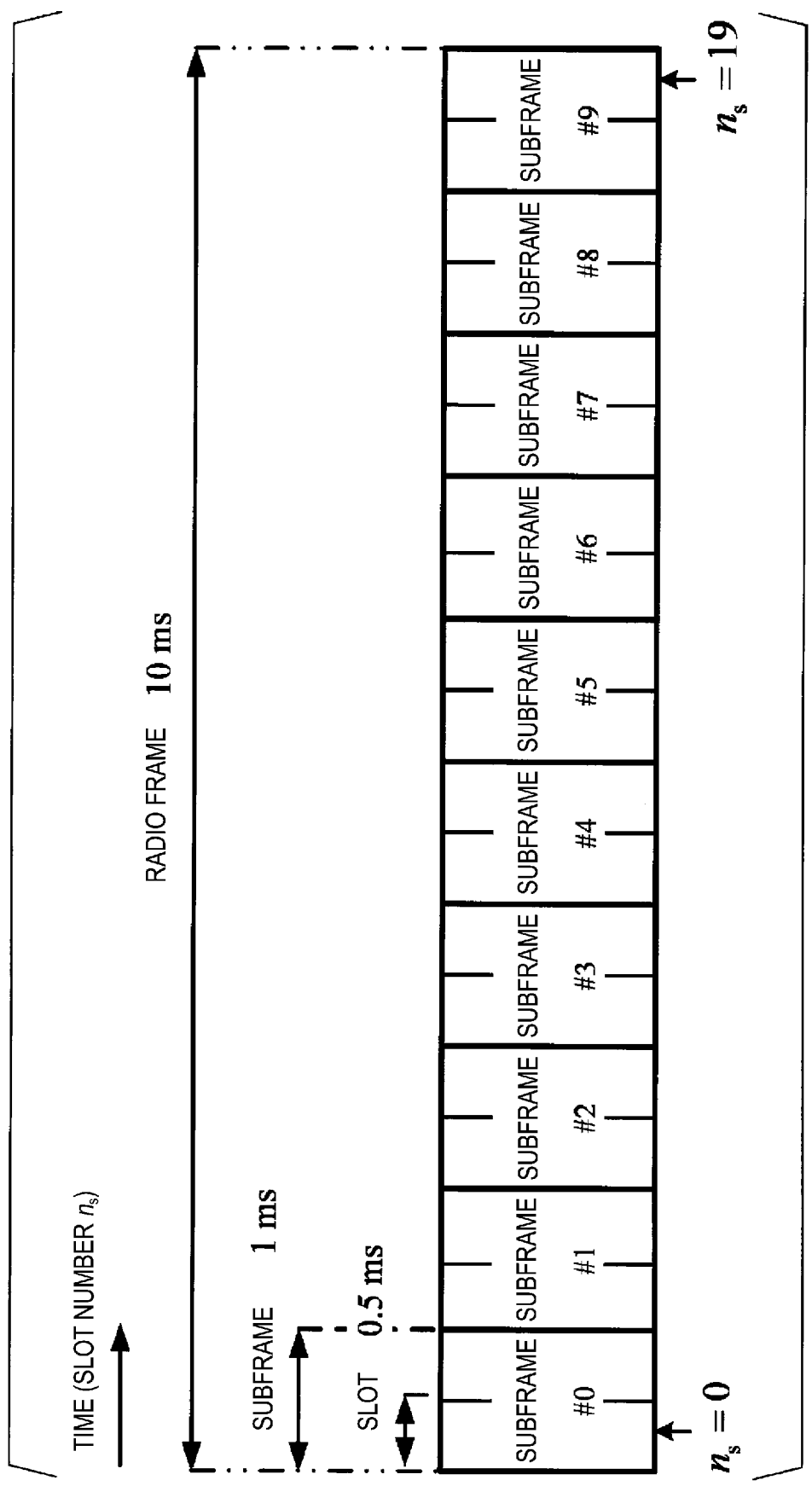
FIG. 2 is an example illustrating a configuration of a radio frame, subframes, and slots according to an aspect of the present embodiment.

FIG. 2 is an example illustrating a configuration of a radio frame, subframes, and slots according to an aspect of the present embodiment. In the example illustrated in FIG. 2, a length of each slot is 0.5 ms, a length of each subframe is 1 ms, and a length of the radio frame is 10 ms. The slot may be a unit of resource allocation in the time domain. The slot may be a unit to which one transport block is mapped. A transport block may be mapped to one slot. The transport block may be a unit of data transmitted in a prescribed interval (e.g., Transmission Time Interval or TTI) defined in a higher layer (e.g., Mediam Access Control or MAC).

A length of the slot may be given according to the number of OFDM symbols. For example, the number of OFDM symbols may be 7 or 14. The length of the slot may be given based on at least a length of an OFDM symbol. The length of the OFDM symbol may be given at least based on a second subcarrier spacing. The length of the OFDM symbol may be given at least based on the number of points in Fast Fourier Transform (FFT) used to generate the OFDM symbol. The length of the OFDM symbol may include a length of a Cyclic Prefix (CP) added to the OFDM symbol. Here, the OFDM symbol may be called a symbol. In addition, in a case that a communication scheme other than OFDM is used in communication between the terminal apparatus 1 and the base station apparatus 3 (e.g., in a case that SC-FDMA or DFT-s-OFDM is used, etc.), a SC-FDMA symbol and/or a DFT-s-OFDM symbol to be generated is also referred to as an OFDM symbol. In other words, the OFDM symbol may include the DFT-s-OFDM symbol and/or the SC-FDMA symbol. The length of the slot may be, for example, 0.25 ms, 0.5 ms, 1 ms, 2 ms, or 3 ms. OFDM may include SC-FDMA or DFT-s-OFDM.

The OFDM includes a multi-carrier communication scheme in which waveform shaping (Pulse Shape), PAPR reduction, out-of-band radiation reduction, or filtering, and/or phase processing (e.g., phase rotation, etc.) are applied. The multi-carrier communication scheme may be a communication scheme for generating/transmitting a signal in which multiple subcarriers are multiplexed.

A length of a subframe may be 1 ms. The length of the subframe may be given based on a first subcarrier spacing. For example, in a case that the first subcarrier spacing is 15 kHz, the length of the subframe may be 1 ms. Each subframe may be configured to include one or multiple slots. For example, the subframe may be configured to include two slots.

The radio frame may be configured to include multiple subframes. The number of subframes for the radio frame may be, for example, 10. The radio frame may be configured to include multiple slots. The number of slots for the radio frame may be, for example, 10.

A physical channel and a physical signal according to various aspects of the present embodiment will be described below. The terminal apparatus may transmit the physical channel and/or the physical signal. The base station apparatus may transmit the physical channel and/or the physical signal.

Downlink physical channels and downlink physical signals are collectively referred to as downlink signals. Uplink physical channels and uplink physical signals are collectively referred to as uplink signals. Downlink physical channels and uplink physical channels are collectively referred to as physical channels. Downlink physical signals and uplink physical signals are collectively referred to as physical signals.

In uplink radio communication from the terminal apparatus 1 to the base station apparatus 3, at least the following uplink physical channels may be used. The uplink physical channels may be used by a physical layer for transmission of information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes: Channel State Information (CSI) of a downlink channel; a Scheduling Request (SR) to be used to request a PUSCH (Uplink-Shared Channel or UL-SCH) resource for initial transmission; and a Hybrid Automatic Repeat request ACKnowledgement (HARQ-ACK) for downlink data (a Transport Block or TB, a Medium Access Control Protocol Data Unit or MAC PDU, a Downlink-Shared Channel or DL-SCH, a Physical Downlink Shared Channel or PDSCH, a code block or CB, or a code block Group or CBG). The HARQ-ACK indicates an acknowledgement (ACK) or a negative-acknowledgement (NACK).

The HARQ-ACK is also referred to as an ACK/NACK, HARQ feedback, HARQ-ACK feedback, a HARQ response, a HARQ-ACK response, HARQ information, HARQ-ACK information, HARQ control information, and HARQ-ACK control information. In a case that downlink data is successfully decoded, an ACK for the downlink data is generated. In a case that the downlink data is not successfully decoded, a NACK for the downlink data is generated. Discontinuous transmission (DTX) may mean that the downlink data has not been detected. The discontinuous transmission (DTX) may mean that data for which a HARQ-ACK response is to be transmitted has not been detected. The HARQ-ACK may include a HARQ-ACK for a Code Block Group (CBG). The HARQ-ACK for some or all of the CBGs included in a transport block may be transmitted on a PUCCH or PUSCH. The CBG will be described below.

The Channel State Information (CSI) may include a Channel Quality Indicator (CQI) and a Rank Indicator (RI). The channel quality indicator may include a Precoder Matrix Indicator (PMI). The channel state information may include a precoder matrix indicator. The CQI is an indicator associated with channel quality (propagation strength), and the PMI is an indicator indicating a precoder. The RI is an indicator indicating a transmission rank (or the number of transmission layers). According to the present embodiment, the terminal apparatus 1 may transmit the PUCCH in the primary cell.

The scheduling request includes a positive scheduling request or a negative scheduling request. The positive scheduling request indicates that a UL-SCH resource for initial transmission is requested. The negative scheduling request indicates that the UL-SCH resource for the initial transmission is not requested. The terminal apparatus 1 may determine whether or not to transmit the positive scheduling request. The scheduling request being the negative scheduling request may mean that the terminal apparatus 1 has determined not to transmit the positive scheduling request. Note that information of the scheduling request is information indicating whether the scheduling request for a certain scheduling request configuration is the positive scheduling request or the negative scheduling request.

The PUSCH is used to transmit uplink data (TB, MAC PDU, UL-SCH, PUSCH, CB, and CBG). The PUSCH may be used to transmit the HARQ-ACK and/or channel state information along with the uplink data. The PUSCH may be used to transmit only the channel state information or only the HARQ-ACK and the channel state information. The PUSCH is used to transmit a random access message 3.

The PRACH is used to transmit a random access preamble (random access message 1). The PRACH may be used to indicate at least some of an initial connection establishment procedure, a handover procedure, a connection re-establishment procedure, synchronization (timing adjustment) for transmission of uplink data, and a request for a PUSCH (UL-SCH) resource.

In uplink radio communication from the terminal apparatus 1 to the base station apparatus 3, the following uplink physical signals may be used. The uplink physical signals may not be used to transmit information output from a higher layer, but is used by a physical layer.

Uplink Reference Signal (UL RS)

According to the present embodiment, at least the following two types of uplink reference signal may be at least used.

Demodulation Reference Signal (DMRS)
Sounding Reference Signal (SRS)

The DMRS is associated with transmission of a PUSCH and/or a PUCCH. The DMRS may be multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. The DMRS may correspond to the PUSCH. Transmission of both of the PUCCH and the DMRS is hereinafter referred to simply as transmission of the PUCCH. The DMRS may correspond to the PUCCH.

The SRS may not be associated with transmission of the PUSCH and/or the PUCCH. An SRS may be associated with transmission of the PUSCH and/or the PUCCH. The base station apparatus 3 may use the SRS for measuring a channel state. The SRS may be transmitted at the end of the subframe in an uplink slot or in a prescribed number of OFDM symbols from the end.

The following downlink physical channels may be used for downlink radio communication from the base station apparatus 3 to the terminal apparatuses 1. The downlink physical channels may be used by the physical layer to transmit information output from the higher layer.

Physical Broadcast Channel (PBCH)
Physical Downlink Shared Channel (PDSCH)
Physical Downlink Control Channel (PDCCH)

The PBCH is used for broadcasting a Master Information Block (MIB, BCH, or Broadcast Channel) that is commonly used by the terminal apparatuses 1. The PBCH may be transmitted at a prescribed transmission interval. For example, the PBCH may be transmitted at an interval of 80 ms. At least some of information included in the PBCH may be updated every 80 ms. The PBCH may include 288 subcarriers. The PBCH may include 2, 3, or 4 OFDM symbols. The MIB may include information related to an identifier (index) of a synchronization signal. The MIB may include information for indicating at least some of the number of the slot in which PBCH is transmitted, the number of the subframe in which PBCH is transmitted, and the number of the radio frame in which PBCH is transmitted. First configuration information may be included in the MIB. The first configuration information may be configuration information used at least in some or all of a random access message 2, a random access message 3, and a random access message 4.

The PDSCH is used to transmit downlink data (TB, MAC PDU, DL-SCH, PDSCH, CB, and CBG). The PDSCH is at least used to transmit the random access message 2 (random access response). The PDSCH is at least used to transmit system information including parameters used for initial access.

The PDCCH is used to transmit Downlink Control Information (DCI). The downlink control information is also called a DCI format. The downlink control information may at least include any of a downlink grant or an uplink grant. The downlink grant is also referred to as a downlink assignment or a downlink allocation. The uplink grant and the downlink grant are also collectively referred to as a grant.

A single downlink grant is at least used for scheduling of a single PDSCH within a single serving cell. The downlink grant may be used for at least scheduling of the PDSCH within the same slot as the slot in which the downlink grant has been transmitted.

A single uplink grant may be at least used for scheduling of a single PUSCH within a single serving cell.

For example, the downlink control information may include a New Data Indicator (NDI). The new data indicator may be used to at least indicate whether the transport block corresponding to the new data indicator is of initial transmission. The new data indicator may be information indicating whether a most recently transmitted transport block corresponding to a prescribed HARQ process number is the same as the transport block corresponding to the HARQ process number and included in the PDSCH and/or the PUSCH scheduled by the downlink control information including the new data indicator. The HARQ process number is a number used to identify the HARQ process. The HARQ process number may be included in the downlink control information. The HARQ process is a process for managing a HARQ. The new data indicator may indicate whether the transmission of the transport block corresponding to the prescribed HARQ process number and included in the PDSCH and/or the PUSCH scheduled by the downlink control information including the new data indicator is retransmission of the transport block corresponding to the prescribed HARQ process number and included in a most recently transmitted PDSCH and/or PUSCH. Whether the transmission of the transport block included in the PDSCH and/or the PUSCH scheduled by the downlink control information is retransmission of the most recently transmitted transport block may be given based on whether the new data indicator has been switched (or toggled) from a new data indicator corresponding to the most recently transmitted transport block.

That is, the new data indicator indicates initial transmission or retransmission. A HARQ entity of the terminal apparatuses 1 indicates to a certain HARQ process to trigger the initial transmission in a case that the new data indicator provided by the HARQ information has been toggled compared to the value of the new data indicator for a preceding transmission of the certain HARQ process. The HARQ entity indicates to the certain HARQ process to trigger retransmission in a case that the new data indicator provided by the HARQ information has not been toggled compared to the value of the new data indicator for the preceding transmission of the certain HARQ process. Note that whether the new data indicator has been toggled may be determined in the HARQ process.

In downlink radio communication, the following downlink physical signals may be used. The downlink physical signals may not be used for transmission of information output from the higher layer, but may be used by the physical layer.

Synchronization signal (SS)
Downlink Reference Signal (DL RS)

The synchronization signal is used for the terminal apparatus 1 to establish synchronization in a frequency domain and a time domain in the downlink. The synchronization signal may at least include a Primary Synchronization Signal (PSS) and a Second Synchronization Signal (SSS).

The synchronization signal including an ID of a target cell (cell ID) may be transmitted. The synchronization signal including a sequence generated at least based on the cell ID may be transmitted. The synchronization signal including the cell ID may mean that the sequence of the synchronization signal is given based on the cell ID. The synchronization signal may be transmitted with application of a beam (or precoder).

The beam exhibits a phenomenon in which antenna gain varies depending on directions. The beam may be given at least based on the directivity of an antenna. In addition, the beam may also be given at least based on a phase transformation of a carrier signal. In addition, the beam may also be given by the application of the precoder.

The downlink reference signal is at least used for the terminal apparatus 1 to perform channel compensation of the downlink physical channel. The downlink reference signal is at least used for the terminal apparatus 1 to calculate channel state information of the downlink.

According to the present embodiment, the following two types of downlink reference signals are used.

DeModulation Reference Signal (DMRS)
Shared Reference Signal (Shared RS)

The DMRS corresponds to transmission of the PDCCH and/or the PDSCH. The DMRS is multiplexed with the PDCCH or the PDSCH. The terminal apparatuses 1 may use the DMRS corresponding to the PDCCH or the PDSCH in order to perform channel compensation of the PDCCH or the PDSCH. Hereinafter, transmission of both of the PDCCH and the DMRS corresponding to the PDCCH is simply referred to as transmission of the PDCCH. Hereinafter, transmission of both of the PDSCH and the DMRS corresponding to the PDSCH is simply referred to as transmission of the PDSCH.

The Shared RS may correspond to transmission of at least the PDCCH. The Shared RS may be multiplexed with the PDCCH. The terminal apparatuses 1 may use the Shared RS in order to perform channel compensation of the PDCCH. Hereinafter, transmission of both of the PDCCH and the Shared RS is also simply referred to as transmission of the PDCCH.

The DMRS may be an RS individually configured for the terminal apparatus 1. The sequence of the DMRS may be given at least based on parameters individually configured for the terminal apparatus 1. The DMRS may be individually transmitted for the PDCCH and/or the PDSCH. On the other hand, the Shared RS may be an RS commonly configured for multiple terminal apparatuses 1. The sequence of the Shared RS may be given regardless of the parameters individually configured for the terminal apparatus 1. For example, the sequence of the Shared RS may be given based on at least some of the number of the slot, the number of a mini slot, and a cell identity (ID). The Shared RS may be an RS to be transmitted regardless of whether the PDCCH and/or the PDSCH has been transmitted.

The BCH, UL-SCH, and DL-SCH described above are transport channels. A channel used in a Medium Access Control (MAC) layer is referred to as a transport channel. A unit of the transport channel used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 may exchange (transmit and/or receive) signals in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are at least used to transmit the RRC signaling and the MAC CE. Here, the RRC signaling transmitted from the base station apparatus 3 on the PDSCH may be RRC signaling common to multiple terminal apparatuses 1 in a cell. The RRC signaling common to the multiple terminal apparatuses 1 in the cell is also referred to as common RRC signaling. The RRC signaling transmitted from the base station apparatus 3 on the PDSCH may be RRC signaling dedicated to a certain terminal apparatus 1 (which is also referred to as dedicated signaling or UE specific signaling). The RRC signaling dedicated to the terminal apparatus 1 is also referred to as dedicated RRC signaling. A cell specific parameter may be transmitted using the RRC signaling common to the multiple terminal apparatuses 1 in the cell or the RRC signaling dedicated to the certain terminal apparatus 1. A UE specific parameter may be transmitted using the RRC signaling dedicated to the certain terminal apparatus 1.

A Broadcast Control CHannel (BCCH), a Common Control CHannel (CCCH), and a Dedicated Control CHannel (DCCH) are logical channels. For example, the BCCH is a channel of the higher layer used to transmit the MIB. Additionally, the BCCH is the channel of the higher layer used to transmit system information. Note that the system information may include System Information Block type 1 (SIB1). Furthermore, the system information may also include a System Information (SI) message including System Information Block type 2 (SIB2). Furthermore, the Common Control Channel (CCCH) is a channel of the higher layer used to transmit information common to the multiple terminal apparatuses 1. Here, the CCCH is used for a terminal apparatus 1 that is not in a RRC connected state, for example. Furthermore, the Dedicated Control Channel (DCCH) is a channel of the higher layer used to transmit individual control information (dedicated control information) to the terminal apparatus 1. Here, the DCCH is used for a terminal apparatus 1 that is in the RRC connected state, for example.

The BCCH in the logical channel may be mapped to the BCH, the DL-SCH, or the UL-SCH in the transport channel.

The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

A transmission process 3000 by the base station apparatus 3 and/or the terminal apparatuses 1 will be described below.

Figure 3:
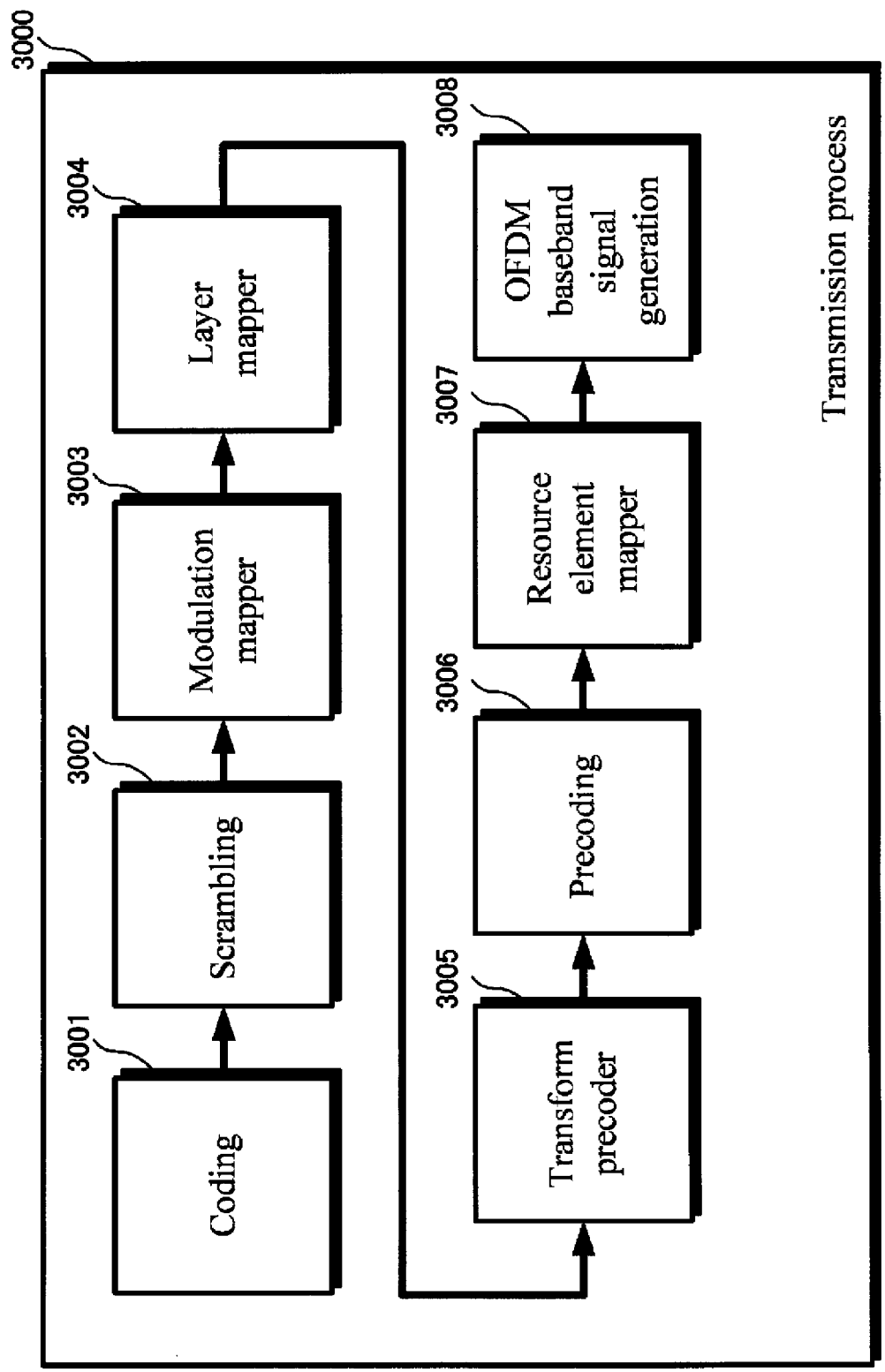
FIG. 3 is a diagram illustrating an example of a configuration of a transmission process 3000 of a physical layer.

FIG. 3 is a diagram illustrating an example of a configuration of the transmission process 3000 of the physical layer. The Transmission process 3000 is configured to include at least some or all of a coding processing unit (coding) 3001, a scrambling processing unit (Scrambling) 3002, and a modulation mapping processing unit (Modulation mapper) 3003, a layer mapping processing unit (Layer mapper) 3004, a transmission precode processing unit (Transform precoder) 3005, a precode processing unit (Precoder) 3006, a resource element mapping processing unit (Resource element mapper) 3007, and a baseband signal generation processing unit (OFDM baseband signal generation) 3008.

The coding processing unit 3001 may have a function of converting a transport block (or a data block, transport data, transmission data, a transmission code, a transmission block, a payload, information, an information block, and the like.) sent (or notified, delivered, transmitted, transferred, and the like.) from a higher layer into coded bits through error correction coding processing. The error correction coding at least includes some or all of a Turbo code, a Low Density Parity Check (LDPC) code, a convolutional code (such as a Convolutional code or Tail biting convolutional code), and a repetition code. The coding processing unit 3001 has a function of transmitting the coded bits to the scrambling processing unit 3002. Details of the operation of the coding processing unit 3001 will be described below.

The scrambling processing unit 3002 may have a function of converting the coded bits into scrambled bits (scramble bit) through a scrambling process. The scrambled bits may be obtained by taking the sum of the coded bits and the scrambling sequence having 2 as a divisor. In other words, the scrambling may have the sum of the coded bits and the scrambling sequence having 2 as a divisor. The scrambling sequence may be a sequence generated by a pseudo-random function based on a unique sequence (e.g., C-RNTI).

The modulation mapping processing unit 3003 may have a function of converting the scrambled bits into a modulated sequence (modulation symbol) through modulation mapping processing. The modulation symbol may be obtained by performing a modulation process of the scrambled bits, the modulation process including Quaderature Phase Shift Keying (QPSK), 16 Quaderature Amplitude Modulation (QAM), 64 QAM, 256 QAM, or the like.

The layer mapping processing unit 3004 may have a function of mapping the modulation symbol to each layer. The layer may be an indicator of multiplicity of physical layer signals in a spatial domain. For example, in a case that the number of layers is 1, no spatial multiplexing is performed. In addition, in a case that the number of layers is 2, two types of modulation symbols are spatially multiplexed.

For example, the transmission precode processing unit 3005 may have a function of generating a transmission symbol by performing transmission precode processing on the modulation symbol mapped to each layer. The modulation symbol and/or the transmission symbol may be a complex-valued symbol. The transmission precode processing includes processing such as DFT spread (DFT spreading). The transmission precode processing unit 3005 may be given whether to perform the transmission precode processing based on information included in the higher layer signaling. The transmission precode processing unit 3005 may be given whether to perform the transmission precode processing at least based on information included in the first system information. The transmission precode processing unit 3005 may be given whether to perform the transmission precode processing of the random access message 3 at least based on the information included in the first system information. The transmission precode processing unit 3005 may be given whether to perform the transmission precode processing based on information included in the control channel. Furthermore, the transmission precode processing unit 3005 may be given whether to perform the transmission precode processing based on preconfigured information.

For example, the precode processing unit 3006 may have a function of generating a transmission symbol for each transmit antenna port by multiplying the transmission symbol by a precoder. The transmit antenna port is a logical antenna port. One transmit antenna port may include multiple physical antennas. The logical antenna port may be identified by the precoder.

The antenna port is defined as an antenna port that enables a channel conveyed by a certain symbol in a certain antenna port to be inferred from a channel conveyed by another symbol in the same antenna port. That is, for example, in a case that a first physical channel and a first reference signal are conveyed by symbols in the same antenna port, a channel compensation of the first physical channel may be performed by using the first reference signal. Here, the same antenna port may mean the same antenna port number (the number for identifying an antenna port). Here, the symbols may be, for example, at least a part of OFDM symbols. Furthermore, the symbols may be resource elements.

For example, the resource element mapping processing unit 3007 may have a function of mapping the transmission symbol mapped to the transmit antenna port to a resource element. Details of the method for mapping to the resource element in the resource element mapping processing unit 3007 will be described below.

The baseband signal generation processing unit 3008 may have a function of converting the transmission symbol mapped to the resource element into a baseband signal. The processing for converting the transmission symbol into the baseband signal may include, for example, Inverse Fast Fourier Transform (IFFT) processing, Windowing processing, Filter processing, and the like.

Hereinafter, an operation of the coding processing unit 3001 will be described in detail.

Figure 4:
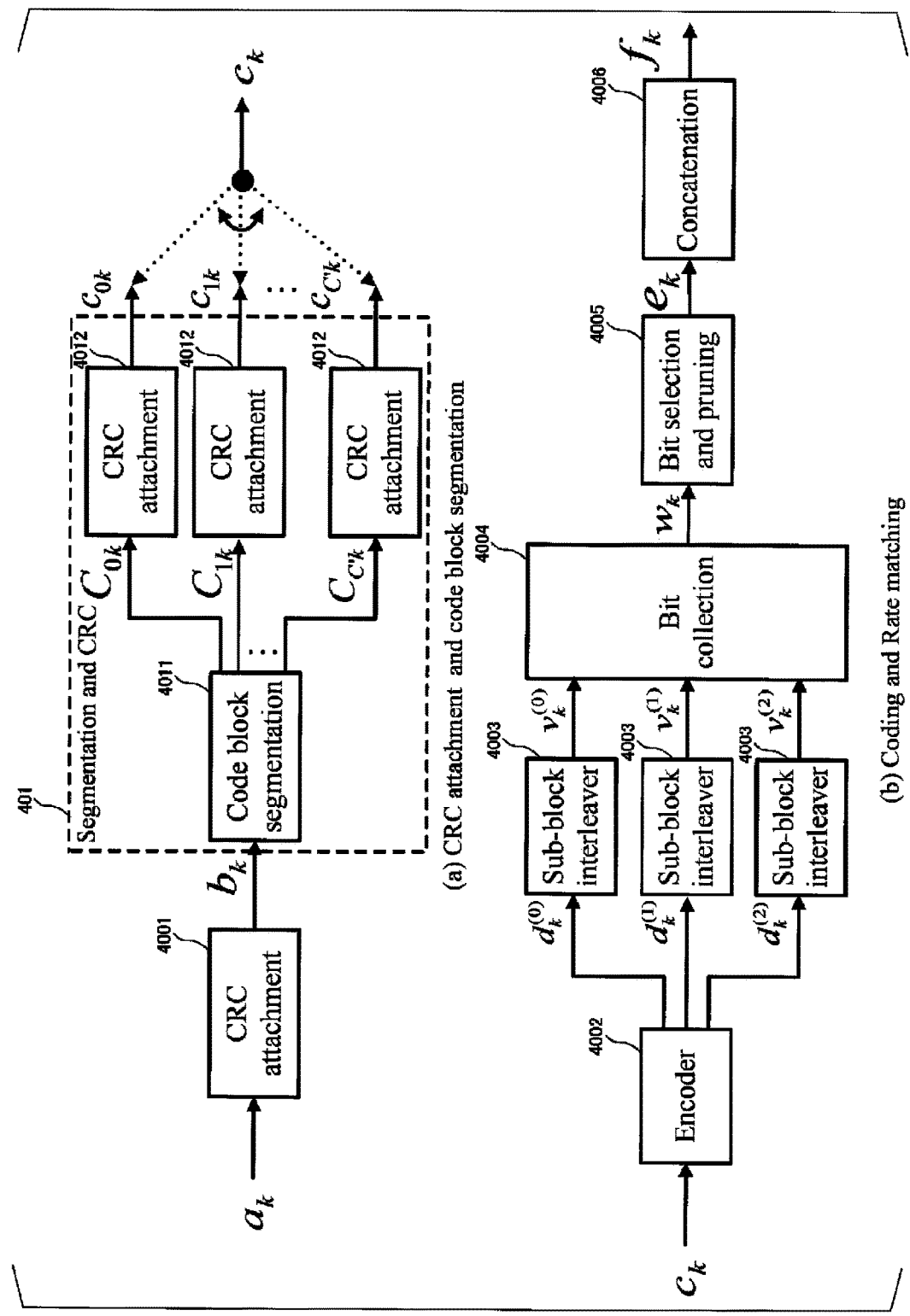
FIG. 4 is a diagram illustrating a configuration example of a coding processing unit 3001 according to the present embodiment.

FIG. 4 is a diagram illustrating a configuration example of the coding processing unit 3001 according to the present embodiment. The coding processing unit 3001 is configured to include at least one of a CRC addition unit (CRC addition) 4001, a segmentation and CRC addition unit (Segmentation and CRC) 401, an encoder unit (Encoder) 4002, sub-block interleaver units (Sub-block interleaver) 4003, a bit collection unit (Bit collection) 4004, a bit selection and pruning unit (Bit selection and pruning) 4005, and a concatenation unit (Concatenation) 4006. Here, the segmentation and CRC addition unit 401 is configured to include at least one of a code block segmentation unit 4011 and one or multiple CRC addition units 4012.

A transport block $a_k$ is input to the CRC addition unit 4001. The CRC addition unit 4001 may generate a first CRC sequence as a redundancy bit for error detection based on the input transport block. The generated first CRC sequence is added to the transport block. A first sequence $b_k^0$ including the transport block to which the first CRC sequence has been added is output from the CRC addition unit 4001.

The first CRC sequence may be a CRC sequence corresponding to the transport block. The first CRC sequence may be used to determine whether the transport block has been successfully decoded. The first CRC sequence may be used for error detection of the transport block. The first sequence $b_k^0$ may be a transport block to which the first CRC sequence has been added.

The first sequence $b_k^0$ may be segmented into one or multiple first sequence groups. The first sequence group is also referred to as a Code Block Group (CBG).

Figure 5:
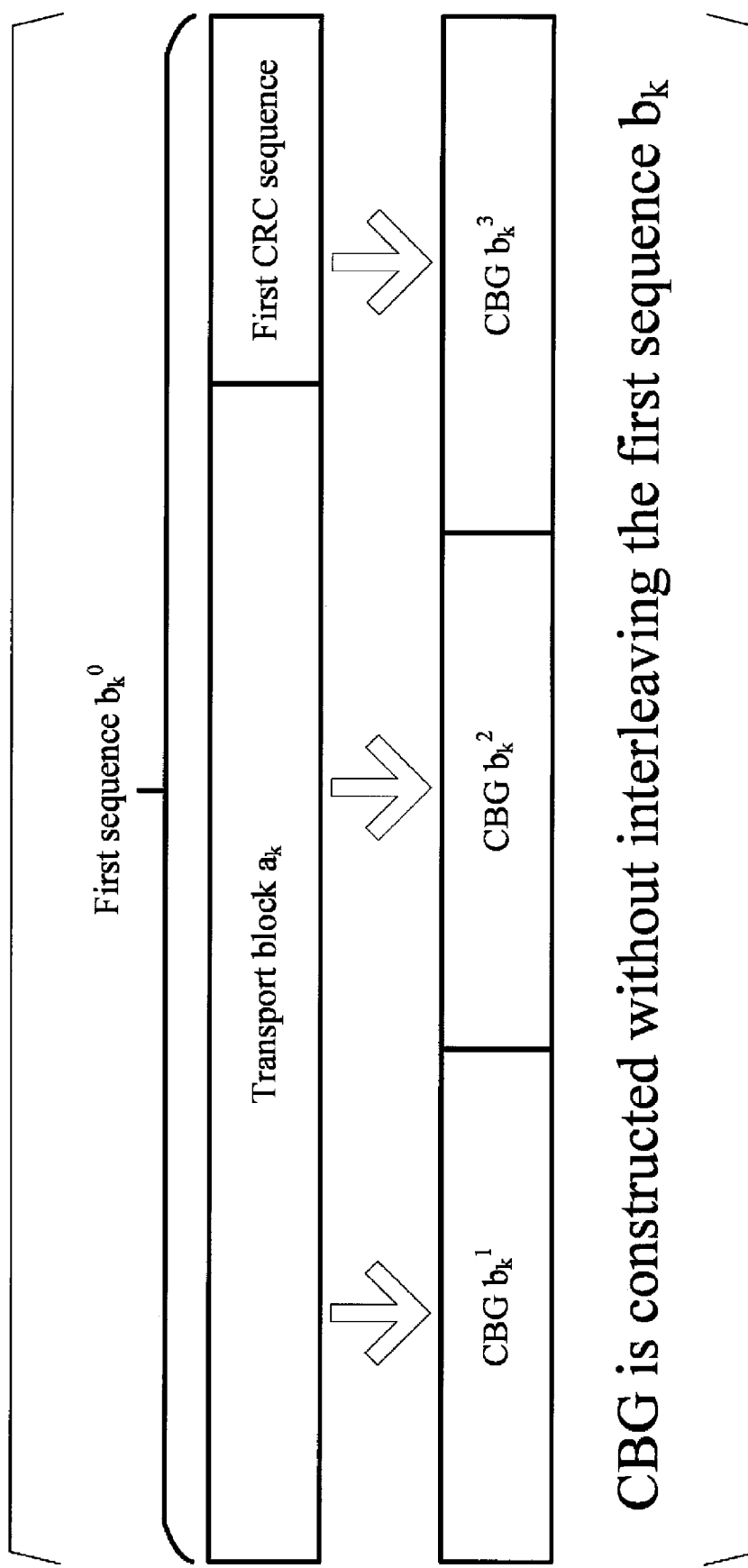
FIG. 5 is a diagram illustrating an example of an operation in which a first sequence $b_k^0$ is segmented into multiple first sequence groups $b_k^n$ (n=1 to 3 in FIG. 5) according to an aspect of the present embodiment.

FIG. 5 is a diagram illustrating an example of an operation in which the first sequence $b_k^0$ is segmented into multiple first sequence groups $b_k^n$ (n=1 to 3 in FIG. 5) according to an aspect of the present embodiment. The first sequence groups $b_k^n$ each may have an equal length or a different length. The first CRC sequence may be mapped only to one of the first sequence groups (first sequence group $b_k^n$ in FIG. 5).

Figure 6:
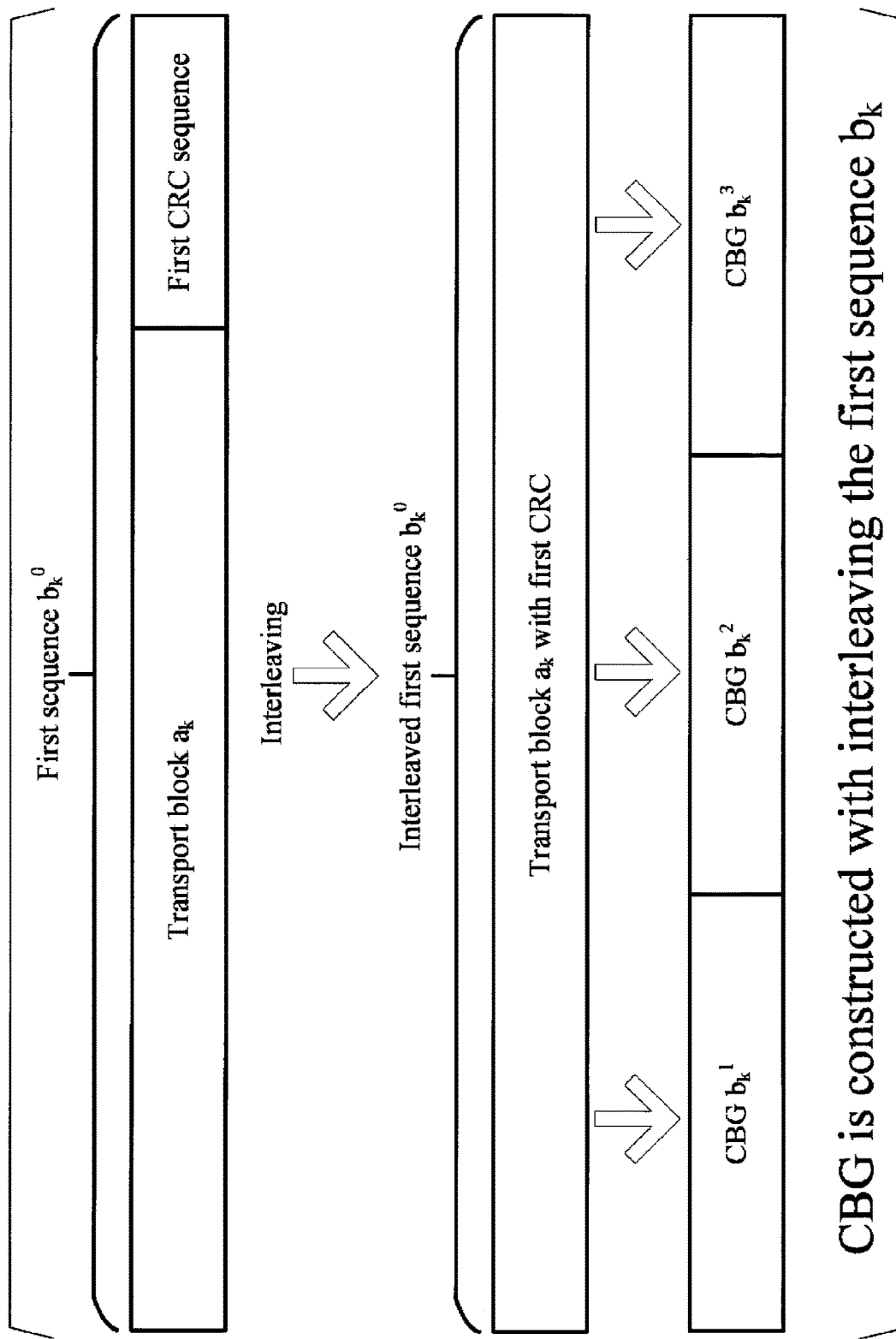
FIG. 6 is a diagram illustrating an example of an operation in which the first sequence $b_k^0$ is segmented into multiple first sequence groups $b_k^n$ (n=1 to 3 in FIG. 6) according to an aspect of the present embodiment.

FIG. 6 is a diagram illustrating an example of an operation in which a first sequence $b_k^0$ is segmented into multiple first sequence groups $b_k^n$ (n=1 to 3 in FIG. 6) according to an aspect of the present embodiment. The first sequence $b_k^0$ is rearranged (interleaved) based on a first code, which causes an interleaved first sequence $b_k^0$. The interleaved first sequence $b_k^0$ may be segmented into multiple first sequence groups $b_k^n$. In other words, the order of the first sequence $b_k^0$ and the interleaved first sequence $b_k^0$ may be different.

The first code may include a pseudo-random function (e.g., an M sequence, a gold sequence, or the like). Interleaving based on the first code may include first interleaving. The interleaving based on the first code may be bit interleaving based on the first code.

The interleaving based on the first code may be performed for each of the first sequence groups $b_k^n$.

A second CRC sequence generated at least based on the first sequence groups $b_k^n$ may be added to the first sequence groups $b_k^n$. The second CRC sequence may be different in length from the first CRC sequence. Methods for generating the second CRC sequence and the first CRC sequence may be different. The second CRC sequence may be used to determine whether an n-th first sequence group $b_k^n$ has been successfully decoded. The second CRC sequence may be used for error detection of the n-th first sequence group $b_k^n$. The second CRC sequence may be a second CRC sequence added to the n-th first sequence group $b_k^n$. In a case that the number of first sequence groups $b_k^n$ is equal to or greater than the number of code blocks $N_{CB}$, the second CRC sequence may not be added to each of the first sequence groups $b_k^n$. In a case that the number of first sequence groups $b_k^n$ is smaller than the number of code blocks $N_{CB}$, the second CRC sequence may be added to each of the first sequence groups $b_k^n$. For example, in a case that only one code block is included in the first sequence group $b_k^n$, the second CRC sequence may not be added to the first sequence group $b_k^n$. In a case that two or more code blocks are included in the first sequence group $b_k^n$, the second CRC sequence may be added to the first sequence group $b_k^n$. In a case that the number of first sequence groups $b_k^n$ corresponding to the transport block is 1, the second CRC sequence may not be added to the first sequence groups $b_k^n$.

A second sequence $b_k$ may be input to the code block segmentation unit 4011. The second sequence $b_k$ input into the code block segmentation unit 4011 may be input for each of the first sequence groups $b_k^n$. In a case that the first sequence $b_k^0$ is segmented into the first sequence groups $b_k^n$, the second sequence $b_k$ input into the code block segmentation unit 4011 may be an n-th (n is an integer of 1 or greater) first sequence group $b_k^n$. In a case that the first sequence $b_k^0$ is not segmented into the first sequence groups $b_k^n$, the second sequence $b_k$ input to the code block segmentation unit 4011 may be the first sequence $b_k^0$.

FIG. 7 is a diagram illustrating an example of a first procedure for calculating the number of code blocks in the code block segmentation unit 4011 according to an aspect of the present embodiment. B denotes the number of bits of the second sequence $b^k$. $N_{CB}$ denotes the number of code blocks of the second sequence $b_k$. B' denotes the sum of the number of bits of a third CRC sequence and the second sequence $b_k$ added to each code block. L denotes the number of bits of the third CRC sequence added to one code block.

In a case that the number of bits B of the second sequence $b_k$ is equal to or less than the maximum code block length Z, the number of bits L of the third CRC sequence is 0 and the number of code blocks $N_{CB}$ thereof is 1, and B' is equal to B. On the other hand, in a case that the number of bits B of the second sequence $b_k$ is greater than the maximum code block length Z, L is 24, and the number of code blocks $N_{CB}$ may be given by floor (B/(Z−L)). Here, floor (*) is a function that outputs a minimum integer no less than *. floor (*) is also referred to as a ceiling function.

The number of bits B of the second sequence $b_k$ may be given by the sum of the number of bits A of a first sequence $a_k$ and the number of bits P of a first CRC bit $p_k$. In other words, the number of bits B of the second sequence $b_k$ may be given by A+P.

The number of bits B of the second sequence $b_k$ may include the number of bits of the second CRC sequence.

The maximum code block length Z may be 6144 or 8192. The maximum code block length Z may be a value other than that described above. The maximum code block length Z may be given at least based on the method of error correction coding used in the coding procedure. For example, the maximum code block length Z may be 6144 in a case that the turbo code is used in the coding procedure. For example, the maximum code block length Z may be 8192 in a case that the Low Density Parity Check (LDPC) code is used in the coding procedure. The LDPC code may be a Quasi-Cyclic LDPC (QC-LDPC) code. The LDPC code may be an LDPC-Convolutional codes (LDPC-CC) coding.

The code block segmentation unit 4011 segments the second sequence $b_k$ into $N_{CB}$ code blocks $C_{rk}$ at least based on the calculated number of code blocks $N_{CB}$. Here, r denotes an index of the code block. The index r of the code block is given by an integer value included in a range from 0 to $N_{CB}-1$.

The code block segmentation processing by the code block segmentation unit 4011 may give at least a first code block with a first code block size and a second code block with a second code block size.

The second CRC addition units 4012 may have a function of adding the third CRC sequence to each code block. For example, in a case that the number of code blocks $N_{CB}$ is 1, the third CRC sequence may not be added to the code block. This means that L is 0 in a case that the number of code blocks $N_{CB}$ is 1. On the other hand, in a case that the number of code blocks $N_{CB}$ is greater than 1, the third CRC sequence of the number of bits L may be added to each of the code blocks. The number of code blocks $N_{CB}$ being greater than 1 means that the second sequence $b_k$ is segmented into multiple code blocks. The output of the second CRC addition unit 4012 is referred to as a code block $c_{rk}$. The code block $c_{rk}$ is an r-th code block.

Whether to transmit and/or receive a CBG in a certain serving cell is determined based on whether an RRC layer parameter (RRC parameter) cbgTransmission has been configured in the serving cell. That is, the RRC layer parameter (RRC parameter) cbgTransmission is a parameter indicating whether to transmit and/or receive the CBG in the certain serving cell. The transmission and/or reception of the CBG may mean transmitting or receiving only a portion of a transport block for the initial transmission. Note that the RRC parameter cbgTransmission may be defined (specified) for uplink (i.e., an uplink serving cell) and downlink (i.e., a downlink serving cell) in terms of certain serving cells independently of each other. Furthermore, the RRC parameter cbgTransmission may be defined (specified) in the uplink and the downlink configured for the terminal apparatus 1 independently of each other. In other words, the RRC parameter cbgTransmission may be applied to the uplink of all serving cells configured for the terminal apparatus 1. Furthermore, the RRC parameter cbgTransmission may be applied to the downlink of all serving cells configured for the terminal apparatus 1.

Furthermore, the RRC parameter cbgTransmission may be defined (specified) for each cell (serving cell). Namely, the base station apparatus 3 may transmit, to the terminal apparatus 1, whether to configure the RRC parameter cbgTransmission for each of the one or multiple cells configured for the terminal apparatus 1. The terminal apparatus 1 for which the RRC parameter cbgTransmission for a certain cell is not configured may not transmit and/or receive a CBG in the cell. Namely, the terminal apparatus 1 for which the RRC parameter cbgTransmission for a certain cell is not configured may not transmit or receive a portion of a transport block in the cell. The terminal apparatus 1 for which the RRC parameter cbgTransmission for a certain cell is configured may transmit and/or receive the CBG in the cell. The terminal apparatus 1 for which the RRC parameter cbgTransmission for a certain cell is not configured may not transmit or receive a portion of the transport block in the cell. The terminal apparatus 1 for which the RRC parameter cbgTransmission for a certain cell is configured may transmit or receive only a portion of the transport block for initial transmission in the cell.

Whether to configure the RRC parameter cbgTransmission in a certain cell is optional for a higher layer (RRC). Here, configuring the RRC parameter cbgTransmission indicates that a value of the parameter cbgTransmission transmitted in higher layer signaling is true. Configuring the value of the RRC parameter cbgTransmission to true may include transmitting and/or receiving the CBG. Configuring no RRC parameter cbgTransmission may indicate that the value of the parameter cbgTransmission transmitted in the higher layer signaling is false or that the received higher layer signaling (higher layer information) does not include the RRC parameter cbgTransmission. Configuring the value of the RRC parameter cbgTransmission to false may not include transmitting and/or receiving the CBG.

The base station apparatus 3 may simultaneously transmit the RRC information indicating the number of CBGs (maximum number of CBGs) X included in one transport block to the terminal apparatus 1 in the cell and the RRC parameter cbgTransmission having a value configured to true for a certain cell. Namely, the maximum number of CBGs X may be indicated by the RRC information. The maximum number of CBGs X may be configured for the terminal apparatus 1 and a maximum number of CBGs for one transport block.

Here, the number of CBGs (maximum number of CBGs) X may be configured independently for each cell. Furthermore, the number of CBGs X may be configured in a certain serving cell for uplink (i.e., an uplink serving cell) and downlink (i.e., a downlink serving cell) independently of each other. Furthermore, in a cell supporting two transport blocks, the number of CBGs X may be configured for each of the two transport blocks independently of each other. Furthermore, in a cell supporting two transport blocks, the number of CBGs X may be configured common to each of the two transport blocks. Moreover, the number of CBGs X may be common to multiple cells. For example, the base station apparatus 3 may transmit, to the terminal apparatus 1, the higher layer signaling including the RRC information indicating the RRC parameter cbgTransmission for each of cells and the number of CBGs X common to the cells.

Note that the RRC parameter cbgTransmission may indicate the number of CBGs (maximum number of CBGs) X included in one transport block. For example, in a case that X=1 is configured, the number of CBGs included in one transport block is 1, and the number of transport blocks and the number of CBGs included in the transport block are equal to each other. Thus, CBG transmission in the case of X=1 may have the same meaning as transmission performed at the transport block level. In other words, in the case that X=1 is configured, the CBG transmission may not be performed. In a case that X=2, 3, . . . is configured, the CBG transmission may be applied.

Note that in a case that the RRC parameter cbgTransmission is not configured, the CBG transmission may not be applied to the terminal apparatus 1. In other words, the terminal apparatus 1 may not assume processing related to the CBG transmission.

In the cell in which the RRC parameter cbgTransmission has been configured, the downlink control information may include information indicating which CBG has been actually transmitted. The information indicating which CBG has been actually transmitted is also referred to as information for indicating transmission of the CBG. The information for indicating the transmission of the CBG may indicate a CBG that has been actually included and transmitted in a PDSCH and/or a PUSCH scheduled by the downlink control information. The information for indicating the transmission of the CBG may be a bitmap given at least based on the number of CBGs $N_{CBG}$ included in a transport block included in the PDSCH and/or the PUSCH scheduled by the downlink control information including the information for indicating the transmission of the CBG, and/or the number of CBGs (maximum number of CBGs) X included in the transport block. Each bit included in the bitmap may correspond to one CBG. The bit may be set to '1' to indicate that the CBG is to be transmitted. The bit may be set to '0' to indicate that no CBG is to be transmitted. Note that, in a case that the information for indicating the transmission of the CBG is included in a downlink grant, a CBG included in the PDSCH and actually transmitted may be indicated. Furthermore, in a case that the information for indicating the transmission of the CBG is included in an uplink grant, a CBG included in the PUSCH and retransmitted may be indicated.

Figure 8:
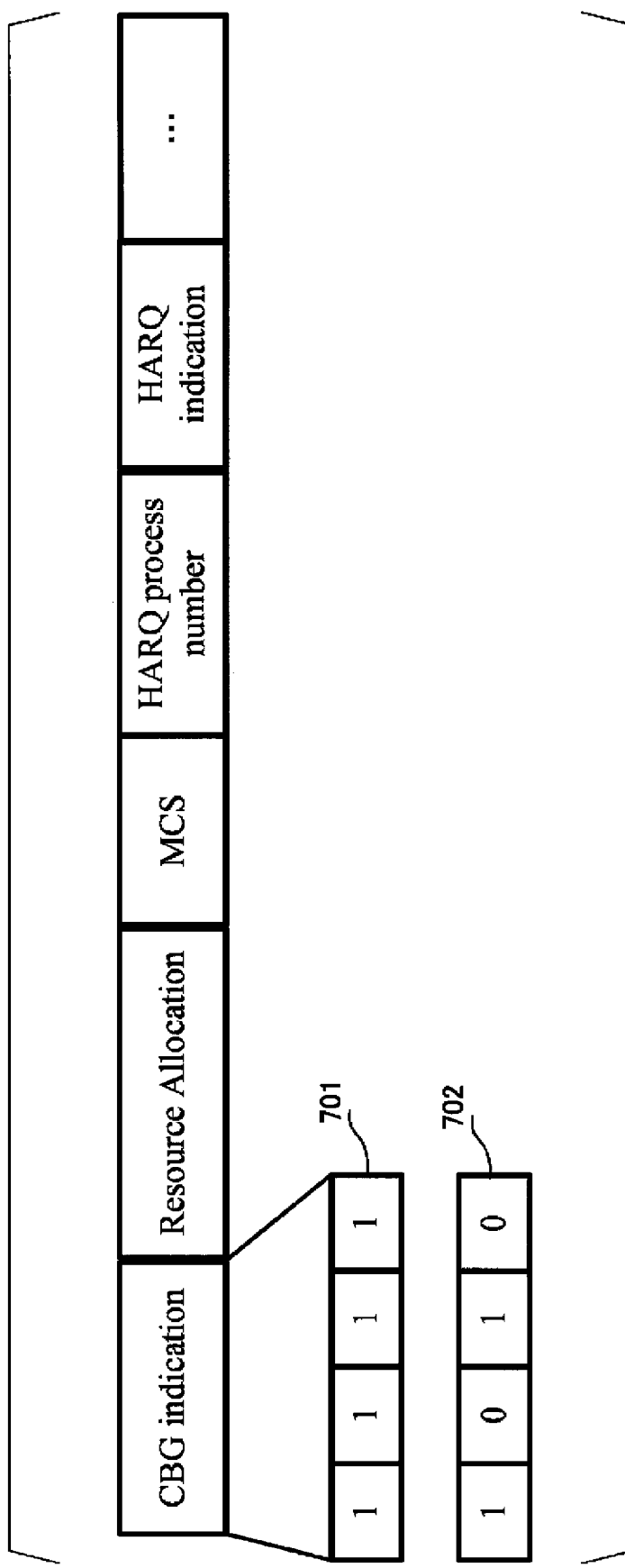
FIG. 8 is a diagram illustrating an example of downlink control information according to the present embodiment.

FIG. 8 is a diagram illustrating an example of downlink control information according to the present embodiment. For example, the information for indicating the transmission of the CBG may be mapped to a field called a CBG indication (CBG Transmission Indicator, CBGTI) of downlink control information. Namely, the field of CBG indication may be used to indicate which CBG has been actually transmitted. The number of bits of the field of CBG indication may be a value of the number of CBGs X. In FIG. 8, the number of CBGs X may be 4. At this time, the downlink control information indicating the transmission of the CBG may be a 4-bit bitmap. Each bit included in the bitmap may correspond to one CBG. In FIG. 8, in a case that a bitmap 701 is set to '111,' it may indicate that all CBGs of the transport block are transmitted. Namely, in the case that the bitmap 701 is set to '1111,' it may mean that the transport block is transmitted. Furthermore, in a case that a bitmap 702 is set to '1010,' it indicates that a CBG #1 and a CBG #3 are transmitted. Namely, in a case that the bitmap 702 is set to '1010,' it indicates that a CBG #2 and a CBG #4 are not transmitted. That is, the number of CBGs Y that are actually transmitted may be determined at least by the bitmap indicating the transmission of the CBG.

In FIG. 8, the field of Resource Allocation is used to indicate information of allocation of resources at a frequency and time for the PDSCH and/or the PUSCH. The field of Modulation and Coding (MCS) is used to indicate an MCS index ($I_{MCS}$) for the PDSCH or the PUSCH. By referencing the indicated MCS index ($I_{MCS}$), a corresponding modulation order (Qm), a corresponding transport block size index ($I_{TBS}$), and a corresponding redundancy version ($rv_{idx}$) are determined. Namely, the terminal apparatus 1 may determine a transport block size (TBS) at least based on the field of Resource Allocation and the field of Modulation and Coding (MCS). The field of HARQ process number is used to indicate a HARQ process number associated with the transport block to be transmitted and/or received. The HARQ process number may be an identifier for the HARQ process.

In addition, the downlink control information may include information indicating either whether to generate a HARQ-ACK for each CBG or whether to generate a HARQ-ACK for each transport block in the cell in which the RRC parameter cbgTransmission is configured. That is, the downlink control information may include information indicating a method for generating the HARQ-ACK. The field of HARQ indication may be used to indicate the information. The field of HARQ indication may be configured to, for example, 1 bit. The bit may be set to '1' to indicate that the HARQ-ACK is generated for each CBG. The bit may be set to '0' to indicate that the HARQ-ACK is generated for each transport block.

The HARQ-ACK may be generated for each transport block in the cell in which the RRC parameter cbgTransmission is not configured. The HARQ-ACK is not generated for each CBG in the cell in which the RRC parameter cbgTransmission is not configured.

In a case that the generation of the HARQ-ACK for each transport block is indicated, the terminal apparatus 1 generates the HARQ-ACK for each transport block. In a case that the transport block has been successfully decoded, an ACK for the transport block is generated. In a case that the transport block has not been successfully decoded, a NACK for the transport block is generated.

The downlink control information may not include information indicating the transmission of the CBG and/or information indicating the method for generating the HARQ-ACK in the cell in which the RRC parameter cbgTransmission is not configured. Furthermore, the downlink control information used for scheduling the PDSCH and/or the PUSCH for initial transmission of the transport block may not include information indicating the transmission of the CBG and/or information indicating the method for generating the HARQ-ACK. The downlink control information used for the scheduling the PDSCH and/or the PUSCH for the initial transmission of the transport block may include information indicating the transmission of the CBG and/or information indicating the method for generating the HARQ-ACK. The information indicating the transmission of the CBG and/or the information indicating the method for generating the HARQ-ACK included in the downlink control information used for scheduling the PDSCH and/or the PUSCH for the initial transmission of the transport block may be set to a predefined bit sequence (e.g., a sequence of all zeros or a sequence of all ones). In the downlink control information used for scheduling the PDSCH and/or the PUSCH for the initial transmission of the transport block, areas (bit field, information bits, bit areas, and the number of bits) to be used for the information indicating the transmission of the CBG and/or the information indicating the method for generating the HARQ-ACK may be reserved in advance. The areas (the bit field, the information bits, the bit areas, and the number of bits) for the information indicating transmission of the CBG and/or the information indicating the method for generating the HARQ-ACK included in the downlink control information used for scheduling the PDSCH and/or the PUSCH for the initial transmission of the transport block may be used at least to configure the MCS and/or the TBS.

Whether the PDSCH and/or PUSCH for the transport block is the initial transmission may be given at least based on the new data indicator included in the downlink control information for scheduling the PDSCH and/or PUSCH for the transport block. For example, whether the PDSCH and/or PUSCH for the transport block corresponding to a prescribed HARQ process number is of the initial transmission may be given based on whether the new data indicator included in the downlink control information for scheduling the PDSCH and/or PUSCH for the transport block has been switched from the new data indicator corresponding to the prescribed HARQ process number and the most recently transmitted transport block.

The downlink control information used for scheduling retransmission of the PDSCH and/or PUSCH for the transport block may include the information indicating the transmission of the CBG and/or the information indicating the method for generating the HARQ-ACK.

Further, in the present embodiment, the terminal apparatus 1 may determine whether to generate a HARQ-ACK for each CBG or generate a HARQ-ACK for each transport block at least based on the new data indicator and the information indicating transmission of the CBG. For example, in a case that the new data indicator corresponding to a certain HARQ process is toggled (switched) for a most recent transmission and a field of CBG indication included in a PDCCH is set to a first prescribed value (e.g., all set to one), the terminal apparatus 1 may generate the HARQ-ACK for each CBG. Furthermore, for example, in a case that the new data indicator corresponding to the certain HARQ process is toggled (switched) for the most recent transmission and the field of CBG indication included in the PDCCH is set to a second prescribed value (e.g., all set to zero), the terminal apparatus 1 may generate the HARQ-ACK for each transport block in the HARQ process. As a result, the field indicating the method for generating the HARQ-ACK can be eliminated, and the payload size of the downlink control information included in the PDCCH can be reduced.

A configuration of the CBG will be described below.

The code block group (CBG) may include one or multiple code blocks. In a case that transmission of a transport block is an initial transmission, the number of code blocks $N_{CB}$ included in the transport block may be given at least based on the Transport Block Size (TBS). Each of the $N_{CB}$ code blocks may be included (segmented) in any one of X CBGs. The value of X may be given based on the RRC information and/or description in specifications, etc. The number of code blocks $N_{CBperCBG}$ in each of the X CBGs may be given at least based on the transport block size. The number of code blocks in each of the CBGs may be based on the transport block size. The number of code blocks in each of the CBGs may be the same or different. Here, the difference between the number of code blocks in the CBG including the most code blocks and the number of code blocks in the CBG including the least code blocks among multiple CBGs corresponding to the same transport block is less than two. That is, the difference between the numbers of code blocks of a CBG and another CBG in the multiple CBGs corresponding to the same transport block may be merely one.

Figure 9:
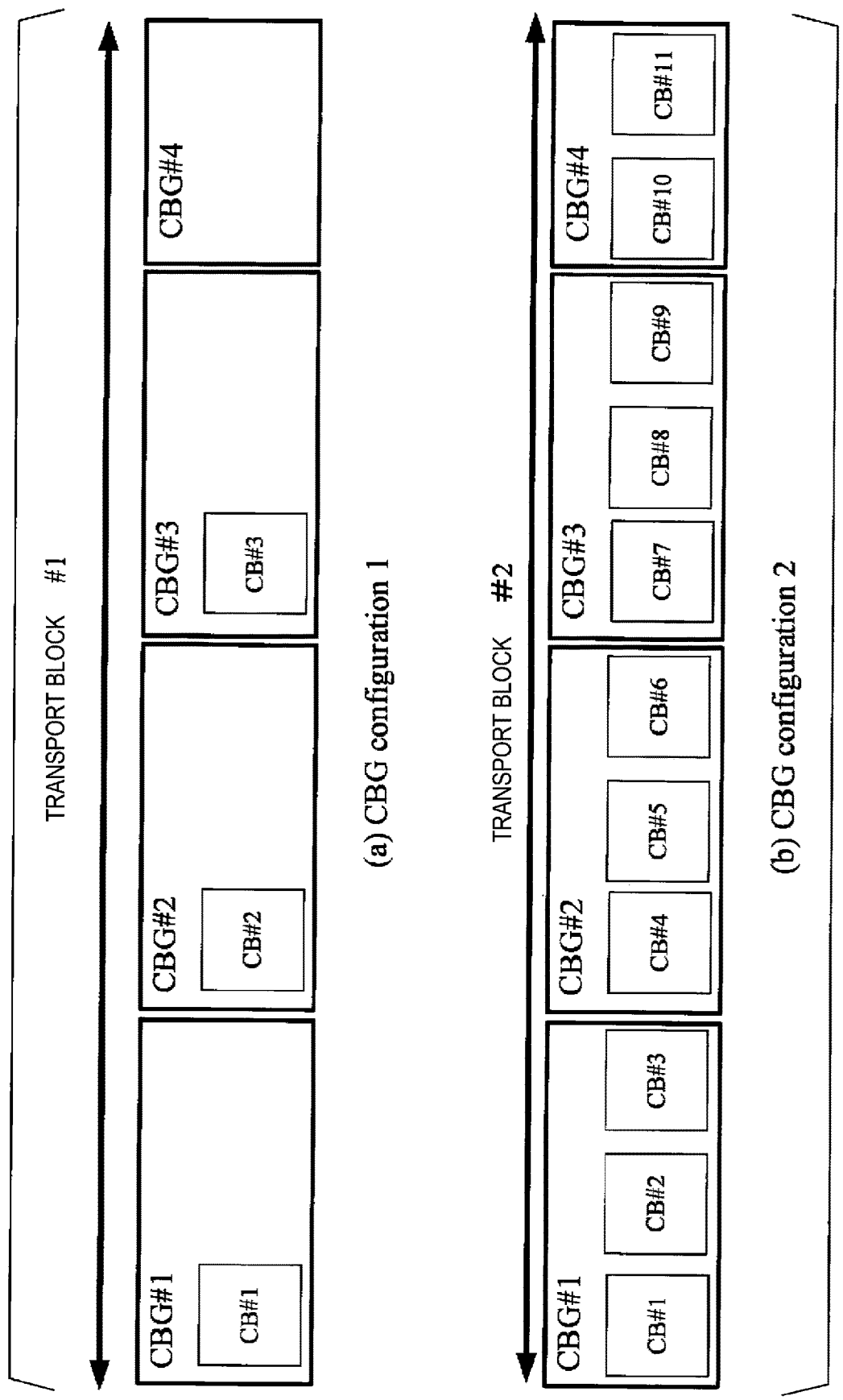
FIG. 9 is a diagram illustrating configuration examples of CBG according to an aspect of the present embodiment.

FIG. 9 is a diagram illustrating configuration examples of CBG according to an aspect of the present embodiment. Here, in FIG. 9, the number of CBGs X is indicated by the RRC information and may be 4. FIG. 9(a) is a diagram illustrating an example of a case that the number of code blocks $N_{CB}$ included in a transport block is smaller than the number of CBGs X. FIG. 9(b) is a diagram illustrating an example of a case that the number of code blocks $N_{CB}$ included in the transport block is equal to or greater than the number of CBGs X. In FIG. 9(a), the number of code blocks $N_{CB}$ included in a certain transport block #1 is given to be 3 at least based on the TBS. In FIG. 9(a), each of a CBG #1, a CBG #2, and a CBG #3 includes one code block. In FIG. 9(a), a CBG #4 includes no code block. In FIG. 9(a), the CBG #1, CBG #2, and CBG #3 each include one more code block than the CBG #4.

In FIG. 9(b), the number of code blocks $N_{CB}$ included in the certain transport block #1 is given to be 11 at least based on the TBS. In FIG. 9(b), each of the CBG #1, CBG #2, and CBG #3 includes three code blocks. In FIG. 9(b), the CBG #4 includes two code blocks. In FIG. 9(b), the CBG #1, CBG #2, and CBG #3 each include one more code block than the CBG #4. In both FIGS. 9(a) and 9(b), the maximum value of the number of code blocks per CBG may be a value that is one greater than the minimum number of code blocks per CBG.

Hereinafter, a HARQ procedure in the MAC layer by the terminal apparatus 1 will be described. As an example of the HARQ procedure in the MAC layer, a case of downlink transmission will be described as an example; however, a part of or the entire HARQ procedure in the MAC layer may be applied to the downlink transmission.

A MAC entity may be defined by at least one HARQ entity. The MAC entity may be a main agent (entity) that manages one or multiple HARQ entities. The MAC entity may be a main agent that manages processing of the MAC layer. The HARQ entity may be a main agent (entity) that manages one or multiple HARQ processes. Each of the multiple HARQ processes may be associated with a HARQ process number. The HARQ process number may be an identifier for the HARQ process. The HARQ entity can output HARQ information to the HARQ process. For example, the HARQ entity can output the HARQ information corresponding to a prescribed HARQ process number to a HARQ process associated with the prescribed HARQ process number. The HARQ information includes at least some or all of the new data indicator (NDI), the TBS, the HARQ process number, and the RV.

In a case that the spatial multiplexing scheme is configured as a downlink transmission method, input of one or two transport blocks may be expected at each Transmission Time Interval (TTI). In a case that the spatial multiplexing scheme is not configured as the downlink transmission method, input of one transport block may be expected at each TTI.

The TTI may be a unit to which the transport block is mapped. The TTI may be given based on the number of OFDM symbols included in at least a slot and/or a subframe. The TTI may be given at least based on a subcarrier spacing applied to a downlink slot. The HARQ process may be configured at each TTI.

In a case that downlink allocation is indicated at least a prescribed TTI, the MAC entity allocates a transport block transferred from the physical layer and HARQ information associated with the transport block to the HARQ process associated with the transport block based on the HARQ information.

One or two transport blocks and HARQ information associated with the transport blocks are transferred by the HARQ entity at each TTI at which transmission associated with a prescribed HARQ process occurs.

For each of the transport blocks transferred by the HARQ entity and each piece of the HARQ information associated with the transport block, the transmission of the transport block is assumed to be an initial transmission (new transmission) in a case that Condition 1 is at least satisfied in the HARQ process.

Condition 1 is a condition in which the new data indicator is toggled (switched) for the most recent transmission. The new data indicator may be included in the HARQ information. The most recent transmission may be a transmission corresponding to the transport block and/or a transmission of a second transport block. The second transport block may be a transport block most recently transmitted. The second transport block may be a transport block corresponding to soft bits stored in a soft buffer of the HARQ process associated with the transport block. The HARQ process number associated with the transport block and the HARQ process number associated with the second transport block may be related to each other. The HARQ process number associated with the transport block and the HARQ process number associated with the second transport block may be the same.

In a case that at least Condition 1 is not satisfied and/or a prescribed condition is satisfied, transmission of the transport block is assumed to be a retransmission.

In a case that the transmission of the transport block is an initial transmission, the MAC entity may attempt to decode received data. The received data may be received data including the transport block. In a case that the transmission of the transport block is a retransmission and the second transport block has not been successfully decoded, the MAC entity may combine the received data with the soft bits corresponding to the second transport block to generate a third transport block and attempt to decode the third transport block.

In a case that Condition 2 is satisfied, the MAC entity may generate an ACK for the transport block. Condition 2 may be a condition in which at least one of Condition 2A and Condition 2B is satisfied. Condition 2A may be a condition in which decoding of the transport block attempted by the MAC entity has been successfully performed. Condition 2B may be a condition in which decoding of the transport block has been previously and successfully completed.

In a case that Condition 2 is not satisfied, the MAC entity may replace the data stored in the soft buffer with data that the MAC entity has attempted to decode. In the case that Condition 2 is not satisfied, the MAC entity may replace the soft bits stored in the soft buffer with soft bits generated based on the decoding of the transport block. In the case that Condition 2 is not satisfied, a NACK may be generated for the transport block.

Replacing the data stored in the soft buffer with the data that the MAC entity attempted to decode corresponds to flushing (flowing) the data stored in the soft buffer. Replacing the soft bits stored in the soft buffer with soft bits generated based on the decoding of the transport block corresponds to flushing data stored in the soft buffer.

For the MAC entity, flushing the soft buffer may correspond to flushing soft bits for all bits of a transport block included in the soft buffer.

Mapping between the HARQ-ACK generated for each CBG, the CBG, and the transport block will be described below. The terminal apparatus 1 that has been indicated to perform HARQ-ACK feedback for each CBG may generate and feedback a HARQ-ACK corresponding to each of the CBGs included in the transport block. That is, in a case that the HARQ-ACK feedback is performed for each CBG, the HARQ-ACK for each CBG is generated. In a case that a CBG has been successfully decoded, the HARQ-ACK corresponding to the CBG is generated as an ACK. Successful decoding of the CBG may mean that all code blocks included in the CBG have been successfully decoded. In a case that the CBG has not been successfully decoded, the HARQ-ACK corresponding to the CBG is generated as a NACK. The CBG that has not been successfully decoded may mean that at least one code block included in the CBG has not been successfully decoded. In addition, the present embodiment assumes a case that space bundling is not performed on the HARQ-ACK for the CBG or the HARQ-ACK for the transport block.

FIG. 10 is a diagram illustrating an example of the mapping of HARQ-ACKs (j), CBGs, and transport blocks according to the present embodiment. FIG. 10(*a*) is a diagram illustrating one example of a case that a certain serving cell supports one transport block. Here, FIG. 10(*a*) illustrates a case that the number of CBGs X is configured to 4 by the RRC information. In other words, FIG. 10(*a*) illustrates an example of a case that one transport block includes up to four CBGs. In other words, FIG. 10(*a*) illustrates an example of a case that the number (maximum number) of CBGs X is 4. In FIG. 10(*a*), a HARQ-ACK (0) corresponds to a CBG #1 of a transport block #0, a HARQ-ACK (1) corresponds to a CBG #2 of the transport block #0, a HARQ-ACK (2) corresponds to a CBG #3 of the transport block #0, and a HARQ-ACK (3) corresponds to a CBG #4 of the transport block #0.

FIG. 10(*b*) is a diagram illustrating one example of a case that a certain serving cell supports up to two transport blocks. Here, FIG. 10(*b*) illustrates a case that the number of CBGs X is configured to 4 by the RRC information. In other words, FIG. 10(*b*) illustrates an example of a case that one transport block (each of the transport block #0 and the transport block #1) includes up to four CBGs. In FIG. 10(*b*), a HARQ-ACK (0) corresponds to a CBG #1 of a transport block #0, a HARQ-ACK (1) corresponds to a CBG #2 of the transport block #0, a HARQ-ACK (2) corresponds to a CBG #3 of the transport block #0, and a HARQ-ACK (3) corresponds to a CBG #4 of the transport block #0. A HARQ-ACK (4) corresponds to a CBG #1 of a transport block #1, a HARQ-ACK (5) corresponds to a CBG #1 of a transport block #2, a HARQ-ACK (6) corresponds to a CBG #3 of the transport block #1, and a HARQ-ACK (7) corresponds to a CBG #4 of the transport block #1.

In the present embodiment, in a serving cell in which the HARQ-ACK feedback for each CBG is configured (implemented), the HARQ-ACK corresponding to a PDSCH in a certain slot may be determined at least based on the number of CBGs X indicated by the RRC information and/or the number of transport blocks supported by the serving cell. For example, the number of HARQ-ACKs corresponding to a PDSCH in a certain slot may be the number of CBGs X in a serving cell supporting one transport block. Furthermore, the number of HARQ-ACKs corresponding to a PDSCH in a certain slot may be twice the number of CBGs X in a serving cell supporting two transport blocks.

According to the present embodiment, in a serving cell in which the HARQ-ACK feedback for each CBG is configured (implemented), the HARQ-ACK corresponding to a PUSCH in a certain slot may be determined at least based on the number of CBGs X indicated by the RRC information and/or the number of transport blocks supported by the serving cell. For example, the number of HARQ-ACKs corresponding to a PUSCH in a certain slot may be the number of CBGs X in a serving cell supporting one transport block. Furthermore, the number of HARQ-ACKs corresponding to a PUSCH in a certain slot may be twice the number of CBGs X in a serving cell supporting two transport blocks.

The number of CBGs X included in the transport block may be individually configured for each of the PUSCH and the PDSCH.

Figure 11:
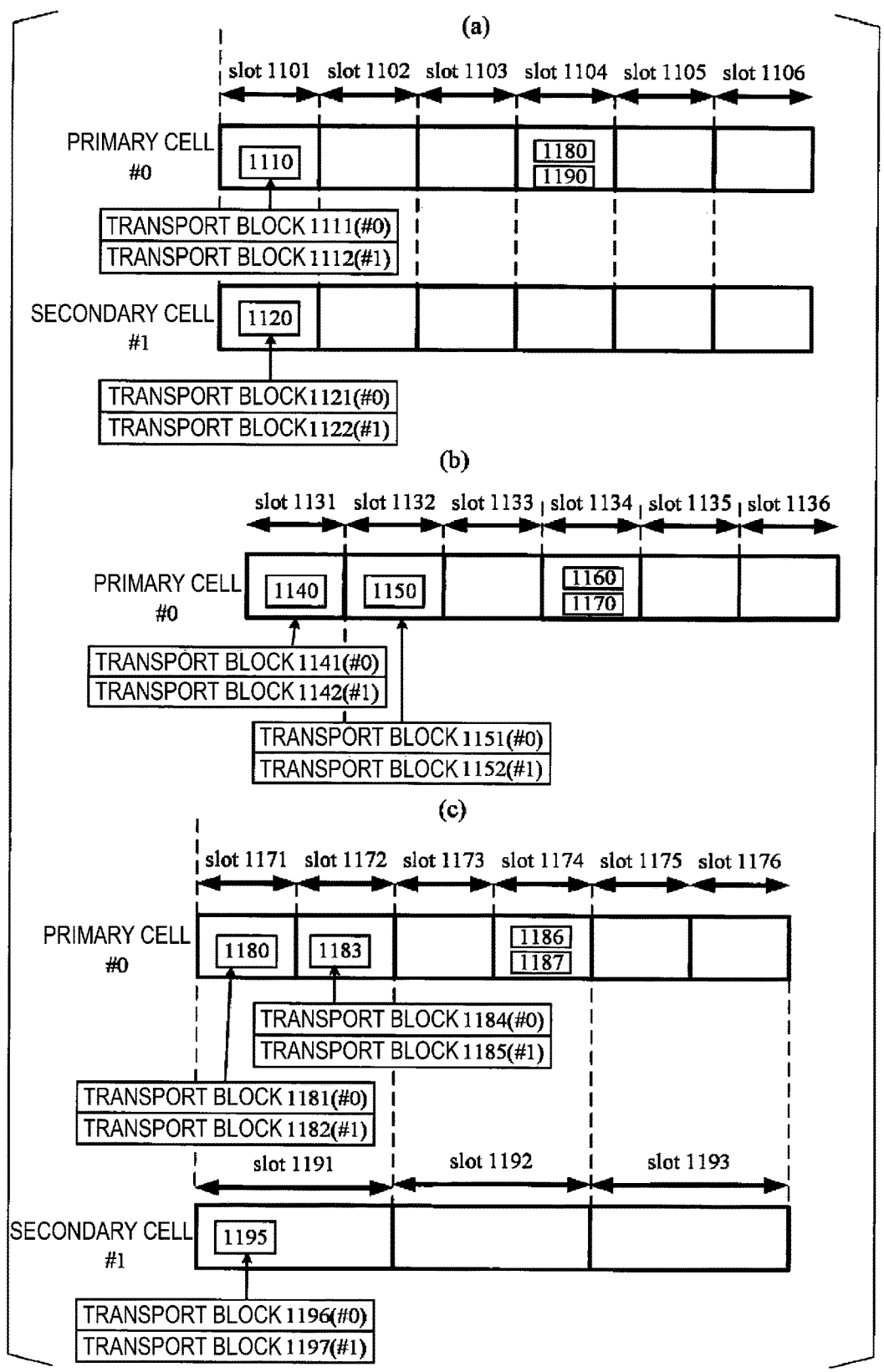
FIG. 11 is a diagram illustrating an example of transmission of HARQ-ACKs according to the present embodiment.

FIG. 11 is a diagram illustrating examples of downlink transmission of HARQ-ACKs according to the present embodiment. FIG. 11(*a*) illustrates a case that two serving cells are configured for the terminal apparatus 1. FIG. 11(*b*) illustrates a case that one serving cell is configured for the terminal apparatus 1. The indexes (numbers) of transport blocks in the same slot may be #0 and #1.

FIG. 11(*a*) is a diagram illustrating an example in which the HARQ-ACK corresponding to each of the CBGs included in each of the transport blocks received in a slot 1101 in multiple serving cells configured for the terminal apparatus 1 is transmitted to the base station apparatus 3 on a physical channel (a PUCCH or a PUSCH) in a slot 1104. In FIG. 11(*a*), the HARQ-ACK feedback for each CBG is configured in the two serving cells. The base station apparatus 3 transmits a PDSCH 1110 in the primary cell in the slot 1101. The base station apparatus 3 transmits a PDSCH 1120 in the secondary cell in the slot 1101. The PDSCH 1110 includes two transport blocks 1111 and 1112. The PDSCH 1120 includes two transport blocks 1121 and 1122. In other words, the terminal apparatus 1 receives four transport blocks in the slot 1101. The terminal apparatus 1 transmits the HARQ-ACKs corresponding to the transport blocks 1111, 1112, 1121, and 1122 using the PUCCH resource 1180 or the PUSCH resource 1190 in the slot 1104.

Figure 12:
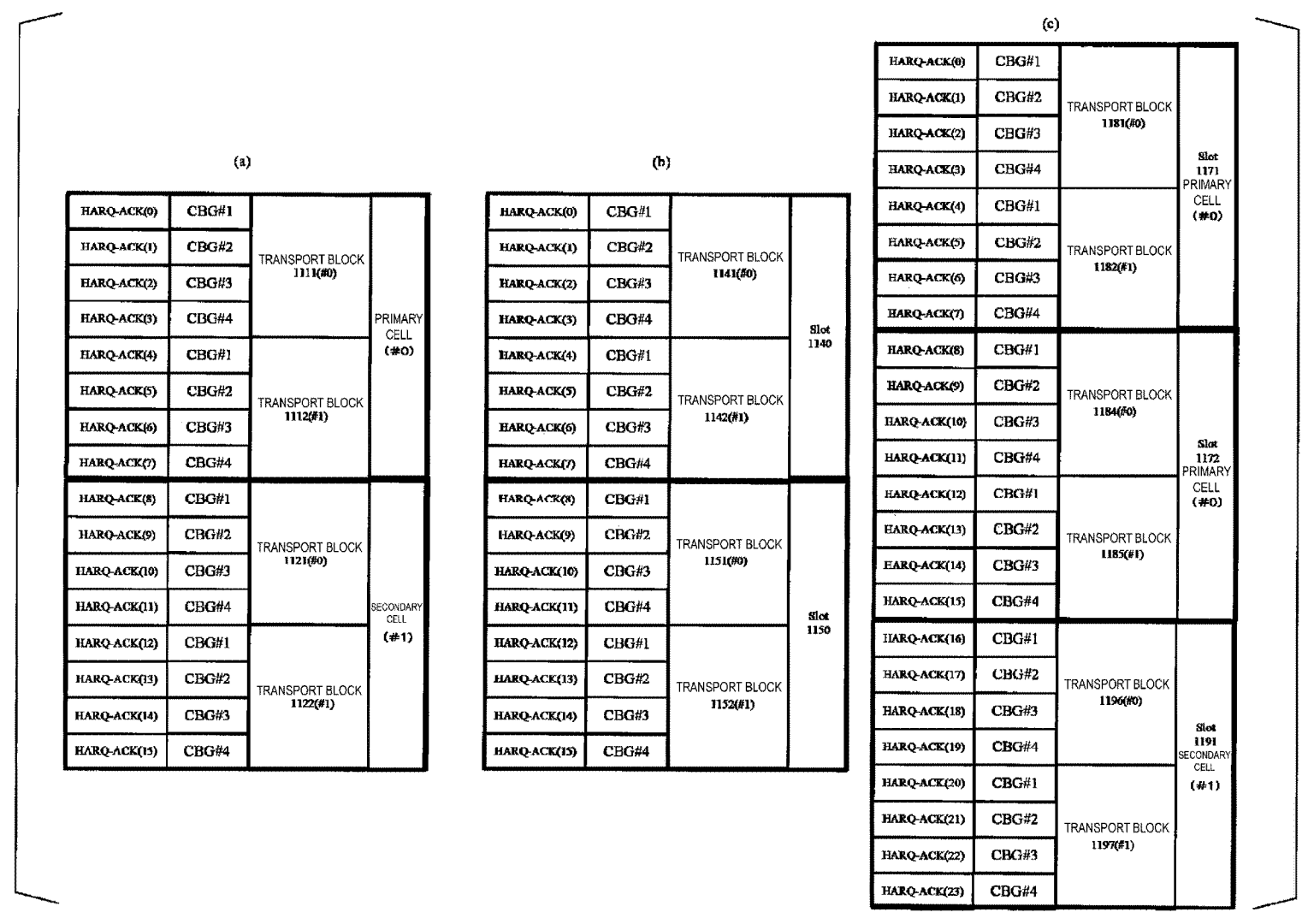

Here, the number of CBGs X is indicated to be 4 by the RRC information. The mapping between the HARQ-ACKs generated, the CBGs and the transport blocks may be illustrated as in FIG. 12(*a*). FIG. 12 is a diagram illustrating another example of the mapping of HARQ-ACKs (j), CBGs, and transport blocks according to the present embodiment. The number of HARQ-ACKs to be generated may be determined at least based on (i) the number of serving cells configured for the terminal apparatus 1, (ii) the number of transport blocks supported by each of the serving cells, and (iii) the number of CBGs X indicated by the RRC information.

For example, in FIG. 11(*a*), 16 HARQ-ACKs may be generated at least based on 2 which is the number of serving cells configured for the terminal apparatus 1, 2 which is the number of transport blocks supported by each of the serving cells, and 4 which is the number of CBGs X indicated by the RRC information.

Furthermore, for example, in each of the serving cells, four HARQ-ACKs for the transport block number #0 and four HARQ-ACKs for the transport block number #1 may be sequentially linked. Eight HARQ-ACKs for a primary cell (serving cell with a cell index #0) and eight HARQ-ACKs for a secondary cell (serving cell with a cell index #1) may be sequentially linked between the serving cells. Here, according to the present embodiment, a primary cell number (cell index) may be configured to a minimum value. The cell index of the primary cell may be given to be, for example, a cell index #0. The cell index of the secondary cell may be, for example, greater than 0.

Furthermore, in FIG. 1(a), the two serving cells configured for the terminal apparatus 1 may support up to two transport blocks as described above. The base station apparatus 3 may transmit one transport block in a serving cell in a certain slot. For example, the base station apparatus 3 transmits a PDSCH 1110 in the primary cell in the slot 1101. The base station apparatus 3 transmits a PDSCH 1120 in the secondary cell in the slot 1101. The PDSCH 1110 includes one transport block 1111. The PDSCH 1110 does not include a transport block 1112. The PDSCH 1120 includes two transport blocks 1121 and 1122. In other words, the terminal apparatus 1 receives three transport blocks in the slot 1101. The terminal apparatus 1 transmits the HARQ-ACKs corresponding to the transport blocks 1111, 1112, 1121, and 1122 using the PUCCH resource 1180 or the PUSCH resource 1190 in the slot 1104. At this time, the terminal apparatus 1 generates an ACK or a NACK for each corresponding HARQ-ACK, based on whether each of the CBGs included in the received transport blocks 1111, 1121, and 1122 has been successfully decoded. At this time, the terminal apparatus 1 generates the NACK for each of a HARQ-ACK (4) to a HARQ-ACK (7) corresponding to the transport block 1112 that has not been received. Here, the base station apparatus 3 may not detect the HARQ-ACK (4) to the HARQ-ACK (7) since the base station apparatus 3 already recognizes that the terminal apparatus 1 has generated the NACK to the HARQ-ACK corresponding to each of the CBGs for the transport block 1112 that has not been transmitted to the terminal apparatus 1.

In a case that the terminal apparatus 1 is indicated to transmit, on one PUCCH or one PUSCH, the HARQ-ACK corresponding to the PDSCH received in the slot in multiple serving cells configured, and to feedback the HARQ-ACK for each CBG, the terminal apparatus 1 may generate the ACK or the NACK for the HARQ-ACK corresponding to each of the CBGs included in the received transport block, and may generate the NACK for the HARQ-ACK corresponding to each of the CBGs for the transport block that has not been received.

FIG. 11(b) is a diagram illustrating an example in which the HARQ-ACK corresponding to each of the CBGs included in each of the transport blocks received in multiple slots 1131 and 1132 in one serving cell configured for the terminal apparatus 1 is transmitted to the base station apparatus 3 on the physical channel (the PUCCH or the PUSCH) in a slot 1134. In FIG. 11(b), the HARQ-ACK feedback for each CBG is configured in one serving cell. The base station apparatus 3 transmits a PDSCH 1140 in the primary cell in a slot 1131. The base station apparatus 3 transmits a PDSCH 1150 in the primary cell in a slot 1132. The PDSCH 1140 includes two transport blocks 1141 and 1142. The PDSCH 1150 includes two transport blocks 1151 and 1152. The terminal apparatus 1 receives four transport blocks in the slot 1131 and the slot 1132. The terminal apparatus 1 transmits HARQ-ACKs corresponding to the transport blocks 1141, 1142, 1151, and 1152 using a PUCCH resource 1160 or a PUSCH resource 1170 in a slot 1134. Here, the number of CBGs X may be indicated to be 4 by the RRC information. Furthermore, the mapping between the HARQ-ACKs generated, the CBGs, and the transport blocks may be illustrated as in FIG. 12(b). The number of generated HARQ-ACKs may be determined at least based on (ii) the number of transport blocks supported by each of the serving cells, (iii) the number of CBGs X indicated by the RRC information, and (iv) the number of slots corresponding to the HARQ-ACK transmitted on the physical channel (the PUCCH or the PUSCH) in the slot 1134. As for (iv), in FIG. 11(b), for example, the HARQ-ACK for the PDSCH received in the slot 1131 and the slot 1132 is transmitted using the PUCCH resource 1160 or the PUSCH resource 1170 in the slot 1134. In other words, in FIG. 11(b), the number of slots in which the HARQ-ACK can be transmitted on the physical channel (PUCCH 1160 or PUSCH 1170) in the slot 1134 is two. Accordingly, 16 HARQ-ACKs may be generated in FIG. 11(b). Four HARQ-ACKs for a transport block number #0 and four HARQ-ACKs for transport block number 1 may be sequentially linked. Eight HARQ-ACKs for the slot 1131 and eight HARQ-ACKs for the slot 1132 may be sequentially linked.

Furthermore, in FIG. 11(b), the serving cells configured for the terminal apparatus 1 support up to two transport blocks as described above. The base station apparatus 3 may transmit one transport block in a certain slot. For example, the base station apparatus 3 transmits the PDSCH 1140 in the primary cell in the slot 1131. The base station apparatus 3 transmits the PDSCH 1150 in the slot 1132. The PDSCH 1140 includes one transport block 1141. The PDSCH 1140 does not include a transport block 1142. The PDSCH 1150 includes two transport blocks 1151 and 1152. In other words, the terminal apparatus 1 receives one transport block in the slot 1131 and receives two transport blocks in the slot 1132. As in FIG. 11(a), the terminal apparatus 1 generates an ACK or a NACK for each corresponding HARQ-ACK, based on whether each of the CBGs included in the received transport block has been successfully decoded. Furthermore, the terminal apparatus 1 generates the NACK for each of a HARQ-ACK (4) to a HARQ-ACK (7) for the transport block 1142 that has not been received. Here, the base station apparatus 3 may not detect the HARQ-ACK (4) to the HARQ-ACK (7) since the base station apparatus 3 already recognizes that the terminal apparatus 1 has generated the NACK to the HARQ-ACK corresponding to each of the CBGs for the transport block 1142 that has not been transmitted to the terminal apparatus 1.

That is, in a case that the terminal apparatus 1 is indicated to transmit, on the same PUCCH or PUSCH in the same slot, the HARQ-ACK corresponding to each PDSCH received in multiple slots in one cell, and to feedback the HARQ-ACK for each CBG, the terminal apparatus 1 may generate an ACK or a NACK for the HARQ-ACK corresponding to each of the CBGs included in the transport block received in the PDSCH and may generate the NACK for the HARQ-ACK corresponding to each of the CBGs for the transport block that has not been received.

FIG. 11(c) is a diagram illustrating an example in which the HARQ-ACK corresponding to each of the CBGs included in each of the transport blocks received in multiple slots in multiple serving cells configured for the terminal apparatus 1 is transmitted to the base station apparatus 3 on the same physical channel (PUCCH or PUSCH) in the same slot. In FIG. 11(c), the HARQ-ACK feedback for each CBG is configured in two serving cells. Subcarrier spacings between servings are different. A subcarrier spacing for the primary cell is twice a subcarrier spacing for the secondary cell. That is, a slot length of the primary cell is half a slot length of the secondary cell. In FIG. 11(c), the terminal apparatus 1 receives a PDSCH 1180 in a slot 1171 and a PDSCH 1183 in a slot 1172 in the primary cell. The PDSCH 1110 includes two transport blocks 1111 and 1112. The PDSCH 1180 includes two transport blocks 1181 and 1182. The terminal apparatus 1 receives a PDSCH 1195 in a slot 1191 in the secondary cell. The PDSCH 1195 includes two transport blocks 1196 and 1197. Next, the terminal apparatus 1 transmits HARQ-ACKs corresponding to the six received transport blocks using a PUCCH 1186 or PUSCH 1187 in a slot 1174. In this case, the mapping between the HARQ-ACKs generated, the CBGs, and the transport blocks may be illustrated as in FIG. 12(c).

Further, according to the present embodiment, FIGS. 11(a), 11(b), and 11(c) may be configured for the terminal apparatus 1 at the same time. In other words, the terminal apparatus 1 may transmit the HACK-ACK corresponding to each of the PDSCHs received in one or multiple slots in one or multiple serving cells on the same PUCCH or PUSCH in the same slot. Here, in a case that the terminal apparatus 1 is indicated to feedback the HARQ-ACK for each CBG, the terminal apparatus 1 may generate an ACK or a NACK for the HARQ-ACK corresponding to each of the CBGs included in the received transport block on the PDSCH, and generate the NACK for the HARQ-ACK corresponding to each of the CBGs for the transport block that has not been received. The number of generated HARQ-ACKs may be determined at least based on (i) the number of serving cells configured for the terminal apparatus 1, (ii) the number of transport blocks supported by each of the serving cells, (iii) the number of CBGs X indicated by the RRC information, and (iv) the number of slots corresponding to the HARQ-ACKs that can be transmitted on the same physical channel PUCCH or PUSCH in the same slot.

Figure 13:
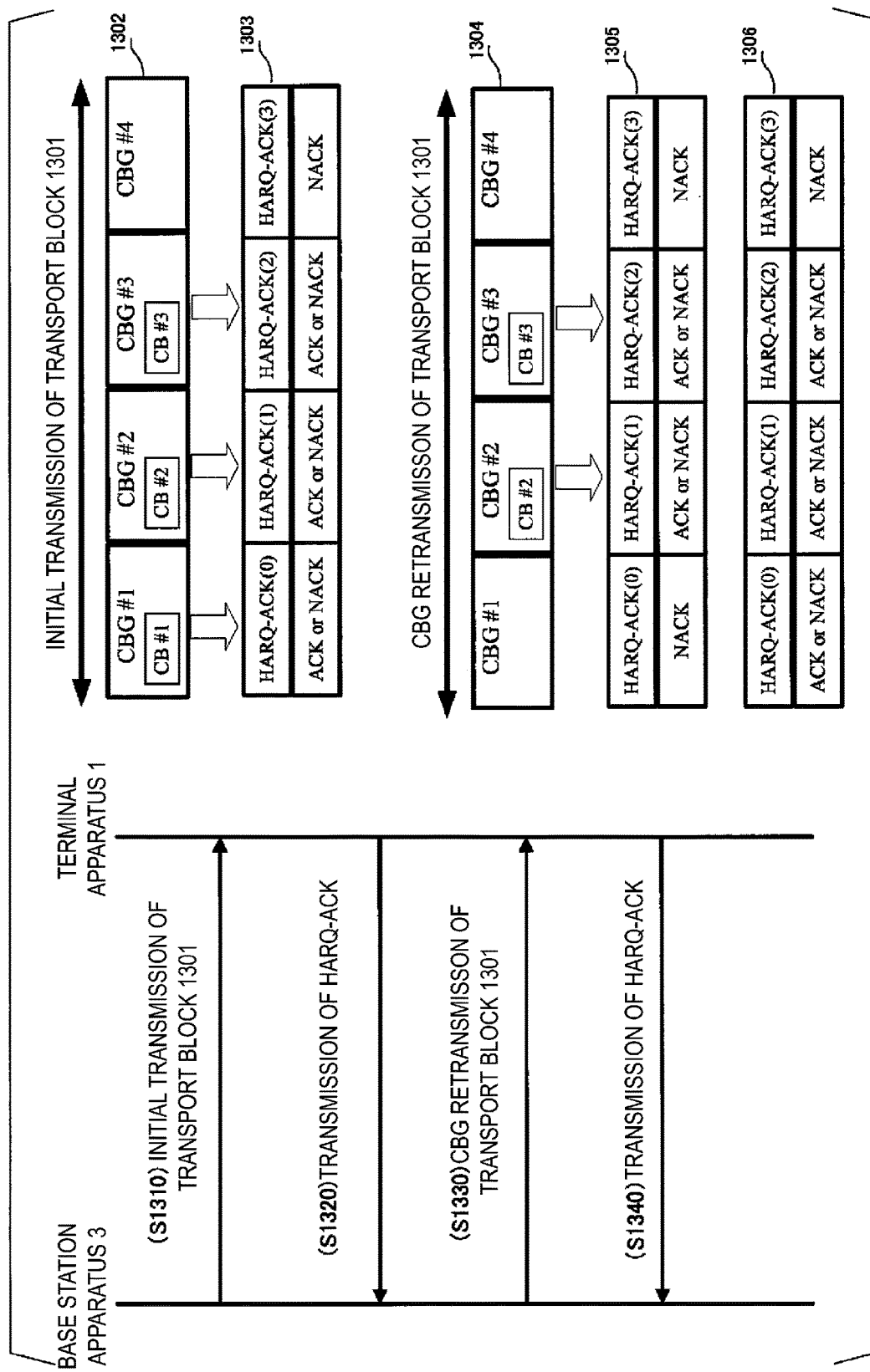
FIG. 13 is a diagram illustrating an example of transmitting HARQ-ACKs corresponding to transport blocks according to the present embodiment.

FIG. 13 is a diagram illustrating an example in which HARQ-ACKs corresponding to a transport block are transmitted according to the present embodiment. Here, the transport block may correspond to any one of the transport blocks in FIG. 11. In FIG. 13, the number of CBGs X is given to be 4 by the RRC information.

(S1310) The base station apparatus 3 performs initial transmission of a certain transport block 1301 to the terminal apparatus 1. The terminal apparatus 1 performs demodulation processing, decoding processing, and the like of the transport block 1301 received. In a case that the transmission of the transport block 1301 is an initial transmission, the terminal apparatus 1 may determine the number of code blocks $N_{CB}$ included in the transport block based on the transport block size. Here, the transport block size may be given by downlink control information. Here, $N_{CB}$ is 3. That is, the transport block 1301 initially transmitted includes three code blocks. In FIG. 13, the number of code blocks included in the initial transmission of the transport block is smaller than the number of CBGs X. In FIG. 13, each of a CBG #1, a CBG #2, and a CBG #3 includes one code block. In FIG. 13, a CBG #4 includes no code block.

Next, the terminal apparatus 1 may attempt to decode the transport block 1301 received. Then, the terminal apparatus 1 may generate a HARQ-ACK 1303 for the initial transmission of the transport block 1301. Since the HARQ-ACK 1303 includes a HARQ-ACK generated for each of the CBGs, the terminal apparatus 1 performs the demodulation processing, the decoding processing, and the like on each of the CBGs. The terminal apparatus 1 may perform the demodulation processing, the decoding processing, and the like on the code block included in each of the CBGs. Since the terminal apparatus 1 recognizes that the CBG #4 includes no code block based on the size of the transport block 1301, none of the demodulation processing, the decoding processing, and the like may be performed on the CBG #4.

For the HARQ-ACK for the CBG including the code block, an ACK or a NACK may be generated based on whether the CBG has been successfully decoded. For each of the HARQ-ACKs for the CBG #1, CBG #2, and CBG #3, the ACK or the NACK is generated based on whether each of the CBGs has been successfully decoded. The terminal apparatus 1 may generate the HARQ-ACK for the CBG based on whether the CBG has been successfully decoded. In a case that the CBG has been successfully decoded, the terminal apparatus 1 may generate the ACK for the CBG. In a case that the CBG has not been successfully decoded, the terminal apparatus 1 may generate the NACK for the CBG. Furthermore, the terminal apparatus 1 may generate the NACK as a HARQ-ACK for the CBG #4 including no code block. Furthermore, the terminal apparatus 1 may generate the ACK as a HARQ-ACK for the CBG #4 including no code block.

That is, in a case that the number of code blocks $N_{CB}$ is less than the number of CBGs X, each of the $N_{CB}$ code blocks is included in $N_{CB}$ different CBGs, and $N_{CB}$ HARQ-ACKs corresponding to the $N_{CB}$ CBGs and (X-$N_{CB}$) NACKs are generated as HARQ-ACKs for the initial transmission of the transport block. That is, in a case that the number of code blocks $N_{CB}$ is less than the number of CBGs X, the HARQ-ACKs for the initial transmission of the transport block include the (X-$N_{CB}$) NACKs and $N_{CB}$ HARQ-ACKs for the $N_{CB}$ CBGs. For each of the $N_{CB}$ HARQ-ACKs corresponding to the $N_{CB}$ CBGs, an ACK or a NACK may be generated based on whether the CBG has been successfully decoded. Furthermore, here, $N_{CB}$ HARQ-ACKs corresponding to the $N_{CB}$ CBGs and (X-$N_{CB}$) ACKs may be generated for the HARQ-ACKs for the initial transmission of the transport block.

The HARQ-ACKs for the transport block may include X-$N_{CB}$ NACKs and $N_{CB}$ HARQ-ACKs corresponding to the $N_{CB}$ CBGs in a case that the number of code blocks $N_{CB}$ included in the transport block is less than the maximum number of CBGs X. The number of code blocks $N_{CB}$ may be given at least based on the transport block size. Each of the $N_{CB}$ code blocks may be included in $N_{CB}$ different CBGs. Transmission of the transport block may be an initial transmission. The X-$N_{CB}$ NACKs may be X-$N_{CB}$ ACKs. Here, for each of the $N_{CB}$ HARQ-ACKs corresponding to the $N_{CB}$ CBGs, an ACK or a NACK may be generated based on whether the CBG has been successfully decoded.

The HARQ-ACKs for the transport block may include X HARQ-ACKs for the X CBGs in a case that the number of code blocks $N_{CB}$ included in the transport block is equal to or greater than the maximum number of CBGs X. Here, for each of the X HARQ-ACKs corresponding to the X CBGs, an ACK or a NACK may be generated based on whether the CBG has been successfully decoded.

(S1320) The terminal apparatus 1 transmits the HARQ-ACK 1303 for the initial transmission of the transport block 1301 to the base station apparatus 3. The base station apparatus 3 determines, based on the HARQ-ACK 1303 received from the terminal apparatus 1, for which CBG retransmission is to be performed. Here, the base station apparatus 3 may not detect the HARQ-ACK (3) since it recognizes that the NACK has been generated for the CBG #4 that includes no code block.

(S1330) The base station apparatus 3 retransmits a CBG for a certain transport block 1301 to the terminal apparatus 1. The base station apparatus 3 notifies the terminal apparatus 1 of which CBG among the CBG #1, the CGB #2, and the CBG #3 is to be actually retransmitted based on information indicating transmission of the CBG (e.g., the field of CBG indication). The retransmission of the CBG may mean that the code block included in the CBG is to be retransmitted. The terminal apparatus 1 can determine the CBG to be actually retransmitted based on the information indicating the transmission of the CBG. The field of CBG indication indicating the transmission of the CBG may be a 4-bit bitmap. For example, the base station apparatus 3 sets the field of CBG indication to '0110' and notifies the terminal apparatus 1 of retransmission of the CBG #2 and the CBG #3. In other words, the number of CBGs to be retransmitted Y in S1330 is 2. Here, the CBG #2 and the CBG #3 to be retransmitted constitutes a part of the transport block initially transmitted (the CBG #1, the CBG #2, and the CBG #3). That is, the code blocks included in the retransmitted CBGs constitutes a part of the transport block 1301 for initial transmission. The number of CBGs to be retransmitted Y may be given by the information indicating the transmission of the CBG included in a PDCCH.

Next, the terminal apparatus 1 may attempt to decode the retransmission of the CBG of the received transport block 1301. Then, the terminal apparatus 1 may generate a HARQ-ACK 1305 for the retransmission of the CBG of the transport block 1301. In the retransmission of the transport block, the HARQ-ACK 1305 is a HARQ-ACK for the transport block. The HARQ-ACK 1305 is a HARQ-ACK generated for each CBG. The terminal apparatus 1 may perform the demodulation processing, the decoding processing, or the like on the code block included in each of the retransmitted CBG #2 and CBG #3 based on the information indicating the transmission of the CBG.

In S1340, for each of the HARQ-ACKs for the CBG #2 and the CBG #3 including the code block, an ACK or a NACK may be generated based on whether the CBG has been successfully decoded. In a case that the CBG has been successfully decoded, the terminal apparatus 1 may generate the ACK for the CBG. In a case that the CBG has not been successfully decoded, the terminal apparatus 1 may generate the NACK for the CBG. In S1340, the terminal apparatus 1 generates the NACK as a HARQ-ACK for the CBG #1 that includes the code block but has not been retransmitted. Furthermore, in S1340, the terminal apparatus 1 generates the NACK as a HARQ-ACK for the CBG #4 including no code block. In other words, in S1340, the terminal apparatus 1 may generate ACKs as HARQ-ACKs for the CBG #1 and the CBG #4.

In other words, in a case that the number of CBGs to be retransmitted Y is less than the number (maximum number) of CBGs X, for the HARQ-ACKs for retransmission of the transport block, (X-Y) NACKs and Y HARQ-ACKs corresponding to the Y CBGs are generated. That is, the HARQ-ACKs for retransmission of the transport block include (X-Y) NACKs and Y HARQ-ACKs corresponding to the Y CBGs. An ACK or a NACK may be generated for each of the Y HARQ-ACKs corresponding to the Y CBGs based on whether the CBG has been successfully decoded. Further, here, in a case that the number of CBGs to be retransmitted Y is less than the number of CBGs X, for the HARQ-ACKs for retransmission of the transport block, Y HARQ-ACKs corresponding to the Y CBGs and (X-Y) ACKs may be generated. Here, the number of CBGs to be retransmitted Y is determined based on the information indicating the transmission of the CBG included in the PDCCH, and the number (maximum number) of CBGs X is indicated by the RRC information.

The HARQ-ACKs for the transport block may include (X-Y) NACKs and Y HARQ-ACKs for the Y CBGs in a case that the number of CBGs to be retransmitted Y is less than the number of CBGs X. The number of CBGs to be retransmitted Y may be determined based on the information indicating the transmission of the CBG included in the PDCCH. The maximum number of CBGs X may be indicated by the RRC information.

The HARQ-ACKs for the transport block may also include X HARQ-ACKs for X CBGs in a case that the number of CBGs to be retransmitted Y is equal to the number of CBGs X.

In the initial transmission of the transport block in S1310, the HARQ-ACKs for the transport block may include X HARQ-ACKs for the X CBGs in a case that the number of code blocks $N_{CB}$ included in the transport block is equal to or greater than the maximum number of CBGs X. Further, in the retransmission of the transport block in S1330, in a case that the number of CBGs to be retransmitted Y is less than the number of CBGs X, the HARQ-ACKs for the transport block may include (X-Y) NACKs and Y HARQ-ACKs for the Y CBGs. Furthermore, in the retransmission of the transport block, the HARQ-ACKs for the transport block may include X HARQ-ACKs in a case that the number of CBGs to be retransmitted Y is equal to the number of CBGs X.

In addition, in S1340, the terminal apparatus 1 may generate a HARQ-ACK 1306 instead of generating the HARQ-ACK 1305. The HARQ-ACK 1306 is a HARQ-ACK for the retransmission of the CBG of the transport block 1301. The HARQ-ACK 1306 is a HARQ-ACK for the transport block in the retransmission of the transport block. The HARQ-ACK 1306 is a HARQ-ACK generated for each CBG.

In the HARQ-ACK 1305 of S1340, the number of HARQ-ACKs Y based on the decoding of the CBGs is given by the information indicating the transmission of the CBG. Namely, in the HARQ-ACK 1305, HARQ-ACKs corresponding to the actually retransmitted CBGs are given based on the result of decoding the CBGs (an ACK or a NACK). Furthermore, in the HARQ-ACK 1305 of S1340, the terminal apparatus 1 generates NACKs for all CBGs of which retransmissions are not indicated. In other words, in the HARQ-ACK 1305 of S1340, for a HARQ-ACK (0) corresponding to the CBG #1, the NACK is generated regardless of the result of decoding the CBG #1 (the ACK or the NACK) transmitted immediately before in S1310 and a NACK is generated.

In the HARQ-ACK 1306 of S1340, the HARQ-ACK for the CBG including a code block is given based on the result of the decoding CBG data most recently received (the ACK or the NACK). In the HARQ-ACK 1306 of S1340, the NACK may be generated as a HARQ-ACK for the CBG including no code block. Here, the number of HARQ-ACKs based on the result of decoding the received CBG data may be the number of CBGs that include the code block at the time of the initial transmission.

That is, in the retransmission of the transport block, the HARQ-ACK for the CBG of which transmission is not indicated by the information indicating the transmission of the CBG may be given based on whether the decoding of the CBG has already been successfully completed.

That is, in S1340, the HARQ-ACK for the CBG #1 of which transmission is not indicated by the information indicating the transmission of the CBG may be given based on whether the decoding of the CBG #1 has already been successfully completed. Also, in S1340, the NACK may be generated as a HARQ-ACK for the CBG #4 regardless of whether the CBG #4 including no code block has successfully been successfully decoded.

In a case that no code block is included in the CBG of which transmission is not indicated by the information indicating the transmission of the CBG, the decoding of the CBG may be considered not to have been completed.

In the CBG retransmission 1304 of the transport block 1301, even in a case that the CBG #1 is not retransmitted, the HARQ-ACK for the CBG #1 may be given based on the result of decoding the data of the CBG #1 most recently received (the ACK or the NACK). Here, the data of the CBG #1 most recently received is transmitted in the initial transmission 1302 of the transport block 1301. Namely, the HARQ-ACK (0) in 1303 and the HARQ-ACK (0) in 1306 may be the same. For example, in a case that the HARQ-ACK (0) for the CBG #1 is an ACK in 1303, an ACK may be generated for the HARQ-ACK (0) in 1306. Also, for example, in a case that the HARQ-ACK (0) for the CBG #1 is a NACK in 1303, a NACK may be generated for the HARQ-ACK (0) in 1306.

Furthermore, in the CBG retransmission 1304 of the transport block 1301, the HARQ-ACK for the CBG #2 of which retransmission is indicated may be given based on the result of decoding the CBG #2 (the ACK or the NACK). Here, the result of decoding the CBG #2 is determined at least based on the CBG #2 transmitted in the initial transmission 1302 of the transport block 1301 and the CBG #2 transmitted in the CBG retransmission 1304 of the transport block 1301.

Furthermore, in the CBG retransmission 1304 of the transport block 1301, the HARQ-ACK for the CBG #3 of which retransmission is indicated may be given based on the result of decoding the CBG #3 (the ACK or the NACK). Here, the result of decoding the CBG #3 is determined at least based on the CBG #3 transmitted in the initial transmission 1302 of the transport block 1301 and the CBG #3 transmitted in the CBG retransmission 1304 of the transport block 1301.

Furthermore, in the CBG retransmission 1304 of the transport block 1301, the terminal apparatus 1 generates the NACK as a HARQ-ACK for the CBG #4 including no code block.

In other words, in the CBG retransmission (adaptive retransmission) of the transport block, the number of code blocks $N_{CB}$ included in the transport block for initial transmission is given by the transport block size for the initial transmission, and the number (maximum number) of CBGs X is indicated by the RRC information. In a case that the number of code blocks $N_{CB}$ is less than the number of CBGs X, (X-$N_{CB}$) NACKs and $N_{CB}$ HARQ-ACKs corresponding to $N_{CB}$ CBGs are generated as HARQ-ACKs for retransmission of the transport block. Namely, the HARQ-ACKs for retransmission of the transport block include (X-$N_{CB}$) NACKs and $N_{CB}$ HARQ-ACKs corresponding to $N_{CB}$ CBGs. For each of the $N_{CB}$ HARQ-ACKs corresponding to the $N_{CB}$ CBGs, an ACK or a NACK may be generated based on whether data of the CBG most recently received has been successfully decoded. The data of the CBG most recently received includes CBG data of the initial transmission and/or CBG data of the CBG retransmission. Furthermore, here, in the CBG retransmission (adaptive retransmission) of the transport block, the number of code blocks $N_{CB}$ included in the transport block for initial transmission is given by the transport block size for the initial transmission, and the number (maximum number) of CBGs X is indicated by the RRC information. In a case that the number of code blocks $N_{CB}$ is less than the number of CBGs X, $N_{CB}$ HARQ-ACKs corresponding to $N_{CB}$ CBGs and (X-NB) NACKs may be generated for the HARQ-ACKs for the retransmission of the transport block.

The HARQ-ACKs for the transport block may include X-$N_{CB}$ NACKs and $N_{CB}$ HARQ-ACKs corresponding to the $N_{CB}$ CBGs in a case that the number of code blocks $N_{CB}$ included in the transport block is less than the maximum number of CBGs X. The number of code blocks $N_{CB}$ may be given at least based on the transport block size. Each of the $N_{CB}$ code blocks may be included in $N_{CB}$ different CBGs. Transmission of the transport block may be an initial transmission. The X-$N_{CB}$ NACKs may be ACKs.

Furthermore, the HARQ-ACKs for the transport block may include X HARQ-ACKs regardless of the number of CBGs to be retransmitted Y in a case that the number of code blocks $N_{CB}$ included in the transport block is equal to or greater than the maximum number of CBGs X.

In addition, according to the present embodiment, the above-described two methods for generating HARQ-ACK for the CBG retransmission of the transport block may be applied even in a case that the number of code blocks $N_{CB}$ given based on the TBS of the initial transmission of the transport block is greater than the number of CBGs X.

In S1330, in the retransmission of the transport block, the number of code blocks $N_{CB}$ may be given based on the transport block size of the initial transmission.

In addition, in the retransmission of the transport block in S1330, in a case that the number of code blocks $N_{CB}$ included in the transport block is equal to or greater than the maximum number of CBGs X, the HARQ-ACK for the transport block may include X HARQ-ACKs corresponding to X CBGs.

(S1340) The terminal apparatus 1 transmits, to the base station apparatus 3, either the HARQ-ACK 1305 or the HARQ-ACK 1306 for the CBG retransmission of the transport block 1301. The transmission of either the HARQ-ACK 1305 or the HARQ-ACK 1306 may be determined based on higher layer signaling and/or description of a specification, or the like. The base station apparatus 3 determines whether to perform retransmission for any CBG based on the HARQ-ACK 1305 or the HARQ-ACK 1306 transmitted from the terminal apparatus 1.

Figure 14:
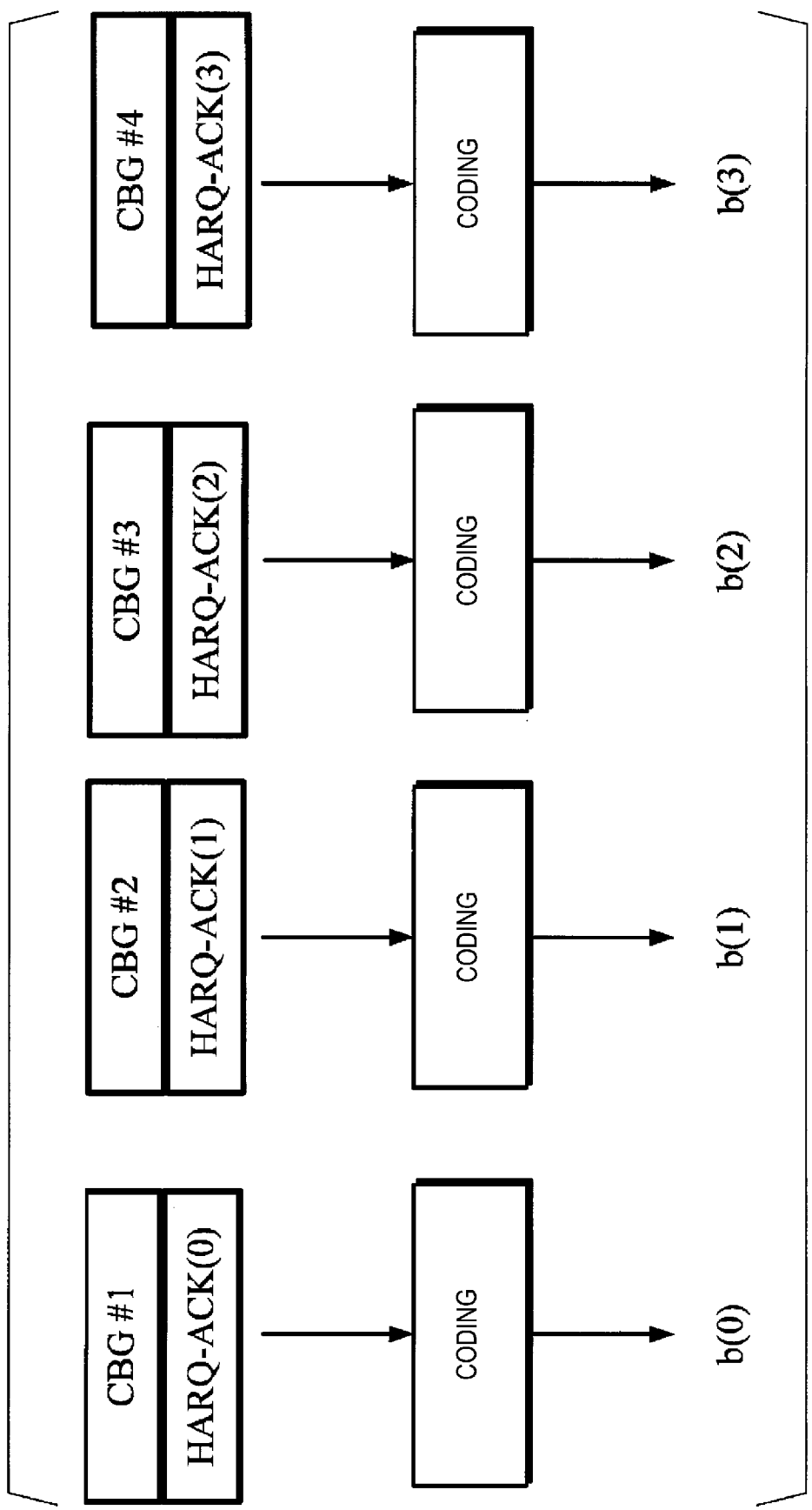
FIG. 14 is a diagram illustrating an example of coding HARQ-ACKs generated for each CBG to binary bits according to the present embodiment.

FIG. 14 is a diagram illustrating an example of encoding a HARQ-ACK generated for each CBG to binary bits according to the present embodiment. In FIG. 14, the number (maximum number) of CBGs X is indicated by the RRC information and may be 4. In other words, a binary bit corresponding to a HARQ-ACK is generated for each of the four CBGs (the CBG #1, the CBG #2, the CBG #3, and the CBG #4).

In the present embodiment, the HARQ-ACK is set to an ACK or a NACK. The terminal apparatus 1 encodes HARQ-ACK bits into binary bits. The terminal apparatus 1 encodes an ACK as a binary "1" and encodes a NACK as a binary "0". The terminal apparatus 1 encodes the HARQ-ACK bits generated for each CBG into binary bits.

The terminal apparatus 1 may determine the number of code blocks $N_{CB}$ included in the transport block based on the transport block size for initial transmission. In a case that the number of code blocks $N_{CB}$ determined by the transport block size is less than the number of CBGs X indicated by the RRC information, a binary bit of the HARQ-ACK corresponding to a CBG with an index greater than $N_{CB}$ may be set to a prescribed value. For example, the prescribed value may be 0 or 1.

For example, $N_{CB}$ is given to be 3 based on the transport block size. The binary bit of the HARQ-ACK corresponding to the index CBG #4 greater than 3 that is the number of code blocks may be set to a prescribed value. Namely, a binary bit b(3) of a HARQ-ACK (3) corresponding to the CBG #4 may be set to the prescribed value. Furthermore, for example, $N_{CB}$ is given to be 2 based on the transport block size. The binary bit of the HARQ-ACK corresponding to each of the indexes CBG #3 and CBG #4 greater than 2 that is the number of code blocks may be set to a prescribed value. Namely, each of b(2) and b(3) may be set to the prescribed value. In this way, the base station apparatus 3 can enhance tolerance of the overall HARQ-ACK binary bits to burst errors since the terminal apparatus 1 recognizes in advance that the binary bit of the HARQ-ACK corresponding to the CBG with an index greater than $N_{CB}$ is to be set to a prescribed value.

Figure 15:
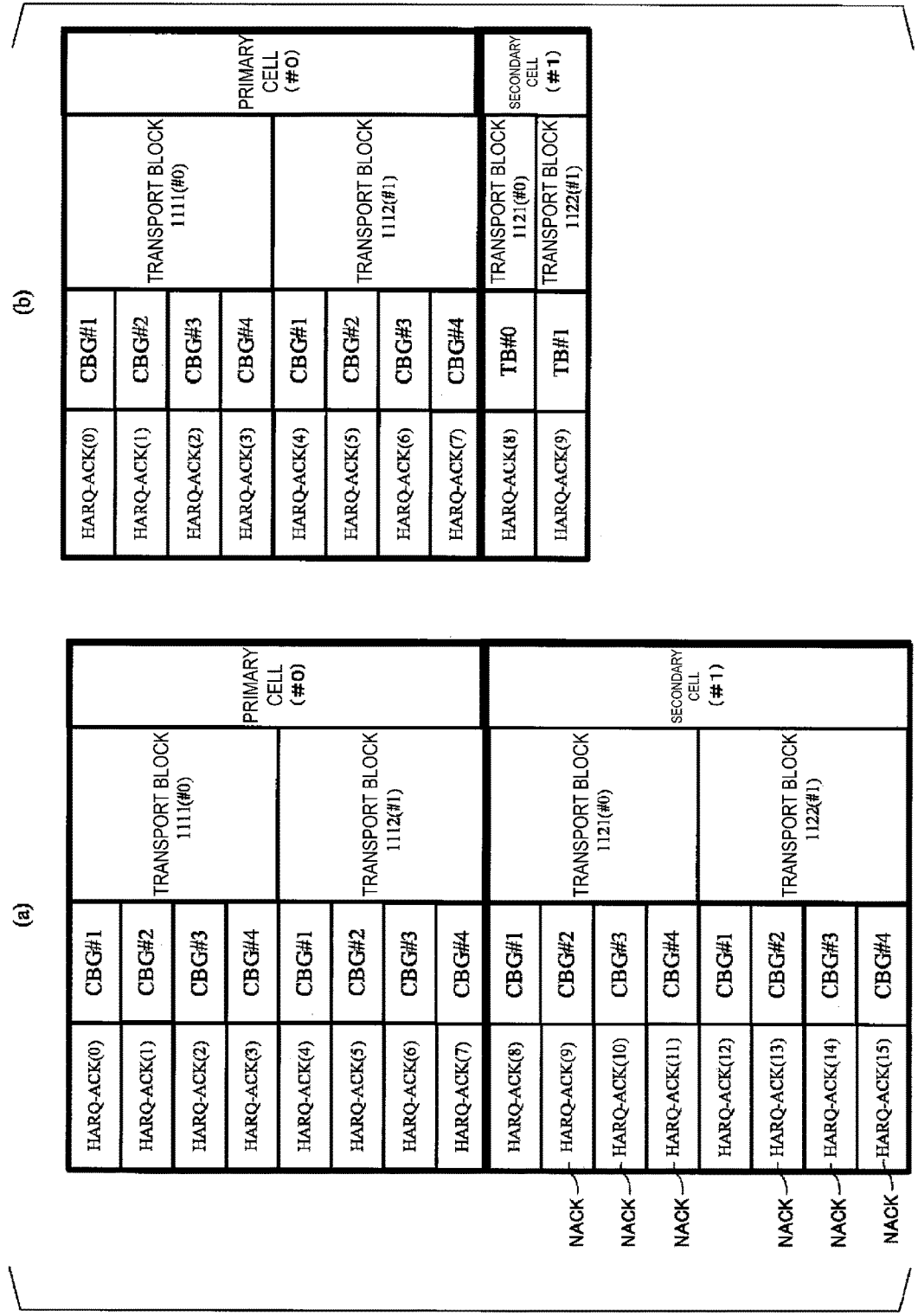
FIG. 15 is a diagram illustrating another example of the mapping of HARQ-ACKs (j), CBGs, and transport blocks according to the present embodiment.

In FIG. 11, since the RRC parameter cbgTransmission is configured for each of the primary cell and the secondary cell, the terminal apparatus 1 generates a HARQ-ACK for each CBG in the primary cell and the secondary cell (i.e., each of the serving cells). As described above, in the serving cell in which the RRC parameter cbgTransmission is configured, the downlink control information may indicate generation of the HARQ-ACK for each transport block. For example, in the slot 1101, the base station apparatus 3 transmits the PDSCH 1120 in the secondary cell and causes the PDSCH 1120 to indicate the HARQ-ACK for each transport block. In this case, the mapping between the HARQ-ACKs generated, the CBGs, and the transport blocks may be illustrated as in FIG. 15(*a*). FIG. 15 is a diagram illustrating another example of the mapping of the HARQ-ACKs (j), the CBGs, and transport blocks according to the present embodiment. At this time, in the secondary cell, a HARQ-ACK (8) corresponds to a transport block 1121 included in the PDSCH 1120, and a HARQ-ACK (12) corresponds to a transport block 1122 included in the PDSCH 1120. In other words, for the HARQ-ACK (8), an ACK or a NACK may be generated based on whether the transport block 1121 has been successfully decoded. For the HARQ-ACK (12), an ACK or a NACK may be generated based on whether the transport block 1122 has been successfully decoded. The terminal apparatus 1 generates a NACK for a HARQ-ACK (9), a HARQ-ACK (10), a HARQ-ACK (11), a HARQ-ACK (13), a HARQ-ACK (14), and a HARQ-ACK (15).

Namely, in the serving cell in which the RRC parameter cbgTransmission is configured, in a case that the serving cell supports one transport block and indicates generation of a HARQ-ACK for each transport block using the PDCCH, the terminal apparatus 1 may generate a prescribed number of NACKs. Here, the prescribed number may be X−1. For one HARQ-ACK, an ACK or a NACK may be generated based on whether the received transport block has been successfully decoded. In other words, the HARQ-ACKs for the transport block may include X−1 NACKs and one HARQ-ACK corresponding to one transport block. The terminal apparatus 1 encodes an ACK as a binary "1" and encodes a NACK as a binary "0". Namely, in the serving cell in which the RRC parameter cbgTransmission is configured, in a case that the number of CBGs X for the serving cell is indicated by the RRC information, and the serving cell supports one transport block and indicates generation of a HARQ-ACK for each transport block using the PDCCH, the terminal apparatus 1 may generate a prescribed number of binary "0s". Here, the prescribed number may be X−1.

Furthermore, in the serving cell in which the RRC parameter cbgTransmission is configured, in a case that the serving cell supports the two transport blocks, the two transport blocks are received on the PDSCH of a certain slot, and generation of a HARQ-ACK for each transport block is indicated using the PDCCH, the terminal apparatus 1 may generate a prescribed number of NACKs. Here, the prescribed number may be 2(X−1). For each of the two HARQ-ACKs, an ACK or a NACK may be generated based on whether each of the transport blocks received has been successfully decoded. Namely, HARQ-ACKs corresponding to the PDSCH may include 2(X−1) NACKs and two HARQ-ACKs corresponding to the two transport blocks. The terminal apparatus 1 encodes an ACK as a binary "1" and encodes a NACK as a binary "0". Namely, in the serving cell in which the RRC parameter cbgTransmission is configured, in a case that the serving cell supports the two transport blocks, the two transport blocks are received on the PDSCH of a certain slot, and generation of a HARQ-ACK for each of the transport blocks is indicated using the PDCCH, the terminal apparatus 1 may generate a prescribed number of binary "0". Here, the prescribed number may be 2(X−1).

Furthermore, in the serving cell in which the RRC parameter cbgTransmission is configured, in a case that the serving cell supports the two transport blocks, only one transport block is received on the PDSCH of a certain slot, and generation of a HARQ-ACK for each transport block is indicated using the PDCCH, the terminal apparatus 1 may generate a prescribed number of NACKs. Here, the prescribed number may be 2X−1. For one HARQ-ACK, an ACK or a NACK may be generated based on whether the received transport block has been successfully decoded. Namely, the HARQ-ACKs corresponding to the PDSCH may include 2X−1 NACKs and one HARQ-ACK corresponding to the one transport block received. The terminal apparatus 1 encodes an ACK as a binary "1" and encodes a NACK as a binary "0". Namely, in the serving cell in which the RRC parameter cbgTransmission is configured, in a case that the serving cell supports the two transport blocks, only one transport block is received on the PDSCH of a certain slot, and generation of a HARQ-ACK for each of the transport blocks is indicated using the PDCCH, the terminal apparatus 1 may generate a prescribed number of binary "0". Here, the prescribed number may be 2X−1.

Furthermore, for example, the secondary cell configured for the terminal apparatus 1 is not configured in the RRC parameter cbgTransmission in FIG. 11. Namely, a HARQ-ACK corresponding to the PDSCH in the secondary cell is generated for each transport block. In this case, the mapping between the HARQ-ACKs generated, the CBGs, and the transport blocks may be illustrated as in FIG. 15(*b*). In the primary cell, the HARQ-ACK is generated for each of CBGs. In the secondary cell, the HARQ-ACK (8) corresponds to the transport block 1121 included in the PDSCH 1120, and the HARQ-ACK (9) corresponds to the transport block 1122 included in the PDSCH 1120. In other words, for the HARQ-ACK (8), an ACK or a NACK may be generated based on whether the transport block 1121 has been successfully decoded. For the HARQ-ACK (9), an ACK or a NACK may be generated based on whether the transport block 1122 has been successfully decoded.

In the present embodiment, spatial CBG HARQ-ACK bundling will be described below.

Whether or not spatial CBG HARQ-ACK bundling is applied to a certain serving cell may be indicated by RRC information. As in FIG. 10(b), suppose HARQ-ACK bits for a serving cell in which spatial CBG HARQ-ACK bundling is not applied are generated in a case that two transport blocks are received in the serving cell and the number of CBGs X is applied to each of the two transport blocks. In this case, the number of HARQ-ACKs for the serving cell is calculated according to (Number of received transport blocks*X bits), and may be generated by sequentially linking X HARQ-ACKs for the transport block number #0 and X HARQ-ACKs for the transport block number #1. In FIG. 10(b), the number of received transport blocks is 2. In a case that HARQ-ACK bundling is not applied, HARQ-ACKs for empty CBGs (CBGs including no code block) may each be generated as an NACK, and HARQ-ACKs for CBGs including a code block may each be generated as an ACK or a NACK, based on whether or not the CBGs have been successfully decoded.

Next, HARQ-ACK bits (Bundled HARQ-ACK) for a serving cell in which spatial CBG HARQ-ACK bundling is applied in a case that two transport blocks are received in the serving cell will be described.

Spatial CBG HARQ-ACK bundling may be performed for CBGs having the same index in the two transport blocks. In other words, a bundled HARQ-ACK for CBGs having a certain index is generated by spatially bundling two HARQ-ACK bits corresponding to the CBGs having the index included in each of the two transport blocks. Spatial bundling may be performed through logical AND operation of two HARQ-ACK bits.

Figure 16:
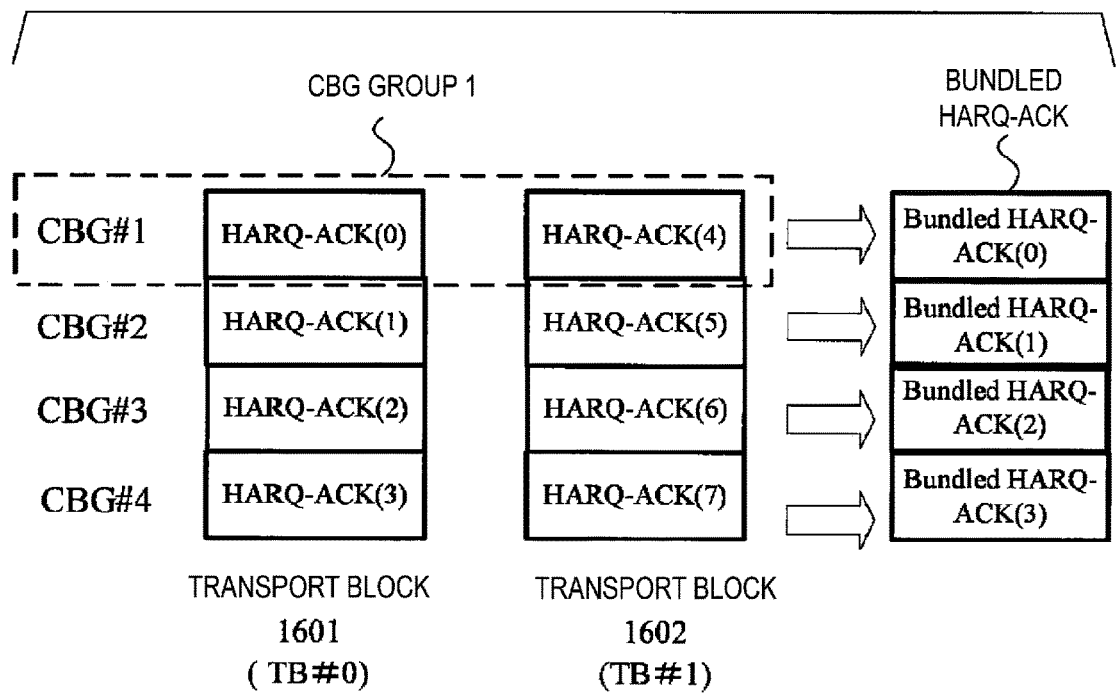
FIG. 16 is a diagram illustrating an example of generating HARQ-ACK bits in a serving cell in which spatial CBG HARQ-ACK bundling is applied according to the present embodiment.
Figure 16:
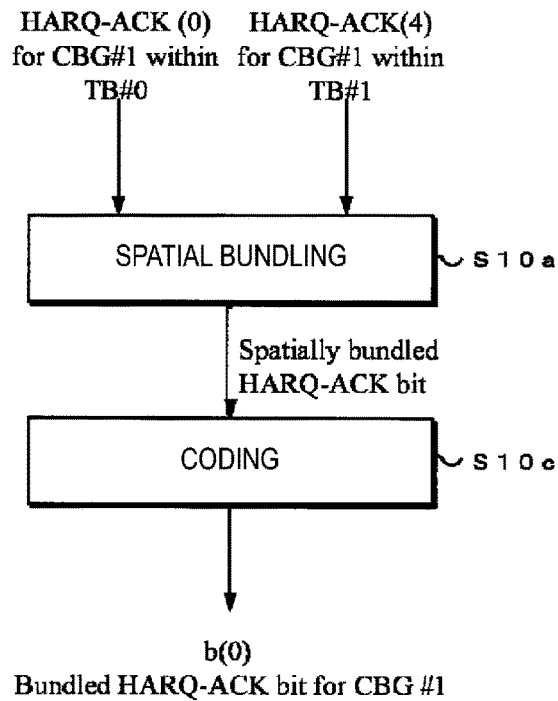

FIG. 16 is a diagram illustrating an example of generating HARQ-ACK bits for a serving cell in which spatial CBG HARQ-ACK bundling is applied in a case that two transport blocks (a transport block 1601 and a transport block 1602) are received in the serving cell. In FIG. 16, a value of X indicating the maximum number of CBGs for each transport block being 4 means that one transport block (each of the transport block 1601 and the transport block 1602) includes up to four CBGs. For each of the transport blocks, the CBGs may be assigned indices of a CBG #1, a CBG #2, a CBG #3, and a CBG #4. The transport block 1601 may be referred to as a first transport block. The transport block 1602 may be referred to as a second transport block.

The terminal apparatus 1 may generate a Bundled HARQ-ACK of X bits by using multiple CBGs having the same index. In FIG. 16(a), a bundled HARQ-ACK (0) for the CBG #1 is generated by spatially bundling a HARQ-ACK (0) corresponding to the CBG #1 of the transport block 1601 and a HARQ-ACK (4) corresponding to the CBG #1 of the transport block 1602. A bundled HARQ-ACK (1) for the CBG #2 is generated by spatially bundling a HARQ-ACK (1) corresponding to the CBG #2 of the transport block 1601 and a HARQ-ACK (5) corresponding to the CBG #2 of the transport block 1602. A bundled HARQ-ACK (2) for the CBG #3 is generated by spatially bundling a HARQ-ACK (2) corresponding to the CBG #3 of the transport block 1601 and a HARQ-ACK (6) corresponding to the CBG 1602 of the transport block #1. A bundled HARQ-ACK (3) for the CBG #4 is generated by spatially bundling a HARQ-ACK (3) corresponding to the CBG #4 of the transport block 1601 and a HARQ-ACK (7) corresponding to the CBG #4 of the transport block 1602. In other words, according to HARQ-ACK bundling, a total number of HARQ-ACK bits can be reduced by bundling two HARQ-ACK bits into one HARQ-ACK bit.

FIG. 16(b) is an example of generating a bundled HARQ-ACK for the CBG #1. For example, in S10a, the terminal apparatus 1 spatially bundles the HARQ-ACK (0) and the HARQ-ACK (4) to thereby generate a bundled HARQ-ACK bit for the CBG #1. In S10a, in a case that each of the two input HARQ-ACK bits is an ACK, the HARQ-ACK generated through spatial bundling is set to an ACK. In S10a, in a case that at least one of the two input HARQ-ACK bits is a NACK, the bundled HARQ-ACK generated through spatial bundling is set to a NACK. Further, in S10a, in a case that the two input HARQ-ACK bits are an ACK and a DTX, the bundled HARQ-ACK generated through spatial bundling is set to an ACK. Further, in S10a, in a case that the two input HARQ-ACK bits are a NACK and a DTX, the HARQ-ACK generated through spatial bundling is set to a NACK.

The multiple CBGs bundled into a HARQ-ACK bit corresponding to one bundled HARQ-ACK may be referred to as a CBG group. In other words, a HARQ-ACK bit of a HARQ-ACK corresponding to each of the CBGs belonging to a CBG group may be bundled into (generated as) a HARQ-ACK bit of one bundled HARQ-ACK. In other words, one HARQ-ACK bit may be generated for each CBG group. Note that the size of a CBG group may correspond to the number of CBGs belonging to the CBG group. The size of a CBG group may be indicated by RRC information. In FIG. 16(a), the size of each CBG group is 2. For example, in FIG. 16(a), the CBG #1 of the transport block 1601 and the CBG #1 of the transport block 1602 belong to CBG group 1. Two CBG HARQ-ACKs corresponding to the CBG #1 of the transport block 1601 and the CBG #1 of the transport block 1602 may be bundled into the bundled HARQ-ACK (0). In FIG. 16(a), the CBG #2 of the transport block 1601 and the CBG #2 of the transport block 1602 may belong to CBG group 2. The CBG #3 of the transport block 1601 and the CBG #3 of the transport block 1602 may belong to CBG group 3. The CBG #4 of the transport block 1601 and the CBG #4 of the transport block 1602 may belong to CBG group 4.

Figure 17:
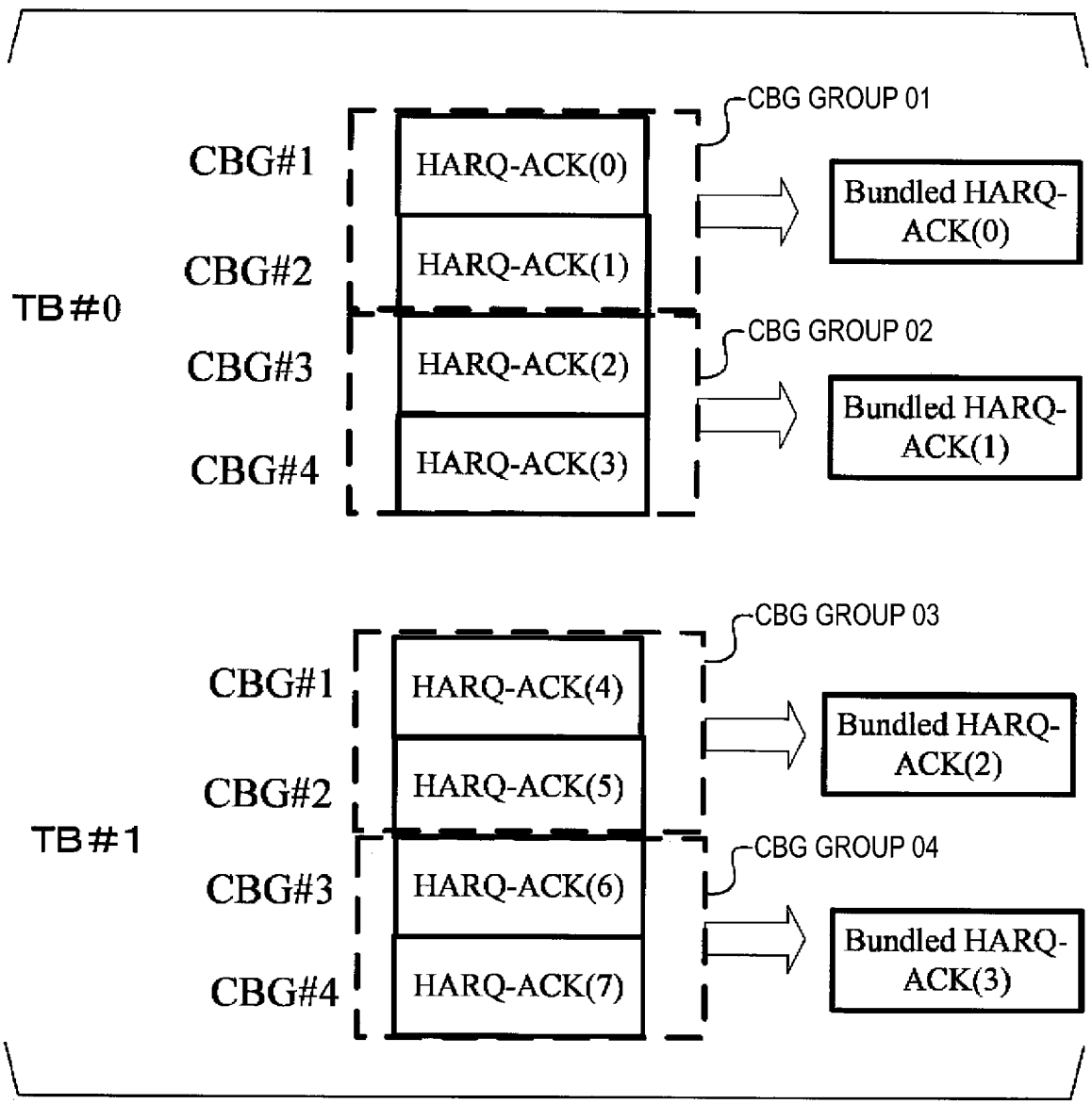
FIG. 17 is a diagram illustrating an example in which HARQ-ACK bundling is performed for CBGs corresponding to one transport block according to the present embodiment.

Further, spatial CBG HARQ-ACK bundling may be performed for multiple CBGs for one transport block. For example, FIG. 17 is a diagram illustrating an example in which HARQ-ACK bundling is performed for CBGs corresponding to one transport block according to the present embodiment. The terminal apparatus 1 may generate one Bundled HARQ-ACK for each CBG group for each of the transport blocks.

In FIG. 17, the CBGs are categorized into two CBG groups for the transport block #0 (TB #0). CBG group 01 includes the CBG #1 of the transport block #0 and the CBG #2 of the transport block #0. The bundled HARQ-ACK (0) may be generated by bundling the HARQ-ACK (0) corresponding to the CBG #1 of the transport block #0 and the HARQ-ACK (1) corresponding to the CBG #2 of the transport block #0. CBG group 02 includes the CBG #3 of the transport block #0 and the CBG #4 of the transport block #0. The bundled HARQ-ACK (1) may be generated by bundling the HARQ-ACK (2) corresponding to the CBG #3 of the transport block #0 and the HARQ-ACK (3) corresponding to the CBG #4 of the transport block #0. Further, in FIG. 17, the CBGs are categorized into two CBG groups for the transport block #1 (TB #1). CBG group 03 includes the CBG #1 of the transport block #1 and the CBG #2 of the transport block #1. The bundled HARQ-ACK (2) may be generated by bundling the HARQ-ACK (4) corresponding to the CBG #1 of the transport block #1 and the HARQ-ACK (5) corresponding to the CBG #2 of the transport block #1. CBG group 04 includes the CBG #3 of the transport block #1 and the CBG #4 of the transport block #1. The bundled HARQ-ACK (3) may be generated by bundling the HARQ-ACK (6) corresponding to the CBG #3 of the transport block #1 and the HARQ-ACK (7) corresponding to the CBG #4 of the transport block #1.

Figure 18:
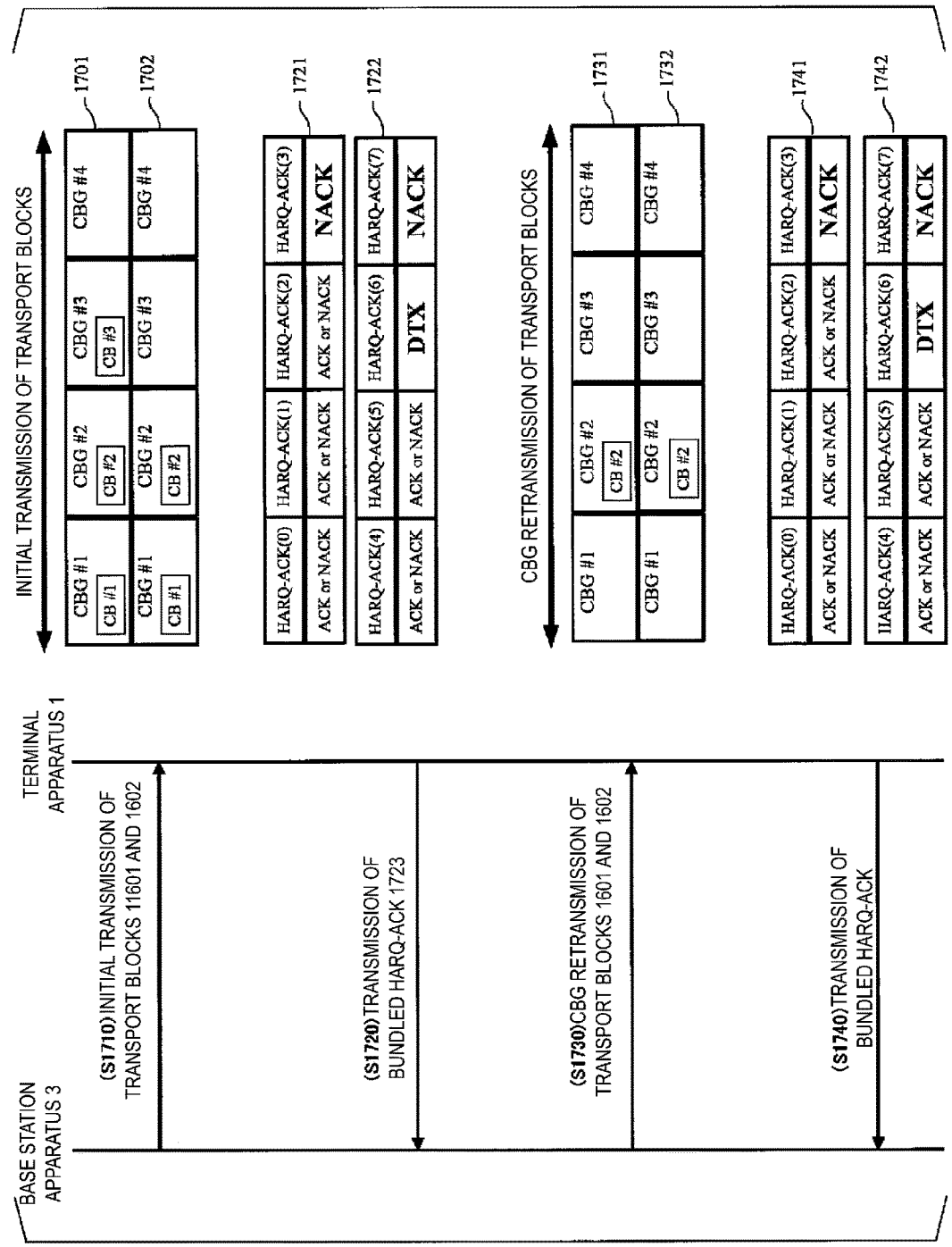
FIG. 18 is a diagram illustrating an example related to generation of HARQ-ACKs corresponding to transmission of transport blocks according to the present embodiment.

Next, generation of a HARQ-ACK for each of the CBGs of transport blocks in a case that two transport blocks are received in a serving cell in which spatial CBG HARQ-ACK bundling is applied will be described. The HARQ-ACK is used to generate a bundled HARQ-ACK. FIG. 18 is a diagram illustrating an example related to generation of HARQ-ACKs corresponding to transmission of transport blocks in FIG. 16.

Next, generation of HARQ-ACKs for empty CBGs in a CBG group will be described.

(S1710) The base station apparatus 3 performs initial transmission for the transport blocks 1601 and 1602 in FIG. 16 with respect to the terminal apparatus 1. The terminal apparatus 1 performs demodulation processing, decoding processing, and the like of the transport blocks 1601 and 1602 received. The number of code blocks $N_{CB}$ included in initial transmission 1701 of the transport block 1601 is 3. The number of code blocks $N_{CB}$ included in initial transmission 1702 of the transport block 1602 is 2. In other words, in 1701, each of the CBG #1, the CBG #2, and the CBG #3 includes one code block. In 1701, the CBG #4 includes no code block. In 1702, each of the CBG #1 and the CBG #2 includes one code block. In 1702, the CBG #3 and the CBG #4 include no code block. A CBG including no code block may be referred to as an Empty CBG. A CBG including a code block may be referred to as a Non-empty CBG. In other words, in a case that the number of code blocks $N_{CB}$ is less than the number of CBGs X for a certain transport block, the number of CBGs including a code block is $N_{CB}$, and the number of CBGs including no code block is $(X-N_{CB})$. In other words, the number of CBGs including no code block may be given based on a transport block size for initial transmission.

Next, the terminal apparatus 1 may attempt to decode the transport blocks 1701 and 1702 received. Then, the terminal apparatus 1 may generate HARQ-ACKs 1721 for 1701 and HARQ-ACKs 1722 for 1702. For the HARQ-ACK for the CBG including the code block, an ACK or a NACK may be generated based on whether the CBG has been successfully decoded. For each of the HARQ-ACKs for the CBG #1, CBG #2, and CBG #3 in 1701, the ACK or the NACK is generated based on whether each of the CBGs has been successfully decoded. For each of the HARQ-ACKs for the CBG #1 and CBG #2 in 1702, the ACK or the NACK is generated based on whether each of the CBGs has been successfully decoded.

Further, the terminal apparatus 1 may generate HARQ-ACKs for empty CBGs. A HARQ-ACK for an empty CBG belonging to a certain CBG group may be given based on whether or not a code block is included in other CBGs belonging to the CBG group.

For example, a HARQ-ACK for an empty CBG in a certain CBG group may be generated as a NACK in a case that a code block is not included in any of the other CBGs belonging to the CBG group. In other words, in a case that all the CBGs included in a CBG group are empty CBGs, a NACK may be generated for each of the empty CBGs. In CBG group 04, both of the CBG #4 in 1701 and the CBG #4 in 1702 are empty CBGs. Thus, the terminal apparatus 1 may generate the HARQ-ACK (3) for the CBG #4 in 1701 as a NACK. The terminal apparatus 1 may generate the HARQ-ACK (7) for the CBG #4 in 1702 as a NACK.

Further, a HARQ-ACK for an empty CBG in a certain CBG group may not be generated as a NACK in a case that a code block is included in at least one CBG belonging to the CBG group. Further, a HARQ-ACK for an empty CBG in a certain CBG group may be generated as a DTX in a case that a code block is included in at least one CBG belonging to the CBG group. In other words, in a case that a CBG group includes at least one empty CBG and a CBG including at least one code block, a DTX may be generated for the at least one empty CBG. In CBG group 03, the CBG #3 in 1701 includes a code block, and the CBG #3 in 1702 includes no code block. In this case, the terminal apparatus 1 may generate the HARQ-ACK (6) in the HARQ-ACKs 1722 as a DTX.

(S1720) The terminal apparatus 1 transmits a bundled HARQ-ACK 1723 to the base station apparatus 3. The bundled HARQ-ACK 1723 is generated by spatially bundling the HARQ-ACKs 1721 and the HARQ-ACKs 1722. The base station apparatus 3 determines which CBG group is to be retransmitted, based on the HARQ-ACK 1723 received from the terminal apparatus 1.

(S1730) The base station apparatus 3 performs CBG retransmission 1731 of the transport block 1601 and CBG retransmission 1732 of the transport block 1602 with respect to the terminal apparatus 1. Here, the base station apparatus 3 notifies the terminal apparatus 1 that the CBG #2 in 1731 and the CBG #2 in 1732 are to be retransmitted. In other words, in 1731, the CBG #2 is a CBG whose code block is to be retransmitted. In 1731, the CBG #1 and the CBG #3 are CBGs that each includes a code block but has not been retransmitted. In 1731, the CBG #4 is a CBG including no code block. In 1732, the CBG #1 is a CBG that includes a code block but has not been retransmitted. In 1732, the CBG #1 is a CBG whose code block is to be retransmitted. In 1732, the CBG #3 and the CBG #4 are CBGs that each include no code block. A CBG including no code block may be referred to as an Empty CBG. The terminal apparatus 1 may attempt to decode the transport blocks 1731 and 1732 received. Then, the terminal apparatus 1 may generate HARQ-ACKs 1741 for 1731 and HARQ-ACKs 1742 for 1732.

A HARQ-ACK for a CBG whose code block is to be retransmitted may be generated as an ACK or a NACK, based on whether or not the CBG has been successfully decoded. In other words, each of the HARQ-ACKs for the CBG #2 in 1731 and the CBG #3 in 1732 may be generated as an ACK or a NACK, based on whether or not the CBG has been successfully decoded. In other words, each of the HARQ-ACK (1) in the HARQ-ACKs 1741 and the HARQ-ACK (5) in the HARQ-ACKs 1742 may be generated as an ACK or a NACK, based on the result of decoding the received CBG data.

Further, a HARQ-ACK for the CBG that includes a code block but has not been retransmitted may be given based on the result of decoding the received CBG data (an ACK or a NACK) in S1710. In other words, the HARQ-ACK (0) and the HARQ-ACK (2) in the HARQ-ACKs 1741 and the HARQ-ACK (4) in the HARQ-ACKs 1742 may be given based on the result of decoding the received CBG data (an ACK or a NACK) in S1710.

Further, in retransmission of the transport block, a HARQ-ACK for an empty CBG may be generated as a NACK in a case that a code block is not included in any of the other CBGs belonging to the CBG group including the empty CBG. In other words, the terminal apparatus 1 may generate the HARQ-ACK (3) in 1741 as a NACK. The terminal apparatus 1 may generate the HARQ-ACK (7) in 1742 as a NACK.

Further, in retransmission of the transport block, a HARQ-ACK for an empty CBG may be generated as a DTX in a case that a code block is included in a CBG belonging to the CBG group including the empty CBG, regardless of whether the code block included in the CBG is to be retransmitted or not. In other words, even in a case that a code block is not retransmitted in the CBG #3 in 1731 in CBG group 03 in CBG retransmission of the transport block, a HARQ-ACK for the CBG #3 in 1732 may be generated as a DTX. In other words, the HARQ-ACK (6) in the HARQ-ACKs 1742 may be generated as a DTX. Further, even in a case that a code block is not retransmitted in the CBG #3 in 1731 in CBG group 03 in CBG retransmission of the transport block, the HARQ-ACK (6) for the CBG #3 in 1732 may be generated as a the same HARQ-ACK response as the HARQ-ACK (2) in 1741. For example, in a case that the HARQ-ACK (2) in 1741 is a NACK, the HARQ-ACK (6) in 1742 may be generated as a NACK. Further, for example, in a case that the HARQ-ACK (2) in 1741 is an ACK, the HARQ-ACK (6) in 1742 may be generated as an ACK.

Further, for example, a HARQ-ACK for a first CBG including no code block may be given based on whether or not a code block is included in a second CBG. The first CBG and the second CBG belong to the same CBG group. In FIG. 16(*a*), the first CBG and the second CBG belonging to the same CBG group may have the same CBG index. The first CBG may correspond to the first transport block, and the second CBG may correspond to the second transport block. In FIG. 17, the first CBG and the second CBG belonging to the same CBG group may not have the same CBG index. In FIG. 17, a transport block corresponding to each of the first CBG and the second CBG belonging to the same CBG group may be the same transport block.

For example, in FIG. 16(*a*), a HARQ-ACK for the first CBG including no code block for the first transport block may be generated as a NACK in a case that a code block is not included in the second CBG for the second transport block. In other words, in this case, a HARQ-ACK corresponding to each of the first CBG and the second CBG may be generated as a NACK. Then, a bundled HARQ-ACK generated by spatially bundling the HARQ-ACKs corresponding to the first CBG and the second CBG may be a NACK.

Further, the HARQ-ACK for the first CBG including no code block for the first transport block may not be generated as a NACK or may be generated as a DTX in a case that a code block is included in the second CBG for the second transport block. The HARQ-ACK for the second CBG including at least one code block may be generated as an ACK or a NACK, based on whether the second CBG has been successfully decoded. In a case that the HARQ-ACK for the second CBG is an ACK, the HARQ-ACK generated by spatially bundling the HARQ-ACK of the first CBG and the HARQ-ACK of the second CBG may be an ACK. In a case that the HARQ-ACK for the second CBG is a NACK, the HARQ-ACK generated by spatially bundling the HARQ-ACK of the first CBG and the HARQ-ACK of the second CBG may be a NACK.

Further, for example, the HARQ-ACK for the first CBG including no code block for the first transport block may be generated as the same HARQ-ACK response as the HARQ-ACK for the second CBG in a case that a code block is included in the second CBG for the second transport block. The HARQ-ACK for the second CBG including at least one code block may be generated as an ACK or a NACK, based on whether the second CBG has been successfully decoded. In a case that the HARQ-ACK for the second CBG is an ACK, the HARQ-ACK for the first CBG may be generated as an ACK. Further, a HARQ-ACK generated by spatially bundling the HARQ-ACK of the first CBG and the HARQ-ACK of the second CBG may be an ACK. In a case that the HARQ-ACK for the second CBG is a NACK, the HARQ-ACK for the first CBG may be generated as a NACK. Further, a HARQ-ACK generated by spatially bundling the HARQ-ACK of the first CBG and the HARQ-ACK of the second CBG may be a NACK.

In FIG. 17, generation of a HARQ-ACK corresponding to each of the CBGs is performed in the same way as in the method of generating a HARQ-ACK corresponding to each of the CBGs in FIG. 16(*a*) and FIG. 18 described above, and is thus herein omitted.

In other words, in a serving cell in which spatial CBG HARQ-ACK bundling is not applied, the terminal apparatus 1 may generate a HARQ-ACK for the first CBG including no code block as a NACK. Further, in a serving cell in which spatial CBG HARQ-ACK bundling is applied, the terminal apparatus 1 may generate a NACK for each empty CBG in a case that all the CBGs included in a CBG group are empty CBGs, and may not generate a NACK for at least one empty CBG in a case that a CBG group includes at least one empty CBG and a CBG including at least one code block. One bundled HARQ-ACK is generated by spatially bundling HARQ-ACKs for the CBGs included in one CBG group.

Further, in the present embodiment, whether or not spatial CBG HARQ-ACK bundling is applied to CBGs included in one transport block may be determined based on a third prescribed value. For example, in a case that the third prescribed value exceeds a prescribed threshold, spatial CBG HARQ-ACK bundling may be applied to CBGs included in one transport block. Further, for example, in a case that the third prescribed value does not exceed the prescribed threshold, spatial CBG HARQ-ACK bundling may not be applied to CBGs included in one transport block. The third prescribed value may be given based on a total number of bits of a HARQ-ACK to be transmitted and/or the number of resource elements to be used for transmission of a HARQ-ACK. The prescribed threshold may be a parameter at least associated with a coding rate/resource utilization efficiency or the like. The prescribed threshold may be given based on the RRC information and/or description in specifications, etc.

Which of (A) bundling is performed for CBGs of two transport blocks or (B) bundling is performed for CBGs in one transport block is applied may be indicated by RRC information.

Determination of HARQ-ACK bits for a serving cell for the terminal apparatus 1 for which a higher layer parameter codebooksizeDetermination is configured in one aspect of the present embodiment will be described below.

The higher layer parameter codebooksizeDetermination is used to indicate that the terminal apparatus 1 determines a code block size of a HARQ-ACK at least based on (A) the number of configured serving cells and/or (B) the maximum number of CBGs X. The determination of HARQ-ACK bits (determination of the number of HARQ-ACK bits, determination of a payload size of a HARQ-ACK, determination of the number of reserved HARQ-ACK fields) is also referred to as determination of a codebook size of HARQ-ACKs. The HARQ-ACK bits include a link of HARQ-ACK bits for each of the serving cells. Determination of HARQ-ACK bits for a serving cell in which transmission of CBGs is configured will be described below.

In the serving cell in which transmission of CBGs is configured, the base station apparatus 3 transmits RRC information indicating the maximum number of CBGs X to the terminal apparatus 1. The maximum number of CBGs X may be individually configured based on the number of transport blocks received in a serving cell supporting transmission of up to two transport blocks. For example, in a case that only one transport block is received in a serving cell supporting transmission of up to two transport blocks, the base station apparatus 3 may transmit RRC information indicating the number of CBGs (maximum number of CBGs) X1 included in the transport block to the terminal apparatus 1. Further, in a case that two transport blocks are received in a serving cell supporting transmission of up to two transport blocks, the base station apparatus 3 may transmit RRC information indicating the number of CBGs (maximum number of CBGs) X2 included in each of the transport blocks to the terminal apparatus 1. Here, the value of X1 may be any one of 2, 4, 6, and 8. The value of X2 may be any one of 2 and 4.

In other words, the codebook size of HARQ-ACKs for the serving cell in which transmission of CBGs is configured for the terminal apparatus 1 in which the higher layer parameter [codebooksizeDetermination=cc] is configured may be determined at least based on (i) the number of transport blocks received in the serving cell, (ii) the number of CBGs X1 indicated by RRC information, (iii) the number of CBGs X2 indicated by RRC information, and (iv) the number of slots corresponding to the HARQ-ACKs that can be transmitted on the same physical channel PUCCH or PUSCH in the same slot.

Further, in the serving cell, the codebook size of HARQ-ACKs corresponding to a PDSCH in one slot may be determined at least based on (i) the number of transport blocks received in the serving cell, (ii) the number of CBGs X1 indicated by RRC information, and (iii) the number of CBGs X2 indicated by RRC information. Specifically, in the serving cell, a codebook size $N_{SIZE}$ of HARQ-ACKs corresponding to a PDSCH in one slot may be determined according to $N_{SIZE}=\max(X1, 2*X2)$. Here, max(value 1, value 2) is a function that returns the greater value of value 1 and value 2. * denotes multiplication. In other words, a HARQ-ACK codebook for the serving cell includes $N_{SIZE}$ HARQ-ACK information bits.

Figure 19:
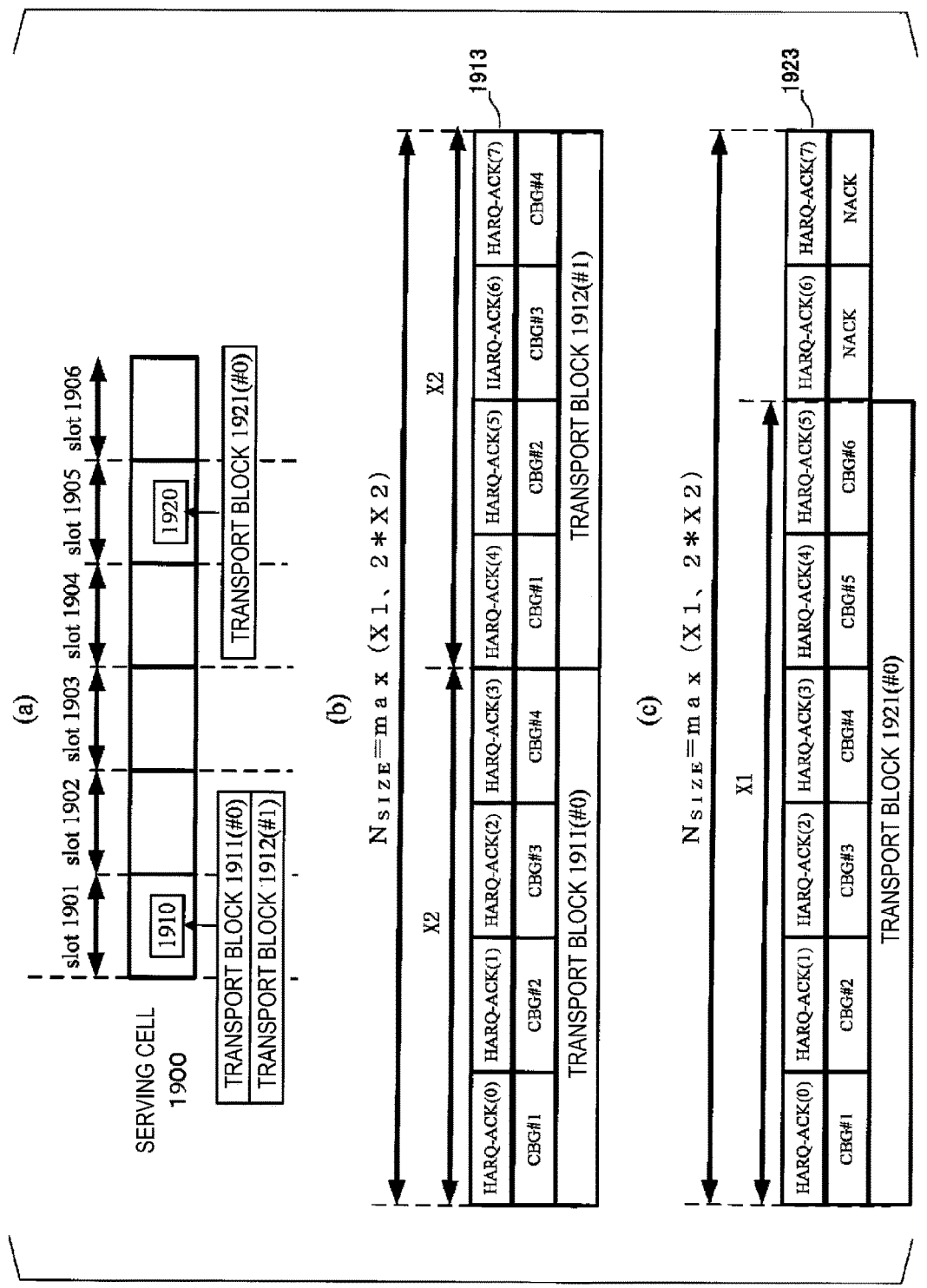
FIG. 19 is a diagram illustrating an example of determination of a HARQ-ACK codebook for a serving cell according to the present embodiment.

FIG. 19 is a diagram illustrating an example of determination of a HARQ-ACK codebook for a serving cell according to the present embodiment. In FIG. 19, in a serving cell 1900 configured for the terminal apparatus 1, transmission of CBGs is configured, and up to two transport blocks are supported. For the serving cell 1900, the value of X1 may be configured to be 6, and the value of X2 may be configured to be 4. The HARQ-ACK codebook $N_{SIZE}$ for the serving cell 1900 may be determined according to $N_{SIZE}=\max(6, 2*4)$, hence 8. In other words, the HARQ-ACK codebook for the serving cell includes 8 HARQ-ACK information bits. This prevents occurrence of a problem of a mismatch between the terminal apparatus 1 and the base station apparatus 3 with respect to the size of a HARQ-ACK code block for the serving cell.

The base station apparatus 3 transmits a PDSCH 1910 in a slot 1901. The PDSCH 1910 includes two transport blocks 1911 and 1912. The terminal apparatus 1 may generate HARQ-ACKs 1913 corresponding to the PDSCH 1910, and may transmit the generated HARQ-ACKs 1913 to the base station apparatus 3. Here, the HARQ-ACKs 1913 include $N_{SIZE}=8$ HARQ-ACK information bits. The terminal apparatus 1 generates an ACK or a NACK for each corresponding HARQ-ACK, based on whether each of the CBGs included in the received transport blocks 1911 and 1912 has been successfully decoded. Here, X1 HARQ-ACKs corresponding to each transport block may be given according to the method described above in the present embodiment.

Further, the base station apparatus 3 transmits a PDSCH 1920 in a slot 1905. The PDSCH 1920 includes one transport block 1921. The terminal apparatus 1 may generate HARQ-ACKs 1923 corresponding to the PDSCH 1920, and may transmit the generated HARQ-ACKs 1923 to the base station apparatus 3. Here, the HARQ-ACKs 1923 include $N_{SIZE}=8$ HARQ-ACK information bits. The terminal apparatus 1 generates an ACK or a NACK for each corresponding HARQ-ACK, based on whether each of the CBGs included in the received transport block 1921 has been successfully decoded. Further, the terminal apparatus 1 may generate a NACK for each of the ($N_{SIZE}-X1$) HARQ-ACKs not corresponding to the transport block 1921. In other words, the HARQ-ACKs 1923 may include six HARQ-ACKs and two NACKs.

In other words, in a case that only one transport block is received on a PDSCH in the serving cell 1900 and the maximum number of CBGs X1 is less than $N_{SIZE}$, X1 HARQ-ACKs and ($N_{SIZE}-X1$) NACKs are generated as the HARQ-ACKs corresponding to the PDSCH. In other words, in this case, the HARQ-ACKs corresponding to the PDSCH include the X1 HARQ-ACKs and the ($N_{SIZE}-X1$) NACKs. Further, in a case that only one transport block is received on a PDSCH in the serving cell 1900 and the maximum number of CBGs X1 is equal to $N_{SIZE}$, X1 HARQ-ACKs are generated as the HARQ-ACKs corresponding to the PDSCH.

Further, in a case that two transport blocks are received on a PDSCH in the serving cell 1900 and twice the maximum number of CBGs X2 is less than $N_{SIZE}$, (2*X2) HARQ-ACKs and ($N_{SIZE}-2*X2$) NACKs are generated as the HARQ-ACKs corresponding to the PDSCH. In other words, the HARQ-ACKs corresponding to the PDSCH include the (2*X2) HARQ-ACKs and the ($N_{SIZE}-2*X2$) NACKs. Further, in a case that two transport blocks are received on the PDSCH in the serving cell 1900 and twice the maximum number of CBGs X2 is equal to $N_{SIZE}$, (2*X2) HARQ-ACKs are generated as the HARQ-ACKs corresponding to the PDSCH.

Further, in a serving cell in which spatial CBG HARQ-ACK bundling is configured, a codebook size $N_{SIZE}$ of HARQ-ACKs corresponding to a PDSCH in one slot may be determined according to $N_{SIZE}=\max(X1, X2)$.

In other words, in a case that only one transport block is received on a PDSCH in the serving cell in which spatial CBG HARQ-ACK bundling is configured and the maximum number of CBGs X1 is less than $N_{SIZE}$, X1 HARQ-ACKs and ($N_{SIZE}-X1$) NACKs are generated as the HARQ-ACKs corresponding to the PDSCH. In other words, in this case, the HARQ-ACKs corresponding to the PDSCH include the X1 HARQ-ACKs and the ($N_{SIZE}-X1$) NACKs.

Further, in a case that two transport blocks are received on a PDSCH in the serving cell in which spatial CBG HARQ-ACK bundling is configured and the maximum number of CBGs X2 is less than $N_{SIZE}$, X2 HARQ-ACKs and ($N_{SIZE}-X2$) NACKs are generated as the HARQ-ACKs corresponding to the PDSCH. In other words, the HARQ-ACKs corresponding to the PDSCH include the X2 HARQ-ACKs and the ($N_{SIZE}-X2$) NACKs.

Formats of a PUCCH according to the present embodiment will be described below.

At least five types of formats of a PUCCH may be given. PUCCH format 0 is a format of a PUCCH on which UCI is transmitted through selection of a sequence. In PUCCH format 0, a set of sequences for PUCCH format 0 is defined. The set of sequences for PUCCH format 0 includes one or multiple sequences for PUCCH format 0. One sequence for PUCCH format 0 is selected among the one or multiple sequences for PUCCH format 0, at least based on a block of bits. The selected sequence for PUCCH format 0 is mapped to the uplink physical channel and is transmitted. The block of bits may be given based on UCI. The block of bits may correspond to UCI. In PUCCH format 0, the number of bits $M_{bit}$ of the block of bits may be less than 3. In PUCCH format 0, the number of OFDM symbols of the PUCCH may be 1 or 2.

The selected sequence for PUCCH format 0 may be multiplied by a prescribed power reduction factor (or an amplitude reduction factor). The selected sequence for PUCCH format 0 is mapped in ascending order with respect to k from a resource element (k, l) for PUCCH format 0. The prescribed power reduction factor is at least used for transmit power control. Here, k denotes an index in the frequency domain. l denotes an index in the time domain.

In other words, PUCCH format 0 may be used to transmit a HARQ-ACK of 1 bit or 2 bits and UCI including a scheduling request (if any). Information indicating a PUCCH resource used for PUCCH format 0 may include information of an RB index and a cyclic shift. In other words, different PUCCH resources may mean that either an RB index or a cyclic shift is different.

PUCCH format 1 is a format of a PUCCH on which UCI is transmitted through modulation of a sequence for PUCCH format 1. In a case that the number of bits $M_{bit}$ included in the block of bits is 1, the block of bits may be modulated with Binary Phase Shift Keying (BPSK), and a complex-valued modulation symbol d(0) may be generated. In a case that the number of bits $M_{bit}$ included in the block of bits is 2, the block of bits may be modulated with Quadrature Phase Shift Keying (QPSK), and a complex-valued modulation symbol d(0) may be generated. In PUCCH format 1, the number of bits $M_{bit}$ of the block of bits may be less than 3. In PUCCH format 1, the number of OFDM symbols of the PUCCH may be 4 or greater.

In other words, PUCCH format 1 may be used to transmit UCI including a HARQ-ACK of 1 bit or 2 bits and/or a scheduling request (if any).

PUCCH format 2 is a format of a PUCCH on which UCI is transmitted through modulation of a sequence for PUCCH format 2. Regarding the block of bits, an output sequence $z^{(p)}(n)$ for PUCCH format 2 may be generated based on being modulated, for example. In PUCCH format 2, regarding the number of bits $M_{bit}$ of the block of bits, $M_{bit}$ may be greater than 2. In PUCCH format 2, the number of OFDM symbols of the PUCCH may be 1 or 2.

PUCCH format 3 is a format of a PUCCH on which UCI is transmitted through modulation of a sequence for PUCCH format 3. Regarding the block of bits, an output sequence $z^{(p)}(n)$ for PUCCH format 3 may be generated based on being modulated, for example. In PUCCH format 3, the number of bits $M_{bit}$ of the block of bits may be greater than 2. In PUCCH format 3, the number of OFDM symbols of the PUCCH may be 4 or greater.

PUCCH format 4 is a format of a PUCCH on which UCI is transmitted through modulation of a sequence for PUCCH format 4. Regarding the block of bits, an output sequence $z^{(p)}(n)$ for PUCCH format 4 may be generated based on being modulated, for example. In PUCCH format 4, the number of bits $M_{bit}$ of the block of bits may be greater than 2. In PUCCH format 4, the number of OFDM symbols of the PUCCH may be 4 or greater. The number of bits for PUCCH format 4 may be less than the number of bits for PUCCH format 3. For example, the number of bits for PUCCH format 4 may be limited so as not to exceed a prescribed value V1. Further, In other words, PUCCH format 2, PUCCH format 3, and PUCCH format 4 are used to transmit UCI including a HARQ-ACK of 2 or more bits, a scheduling request (if any), and/or CSI (if any). In other words, UCI includes the number of bits that is greater than 2 bits.

Uplink transmit power control will be described below.

For a serving cell c, transmit power $P_{PUCCH}(i)$ of a PUCCH of a slot i may be given based on the following equation (1). Each of the elements included in equation (1) is expressed in decibel form.

$$P_{PUCCH}(i) = \min\begin{Bmatrix} P_{CMAXe}(i), \\ P_{0\_PUCCH} + PL_c(k) + 10\log_{10}(M_{PUCCH,c}(i)) + \\ \Delta_{F\_PUCCH}(F) + \Delta_{PUCCH\_TF,c}(i) + g(i) \end{Bmatrix}[dBm] \quad \text{Equation 1}$$

In other words, for the serving cell c, the transmit power $P_{PUCCH}(i)$ of a PUCCH of a slot i may be given at least based on a part or all of element A to element J: element A: maximum transmit power $P_{cMAX,c}$ configured in a slot i of a serving cell c; element B: P0_PUCCH given at least based on a higher layer parameter; element C: power correction value $PL_c$ based on an estimated value of path loss; element D: parameter $M_{PUCCH,c}(i)$ indicating a bandwidth of a PUCCH; element E: $\Delta_{F\_PUCCH}(F)$; element F: power offset parameter $\Delta_{PUCCH\_TF,c}(i)$ at least associated with the number of bits of UCI transmitted on a PUCCH, a type of UCI (for example, an SR, a HARQ-ACK, or CSI), a coding scheme, a modulation scheme/coding rate/resource utilization efficiency or the like; and element G: g(i).

$P_{CMAX,c}$ may indicate maximum transmit power of the terminal apparatus 1 configured in a slot i of a serving cell c.

$P_{0\_PUCCH}$ is a power offset value given at least based on higher layer signaling.

$PL_c$ may be an estimated value of downlink Path loss in a serving cell c. The estimated value of path loss may be given at least based on an SS/PBCH block and/or a CSI-RS.

$M_{PUCCH,c}$ is a parameter indicating a bandwidth of a PUCCH format transmitted on a PUCCH, and may be represented by the number of resource blocks.

$\Delta_{F\_PUCCH}(F)$ is given based on a higher layer parameter. F is a value used to identify a PUCCH format. In other words, $\Delta_{F\_PUCCH}(F)$ is given at least based on a PUCCH format. $\Delta_{F\_PUCCH}(F)$ may be given at least based on a PUCCH format and/or the number of symbols of a PUCCH for transmitting the PUCCH format.

The terminal apparatus 1 may set a value of g(i), based on equation (2). Note that g(i) is a parameter used to control and/or adjust transmit power of a PUCCH.

$$g(i)=g(i-1)+\delta_{PUCCH}(i-K_{PUCCH}) \quad \text{Equation 2}$$

Here, $\delta_{PUCCH}$ is a correction value, and is referred to as a TPC command. In other words, $\delta_{PUCCH}(i-K_{PUCCH})$ indicates a value accumulated in g(i-1). Further, $\delta_{PUCCH}(i-$ $K_{PUCCH}$) may be indicated based on a value set in a field of a TPC command for a PUCCH included in a downlink grant for a certain cell or a DCI format for the PUCCH that is received in a certain slot (i-$K_{PUCCH}$). The DCI format for the PUCCH is at least used to transmit a TPC command for the PUCCH. $K_{PUCCH}$ may be a value defined in advance.

For example, the value to which a field (information field of 2 bits) of a TPC command for a PUCCH included in a downlink grant or a DCI format for the PUCCH is set may be mapped to an accumulated correction value $\{-1, 0, 1, 3\}$. For example, a value to which a field (information field of 1 bit) of a TPC command for a PUCCH included in a DCI format for the PUCCH is set is mapped to an accumulated correction value $\{-1, 1\}$.

$\Delta_{PUCCH\_TF,c}(i)$ is a parameter indicating a power offset value at least associated with the number of bits of UCI transmitted on a PUCCH in a slot i, a type of UCI (for example, an SR, a HARQ-ACK, or CSI), a coding scheme, a modulation scheme/coding rate/resource utilization efficiency or the like. $\Delta_{PUCCH\_TF,c}$ may be given to be either $h(n_{CSI}, n_{HARQ}, n_{SR})$ or $\Delta_{TF,c}$, based on the number of bits of UCI transmitted on a PUCCH. For example, in a case that the number of bits of UCI transmitted on a PUCCH does not exceed a prescribed value V2, $\Delta_{PUCCH\_TF,c}(i)$ may be $h(n_{CSI}, n_{HARQ}, n_{SR})$. Further, in a case that the number of bits of UCI transmitted on a PUCCH exceeds the prescribed value V2, $\Delta_{PUCCH\_TF,c}(i)$ may be $\Delta_{TF,c}(i)$. In other words, in a case that UCI is transmitted using PUCCH format 0 and/or PUCCH format 1 on a PUCCH, transmit power of the PUCCH may be given at least based on $h(n_{CSI}, n_{HARQ}, n_{SR})$. Further, in a case that UCI is transmitted using PUCCH format 2/3/4 on a PUCCH, the terminal apparatus 1 may calculate a power offset value by using either $h(n_{CSI}, n_{HARQ}, n_{SR})$ or $\Delta_{TF,c}$, based on whether or not the number of bits of UCI transmitted using the PUCCH format exceeds the prescribed value V2.

$\Delta_{TF,c}(i)$ is used to indicate an offset value based on a modulation scheme/coding rate/resource utilization efficiency or the like. The terminal apparatus 1 calculates $\Delta_{TF,c}(i)$, based on the number of bits of UCI transmitted on a PUCCH, the number of resource elements for PUCCH transmission, or the like.

$h(n_{CSI}, n_{HARQ}, n_{SR})$ is a power offset value associated with the number of bits of UCI transmitted on a PUCCH. $n_{CSI}$ may indicate the number of bits of CSI included in a PUCCH to be transmitted. $n_{HARQ}$ is a value associated with the number of bits of a HARQ-ACK included in a PUCCH to be transmitted. $n_{SR}$ indicates the number of bits of an SR included in a PUCCH to be transmitted. $h(n_{CSI}, n_{HARQ}, n_{SR})$ is hereinafter also referred to as $h_{UCI}$. The terminal apparatus 1 calculates $h_{UCI}$, at least based on the number of bits of UCI transmitted on a PUCCH or the like. It is preferable that $h_{UCI}$ be given according to a method that varies depending on a PUCCH format. A function for giving $h(n_{CSI}, n_{HARQ}, n_{SR})$ for a certain PUCCH format may be individually configured at least based on a type of UCI transmitted on a PUCCH. For example, in a case that UCI transmitted on a PUCCH at least includes CSI, the function for giving $h_{UCI}$ may be a logarithm function at least based on a part or all of $n_{CSI}, n_{HARQ}$, and $n_{SR}$. Further, in a case that UCI transmitted on a PUCCH does not include CSI, the function for giving $h_{UCI}$ may be a linear function at least based on a part or all of $n_{HARQ}$ and $n_{SR}$.

A value of $n_{HARQ}$ used to calculate $h(n_{CSI}, n_{HARQ}, n_{SR})$ in the present embodiment will be described below. The value of $n_{HARQ}$ may be used to determine transmit power for transmission of a PUCCH including HARQ-ACKs corresponding to a PDSCH received in a slot i-k. The transmission of a PUCCH is performed in a slot i.

In the present embodiment, the value of $n_{HARQ}$ may be given at least based on a part or all of the following first element to the seventh element. In other words, the transmit power $P_{PUCCH},c(i)$ for transmission of a PUCCH including HARQ-ACKs may be given at least based on a part or all of the following first element to the sixth element.

First element: number of serving cells configured for the terminal apparatus 1

Second element: whether or not transmission of CBGs is configured for a serving cell Third element: maximum number of CBGs X per transport block for a serving cell in which transmission of CBGs is configured Fourth element: number of code blocks $N_{CB}$ included in a transport block received in a serving cell Fifth element: number of CBGs $N_{CBG\_ini}$ associated with a code block received in initial transmission of a transport block Sixth element: number of CBGs $N_{CBG\_re}$ associated with a code block received in retransmission of a transport block Seventh element: number of transport blocks received on a PDSCH in a serving cell The terminal apparatus 1 may calculate the value of $n_{HARQ}$, based on the following equation (3).

$$n_{HARQ} = \sum_{c=0}^{N^{DL}_{Cells}-1} N^{received}_c. \qquad \text{Equation 3}$$

In equation (3), $N^{DL}_{Cells}$ corresponds to the first element, and indicates the number of serving cells configured for the terminal apparatus 1. Further, $N^{received}_c$ in equation (3) is a value associated with a HARQ-ACK bit for a serving cell c. $N^{received}_c$ be given at least based on a part or all of the second element to the seventh element. The value of $n_{HARQ}$ may be given at least based on $N^{received}_c$. $N^{received}_c$ may be given as either (I) $N^{received}_c = N^{received\_TB}_c$ or (II) $N^{received}_c = N^{received\_CBG}_c$, based on the second element.

For example, in a serving cell c in which transmission of CBGs is not configured, $N^{received}_c$ may be $N^{received\_TB}_c$. $N^{received\_TB}_c$ may indicate (seventh element) the number of transport blocks received in the serving cell c, or the number of received SPS release PDCCHs. In a case that neither a transport block nor a downlink SPS release PDCCH is received in a slot i-k of the serving cell c, $N^{received\_TB}_c$ may be 0. The downlink SPS release PDCCH is a PDCCH including a CRC that is scrambled with a Semi-Persistent Scheduling C-RNTI (SPS C-RNTI). The SPS C-RNTI is an identifier that is unique to the terminal apparatus 1 and that is used for Semi-Persistent Scheduling. The SPS C-RNTI may be used for semi-persistently scheduled unicast transmission. Here, the semi-persistently scheduled transmission may include meaning of periodically scheduled transmission. Here, the downlink SPS release PDCCH may be used to release (clear) a downlink assignment configured for semi-persistent scheduling.

Further, for example, in the serving cell c in which transmission of CBGs is configured, $N^{received}_c$ may be $N^{received\_CBG}_c$. In a case that a transport block j is received in a slot i-k of the serving cell c, $N^{received\_CBG}_c$ is $N^{received\_CBG}_{c,j}$, and $N^{received\_CBG}_{c,j}$ may be given at least based on a part or all of the third element to the seventh element.

Here, the value of $N_{CB}$ corresponding to the fourth element may be determined based on the size of a transport block for initial transmission. The transport block is segmented into $N_{CB}$ code blocks.

$N_{CBG\_ini}$ corresponding to the fifth element may indicate the number of CBGs including at least one code block received in initial transmission of a transport block. The value of $N_{CBG\_ini}$ may be given based on the values of X and $N_{CB}$. The value of $N_{CBG\_ini}$ may be determined based on $N_{CBG\_ini}=\min(X, N_{CB})$. $\min(X, N_{CB})$ is a function that returns the smaller value of the values of X and $N_{CB}$. In other words, the value of $N_{CBG\_ini}$ may be given based on the smaller value of X and $N_{CB}$.

$N_{CBG\_re}$ corresponding to the sixth element may indicate the number of CBGs including at least one code block received in retransmission of a transport block. The value of $N_{CBG\_re}$ may be given based on a field (CBGTI) indicating retransmission information of CBGs included in a PDCCH for scheduling retransmission of a transport block. In other words, the CBGTI field may be used to indicate which CBG has actually been retransmitted. The value of $N_{CBG\_re}$ may be equal to $\min(X, N_{CB})$ or may be smaller than $\min(X, N_{CB})$.

Further, in a case that a downlink SPS release PDCCH is received in a slot i-k of the serving cell c in which transmission of CBGs is configured, $N^{received\_CBG}_c$ is $N^{received\_CBG}_{c,0}$, and $N^{received\_CBG}_{c,0}$ may indicate the maximum number of CBGs X per transport block indicated by RRC information. Here, the maximum number of CBGs X may be a maximum number of CBGs per transport block for PDSCH transmission for semi-persistent scheduling. Further, in a case that a downlink SPS release PDCCH is received in a slot i-k of the serving cell c in which transmission of CBGs is configured, $N^{received\_CBG}_c$ is $N^{received\_CBG}_{c,0}$, and $N^{received\_CBG}_{c,0}$ may be 1, regardless of the maximum number of CBGs X indicated by RRC information.

Further, in a case that neither a transport block nor a downlink SPS release PDCCH is received in a slot i-k of the serving cell c in which transmission of CBGs is configured, $N^{received\_CBG}_c$ may be 0.

With reference to FIG. 13, an example of determining a value of $n_{HARQ}(N^{received\_CBG}_c)$ used for setting of transmit power for transmission of a PUCCH including HARQ-ACKs will be described below.

As described above, in FIG. 13, the number (maximum number) of CBGs X is given to be 4 by the RRC information. In (S1310), the number of code blocks $N_{CB}$ included in the transport block 1301 is given based on the size of the transport block. The transport block size may be given by downlink control information. In FIG. 13, each of a CBG #1, a CBG #2, and a CBG #3 includes one code block. In other words, $N_{CB}$ is 3. In FIG. 13, a CBG #4 includes no code block. The terminal apparatus 1 may generate an ACK or a NACK as a HARQ-ACK for a CBG including a code block, based on whether or not a corresponding code block has been successfully decoded. The terminal apparatus 1 may generate the NACK as a HARQ-ACK for the CBG #4 including no code block.

In Step (S1320), the terminal apparatus 1 sets transmit power for transmission of a PUCCH including HARQ-ACKs 1303 for initial transmission of the transport block 1301. The terminal apparatus 1 performs transmission of the PUCCH to the base station apparatus 3 by using the set transmit power. Here, a power offset value $h(n_{CSI}, n_{HARQ}, n_{SR})$ used for setting of the transmit power for the transmission of the PUCCH may be given at least based on a value of $n_{HARQ}$. The value of $n_{HARQ}$ may be given at least based on the maximum number of CBGs X and/or the number of code blocks $N_{CB}$ included in the initial transmission of the transport block. In other words, the transmit power for the transmission of the PUCCH including HARQ-ACKs for the initial transmission of the transport block may be given at least based on the maximum number of CBGs X and/or the number of code blocks $N_{CB}$ included in the initial transmission of the transport block.

For example, in a case that the number of code blocks $N_{CB}$ included in the initial transmission of the transport block is smaller than the maximum number of CBGs X, the value of $n_{HARQ}$ may be given based on $N_{CB}$. In this case, each of the $N_{CB}$ code blocks may be included in $N_{CB}$ different CBGs. Here, the value of the number of CBGs $N_{CBG\_ini}$ including a code block is $N_{CB}$. In a case that $N_{CB}$ is smaller than the maximum number of CBGs X, the transmit power for the transmission of the PUCCH including HARQ-ACKs for the initial transmission of the transport block may be given at least based on the number of code blocks $N_{CB}$ included in the initial transmission of the transport block. In other words, in a case that $N_{CB}$ is smaller than the maximum number of CBGs X, the value of $n_{HARQ}$ may be given based on the value of $N_{CBG\_ini}$. In other words, in a case that $N_{CB}$ is smaller than the maximum number of CBGs X, the transmit power for the transmission of the PUCCH including HARQ-ACKs for the initial transmission of the transport block may be given at least based on the number of CBGs $N_{CBG\_ini}$ including a code block included in the initial transmission of the transport block.

Further, in a case that the number of code blocks $N_{CB}$ included in the initial transmission of the transport block is greater than the maximum number of CBGs X, the value of $n_{HARQ}$ may be given based on the maximum number of CBGs X. In this case, each of the X CBGs includes one or more code blocks. In other words, in a case that $N_{CB}$ is equal to or greater than the maximum number of CBGs X, the transmit power for the transmission of the PUCCH including HARQ-ACKs for the initial transmission of the transport block may be given at least based on the maximum number of CBGs X.

Further, in a case that the number of code blocks $N_{CB}$ included in the initial transmission of the transport block is equal to the maximum number of CBGs X, the value of $n_{HARQ}$ may be given based on the maximum number of CBGs X or the number of CBGs $N_{CBG\_ini}$ including a code block included in the initial transmission of the transport block. In this case, each of the X CBGs includes one code block. In other words, in a case that $N_{CB}$ is equal to the maximum number of CBGs X, the transmit power for the transmission of the PUCCH including HARQ-ACKs for the initial transmission of the transport block may be given at least based on the maximum number of CBGs X or the number of CBGs $N_{CBG\_ini}$ including a code block included in the initial transmission of the transport block.

In other words, the value of $n_{HARQ}$ may be given based on the values of the maximum number of CBGs X and $N_{CB}$. Further, the value of $n_{HARQ}$ may be determined based on $\min(X, N_{CB})$. $\min(X, N_{CB})$ is a function that returns the smaller value of the values of X and $N_{CB}$. In other words, the value of $n_{HARQ}$ may be given based on the smaller value of X and $N_{CB}$. In other words, the value of $n_{HARQ}$ may be given based on the number of CBGs $N_{CBG\_ini}$ including a code block received in the initial transmission of the transport block.

In other words, the transmit power for the transmission of the PUCCH including HARQ-ACKs for the initial transmission of the transport block may be given based on the values of the maximum number of CBGs X and $N_{CB}$. In other words, the transmit power for the transmission of the PUCCH including HARQ-ACKs for the initial transmission of the transport block may be given based on the number of CBGs $N_{CBG\_ini}$ including a code block received in the initial transmission of the transport block.

In Step (S1330), the base station apparatus 3 retransmits a CBG for a certain transport block 1301 to the terminal apparatus 1. The base station apparatus 3 notifies the terminal apparatus 1 of which CBG among the CBG #1, the CGB #2, and the CBG #3 is to be actually retransmitted based on information indicating transmission (retransmission) of the CBG (e.g., the CBGTI field). In other words, the number of CBGs $N_{CBG\_re}$ including at least one code block included in the retransmission of the transport block may be given based on the CBGTI field indicating retransmission information of the CBGs included in a PDCCH. In other words, the number of CBGs $N_{CBG\_re}$ to be retransmitted may be given based on the CBGTI field indicating retransmission information of the CBGs included in a PDCCH. In other words, the number of CBGs including at least one code block actually received in the retransmission of the transport block is $N_{CBG\_re}$. In FIG. 13, using the CBGTI field, the base station apparatus 3 notifies the terminal apparatus 1 that the CBG #2 and the CBG #3 are to be retransmitted. In other words, $N_{CBG\_re}$ is 2. The CBG #2 to be retransmitted includes the same code block as the CBG #2 of the initial transmission of the transport block. The CBG #3 to be retransmitted includes the same code block as the CBG #3 of the initial transmission of the transport block.

In Step (S1340), the terminal apparatus 1 sets transmit power for transmission of a PUCCH including HARQ-ACKs 1306 for retransmission of the transport block 1301. The terminal apparatus 1 performs transmission of the PUCCH to the base station apparatus 3 by using the set transmit power.

The value of $n_{HARQ}$ used for setting of the transmit power of the transmission of the PUCCH including HARQ-ACKs for the retransmission of the transport block will be described below.

The value of $n_{HARQ}$ used for setting of the transmit power of the transmission of the PUCCH including HARQ-ACKs for the retransmission of the transport block may be given at least based on the maximum number of CBGs X and/or the number of code blocks $N_{CB}$ included in the transport block, regardless of the number of CBGs to be retransmitted (the number of actually received CBGs) $N_{CBG\_re}$. In other words, the value of $n_{HARQ}$ used for setting of the transmit power of the transmission of the PUCCH including HARQ-ACKs for the retransmission of the transport block may be given based on the number of CBGs $N_{CBG\_ini}$ associated with a code block received in the initial transmission of the transport block.

Further, the transmit power for the transmission of the PUCCH including HARQ-ACKs for the retransmission of the transport block may be given at least based on the maximum number of CBGs X and/or the number of code blocks $N_{CB}$ included in the initial transmission of the transport block, regardless of the number of CBGs $N_{CBG\_re}$ to be retransmitted. In other words, the transmit power for the transmission of the PUCCH including HARQ-ACKs for the retransmission of the transport block may be given based on the number of CBGs $N_{CBG\_ini}$ associated with a code block received in the initial transmission of the transport block.

In FIG. 13, the number of CBGs $N_{CBG\_re}$ associated with a code block received in the retransmission of the transport block is 2. The number of CBGs $N_{CBG\_ini}$ associated with a code block received in the initial transmission of the transport block is 3. The value of $n_{HARQ}$ used for setting of the transmit power of the transmission of the PUCCH including HARQ-ACKs for the retransmission of the transport block may be given based on the number 3, which is the number of CBGs ($N_{CBG\_ini}$) associated with a code block received in the initial transmission of the transport block, regardless of the number 2, which is the number of CBGs ($N_{CBG\_re}$) associated with a code block received in the retransmission of the transport block. In this case, even in a case that $N_{CBG\_re}$ is smaller than $N_{CBG\_ini}$, the value of $n_{HARQ}$ may be given based on $N_{CBG\_ini}$. In other words, in a case that $N_{CBG\_re}$ is smaller than min(X, $N_{CB}$), the value of $n_{HARQ}$ used for setting of the transmit power of the transmission of the PUCCH including HARQ-ACKs for the retransmission of the transport block may be given based on the number of CBGs $N_{CBG\_ini}$ associated with a code block received in the initial transmission of the transport block. In other words, in a case that $N_{CBG\_re}$ is smaller than min(X, $N_{CB}$), the transmit power for the transmission of the PUCCH including HARQ-ACKs for the retransmission of the transport block may be given based on the number of CBGs $N_{CBG\_ini}$ associated with a code block received in the initial transmission of the transport block.

Further, in a case that $N_{CBG\_re}$ is equal to the maximum number of CBGs X, the value of $n_{HARQ}$ used for setting of the transmit power of the transmission of the PUCCH including HARQ-ACKs for the retransmission of the transport block may be given based on the number of CBGs $N_{CBG\_re}$ associated with a code block received in the retransmission of the transport block or the maximum number of CBGs X. In other words, in a case that $N_{CBG\_re}$ is equal to the maximum number of CBGs X, the transmit power for the transmission of the PUCCH including HARQ-ACKs for the retransmission of the transport block may be given at least based on the maximum number of CBGs X or the number of CBGs $N_{CBG\_ini}$ including a code block included in the retransmission of the transport block.

An apparatus configuration of the terminal apparatus 1 of the present invention will be described below.

Figure 20:
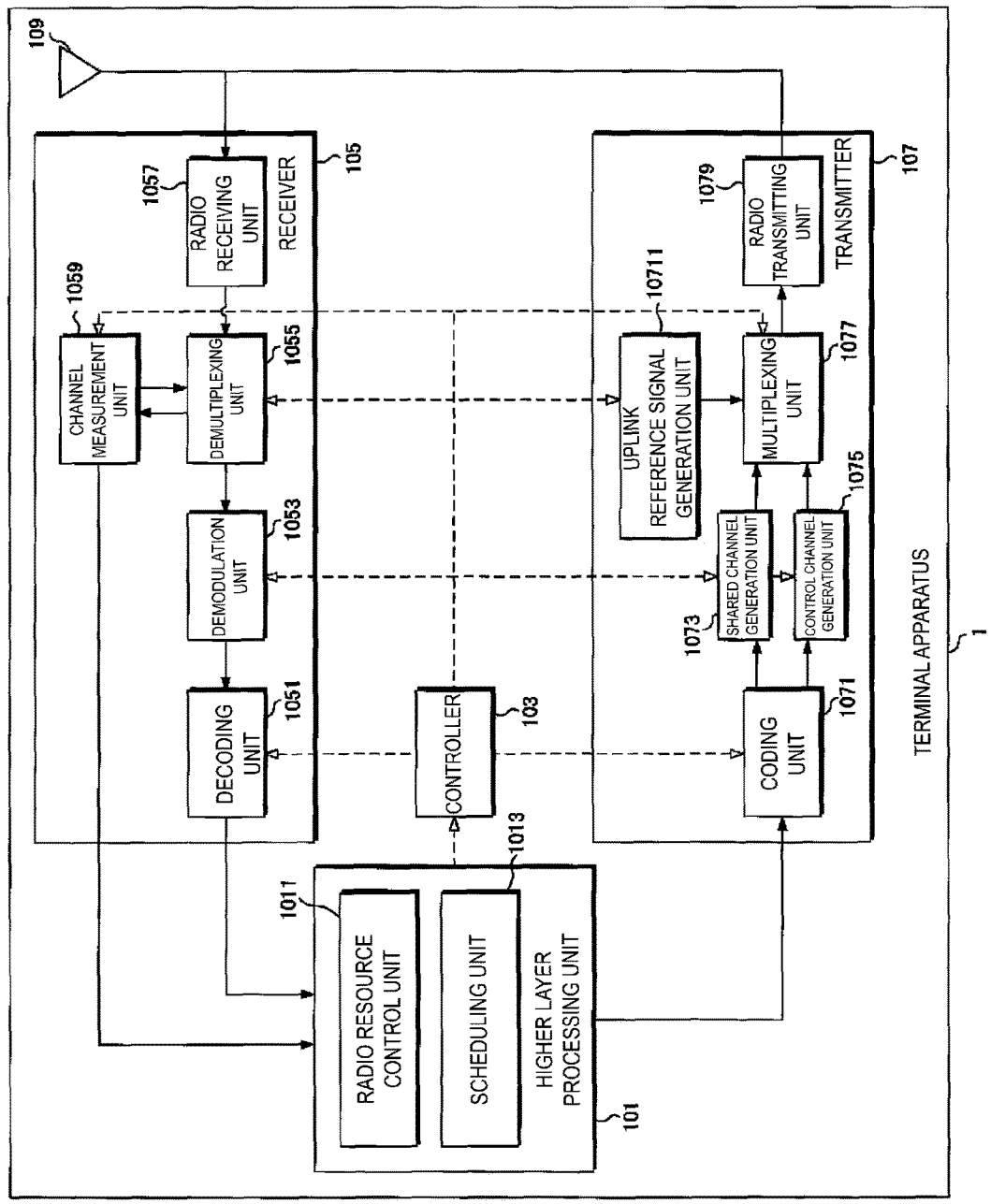
FIG. 20 is a schematic block diagram illustrating a configuration of a terminal apparatus 1 according to the present embodiment.

FIG. 20 is a schematic block diagram illustrating a configuration of the terminal apparatus 1 according to the present embodiment. As illustrated, the terminal apparatus 1 is configured to include at least one of a higher layer processing unit 101, a controller 103, a receiver 105, a transmitter 107, and a transmit and receive antenna 109. The higher layer processing unit 101 is configured to include at least one of a radio resource control unit 1011 and a scheduling unit 1013. The receiver 105 is configured to include at least one of a decoding unit 1051, a demodulation unit 1053, a demultiplexing unit 1055, a radio receiving unit 1057, and a channel measurement unit 1059. The transmitter 107 is configured to include at least one of a coding unit 1071, a shared channel generation unit 1073, a control channel generation unit 1075, a multiplexing unit 1077, a radio transmitting unit 1079, and an uplink reference signal generation unit 10711.

The higher layer processing unit 101 outputs uplink data generated through a user operation or the like to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates control information for control of the receiver 105 and the transmitter 107 based on downlink control information or the like received on a control channel and outputs the generated control information to the controller 103.

The radio resource control unit 1011 included in the higher layer processing unit 101 manages various kinds of configuration information of the terminal apparatus 1. For example, the radio resource control unit 1011 manages a configured serving cell. Furthermore, the radio resource control unit 1011 generates information to be mapped to each uplink channel, and outputs the generated information to the transmitter 107. In a case that the received downlink data is successfully decoded, the radio resource control unit 1011 generates an ACK and outputs the ACK to the transmitter 107, and in a case that decoding of the received downlink data is failed, the radio resource control unit 1011 generates a NACK and outputs the NACK to the transmitter 107.

The scheduling unit 1013 included in the higher layer processing unit 101 stores downlink control information received via the receiver 105. The scheduling unit 1013 controls the transmitter 107 via the controller 103 so as to transmit a PUSCH according to a received uplink grant in the fourth subsequent subframe from the subframe in which the uplink grant has been received. The scheduling unit 1013 controls the receiver 105 via the controller 103 so as to receive a shared channel according to a received downlink grant in the subframe in which the downlink grant has been received.

The controller 103 generates a control signal for control of the receiver 105 and the transmitter 107 based on the control information from the higher layer processing unit 101. The controller 103 outputs the generated control signal to the receiver 105 and the transmitter 107 to control the receiver 105 and the transmitter 107. Furthermore, the controller 103 may have a function of controlling transmit power. The controller 103 may output information related to the transmit power to the transmitter 107.

In accordance with the control signal input from the controller 103, the receiver 105 demultiplexes, demodulates, and decodes a reception signal received from the base station apparatus 3 through the transmit and receive antenna 109, and outputs information resulting from the decoding to the higher layer processing unit 101. The radio receiving unit 1057 orthogonally demodulates a downlink signal received via the transmit and receive antenna 109, and converts the orthogonally-demodulated analog signal to a digital signal. The radio receiving unit 1057, for example, may perform Fast Fourier Transform (FFT) on the digital signal and extract a signal of the frequency domain.

The demultiplexing unit 1055 demultiplexes the extracted signals into a control channel, a shared channel, and a reference signal channel, respectively. The demultiplexing unit 1055 outputs the separated reference signal channel to the channel measurement unit 1059.

The demodulation unit 1053 demodulates the control channel and the shared channel by using a modulation scheme such as QPSK, 16 Quadrature Amplitude Modulation (QAM), 64 QAM, and the like, and outputs the result of the demodulation to the decoding unit 1051.

The decoding unit 1051 decodes the downlink data and outputs, to the higher layer processing unit 101, the decoded downlink data. The channel measurement unit 1059 calculates a downlink channel estimate from the reference signal channel and outputs the calculation result to the demultiplexing unit 1055. The channel measurement unit 1059 calculates channel state information and outputs the channel state information to the higher layer processing unit 101.

The transmitter 107 generates an uplink reference signal channel in accordance with the control signal input from the controller 103, encodes and modulates the uplink data and uplink control information input from the higher layer processing unit 101, multiplexes the shared channel, the control channel, and the reference signal channel, and transmits a signal resulting from the multiplexing to the base station apparatus 3 through the transmit and receive antenna 109.

The coding unit 1071 encodes the uplink control information and uplink data input from the higher layer processing unit 101 and outputs the coded bits to the shared channel generation unit 1073 and/or the control channel generation unit 1075.

The shared channel generation unit 1073 may modulate the coded bits input from the coding unit 1071 to generate a modulation symbol, generate the shared channel by performing DFT on the modulation symbol and output the shared channel to the multiplexing unit 1077. The shared channel generation unit 1073 may modulate the coded bits input from the coding unit 1071 to generate a shared channel and output the shared channel to the multiplexing unit 1077.

The control channel generation unit 1075 generates a control channel based on the coded bits input from the coding unit 1071 and/or SR and outputs the generated control channel to the multiplexing unit 1077.

The uplink reference signal generation unit 10711 generates an uplink reference signal and outputs the generated uplink reference signal to the multiplexing unit 1077.

The multiplexing unit 1077 multiplexes a signal input from the shared channel generation unit 1073 and/or a signal input from the control channel generation unit 1075 and/or the uplink reference signal input from the uplink reference signal generation unit 10711 into an uplink resource element for each transmit antenna port according to the control signal input from the controller 103.

The radio transmitting unit 1079 performs Inverse Fast Fourier Transform (IFFT) on the multiplexed signal, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

An apparatus configuration of the base station apparatus 3 of the present invention will be described below.

Figure 21:
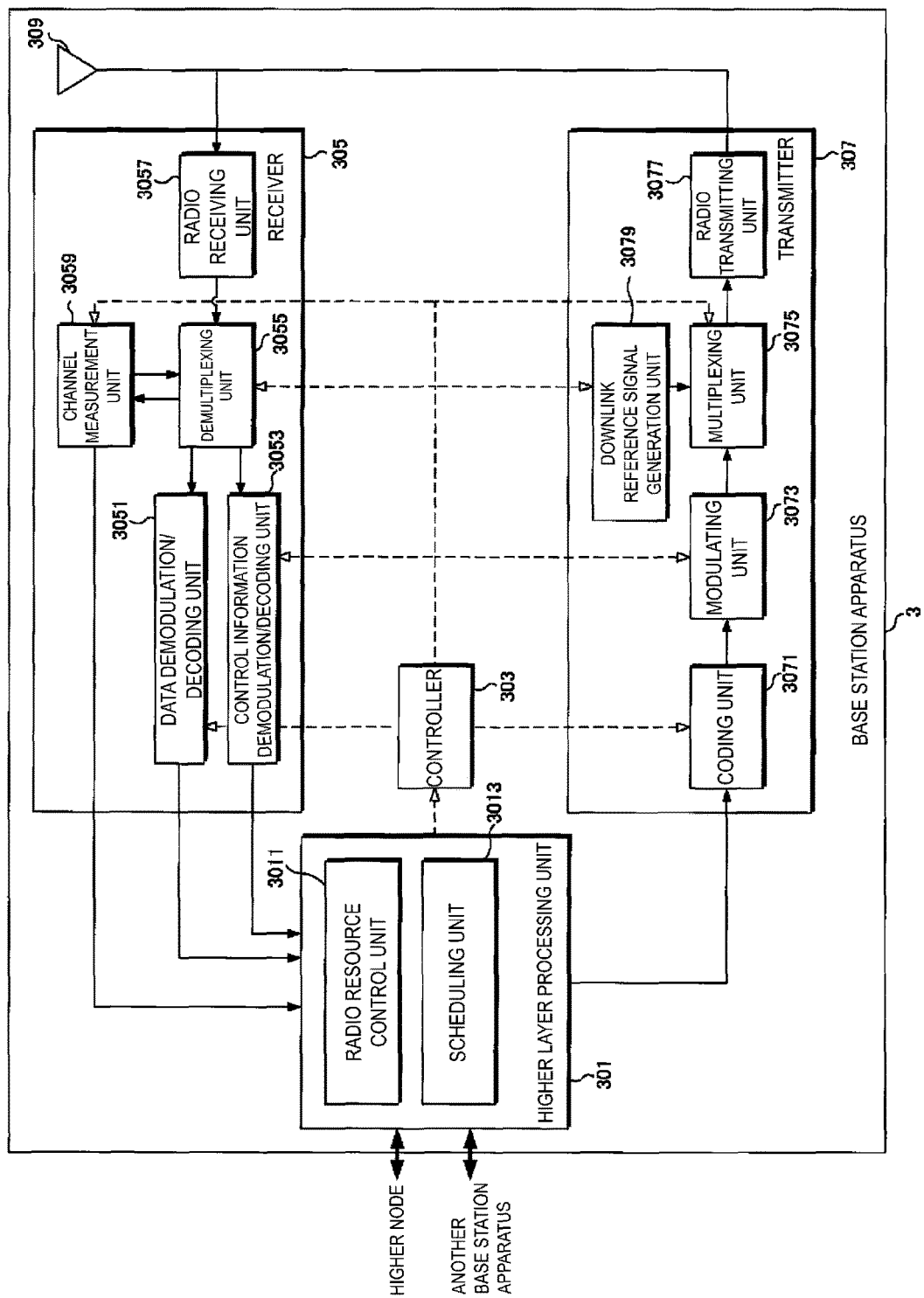
FIG. 21 is a schematic block diagram illustrating a configuration of a base station apparatus 3 according to the present embodiment.

FIG. 21 is a schematic block diagram illustrating a configuration of the base station apparatus 3 according to the present embodiment. As is illustrated, the base station apparatus 3 is configured to include a higher layer processing unit 301, a controller 303, a receiver 305, a transmitter 307, and a transmit and receive antenna 309. Furthermore, the higher layer processing unit 301 is configured to include a radio resource control unit 3011 and a scheduling unit 3013. Furthermore, the receiver 305 is configured to include a data demodulation/decoding unit 3051, a control information demodulation/decoding unit 3053, a demultiplexing unit 3055, a radio receiving unit 3057, and a channel measurement unit 3059. The transmitter 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates or acquires from a higher node, downlink data mapped to a shared channel of downlink, RRC signaling, and a MAC Control Element (CE), and outputs the downlink data, the RRC signaling, and the MAC CE to the a HARQ controller 3013. Furthermore, the radio resource control unit 3011 manages various configuration information for each of the terminal apparatuses 1. For example, the radio resource control unit 3011 manages a serving cell configured for the terminal apparatus 1, and the like.

The scheduling unit 3013 included in the higher layer processing unit 301 manages radio resources of shared channels and control channels allocated to the terminal apparatus 1. In a case that a radio resource of the shared channel is allocated to the terminal apparatus 1, the scheduling unit 3013 generates an uplink grant indicating the allocation of the radio resource of the shared channel and outputs the generated uplink grant to the transmitter 307.

The controller 303 generates a control signal for controlling the receiver 305 and the transmitter 307 based on the control information from the higher layer processing unit 301. The controller 303 outputs the generated control signal to the receiver 305 and the transmitter 307 to control the receiver 305 and the transmitter 307. Furthermore, the controller 303 may have a function of controlling transmit power. The controller 303 may output information related to the transmit power to the transmitter 307.

In accordance with the control signal input from the controller 303, the receiver 305 demultiplexes, demodulates, and decodes a reception signal received from the terminal apparatus 1 through the transmit and receive antenna 309, and outputs information resulting from the decoding to the higher layer processing unit 301.

The radio receiving unit 3057 orthogonally demodulates the uplink signal received via the transmit and receive antenna 309 and converts the orthogonally-demodulated analog signal into a digital signal. The radio receiving unit 3057 performs Fast Fourier Transform (FFT) on the digital signal, extracts a signal of the frequency domain, and outputs the resulting signal to the demultiplexing unit 3055.

The demultiplexing unit 1055 demultiplexes the signal input from the radio receiving unit 3057 into signals of the control channel, the shared channel, the reference signal channel, and the like. Note that the demultiplexing is performed based on radio resource allocation information that is determined in advance by the base station apparatus 3 using the radio resource control unit 3011 and that is included in the uplink grant notified to each of the terminal apparatuses 1. The demultiplexing unit 3055 performs channel compensation for the control channel and the shared channel from the channel estimate input from the channel measurement unit 3059. Furthermore, the demultiplexing unit 3055 outputs the demultiplexed reference signal channel to the channel measurement unit 3059.

The demultiplexing unit 3055 acquires a modulation symbol of the uplink data and a modulation symbol of the uplink control information (HARQ-ACK) from the control channel and the shared channel that are demultiplexed. The demultiplexing unit 3055 outputs the modulation symbol of the uplink data acquired from the shared channel signal to the data demodulation/decoding unit 3051. The demultiplexing unit 3055 outputs the modulation symbol of the uplink control information (HARQ-ACK) acquired from the control channel or the shared channel to the control information demodulation/decoding unit 3053.

The channel measurement unit 3059 measures the channel estimate, the channel quality, and the like, based on the uplink reference signal input from the demultiplexing unit 3055 and outputs the measurement result to the demultiplexing unit 3055 and the higher layer processing unit 301.

The data demodulation/decoding unit 3051 decodes the uplink data from the modulation symbol of the uplink data input from the demultiplexing unit 3055. The data demodulation/decoding unit 3051 outputs the decoded uplink data to the higher layer processing unit 301.

The control information demodulation/decoding unit 3053 decodes the HARQ-ACK from the modulation symbol of the HARQ-ACK input from the demultiplexing unit 3055. The control information demodulation/decoding unit 3053 outputs the decoded HARQ-ACK to the higher layer processing unit 301.

The transmitter 307 generates the downlink reference signal according to the control signal input from the controller 303, encodes and modulates the downlink control information and the downlink data that are input from the higher layer processing unit 301, multiplexes the control channel, the shared channel, and the reference signal channel, and transmits a signal resulting from the multiplexing to the terminal apparatus 1 through the transmit and receive antenna 309.

The coding unit 3071 encodes the downlink control information and the downlink data input from the higher layer processing unit 301. The modulation unit 3073 modulates the coded bits input from the coding unit 3071, in compliance with the modulation scheme such as BPSK, QPSK, 16 QAM, or 64 QAM. The modulation unit 3073 may apply precoding to the modulation symbol. The precoding may include a transmission precode. Note that precoding may be a multiplication (application) of a precoder.

The downlink reference signal generation unit 3079 generates a downlink reference signal. The multiplexing unit 3075 multiplexes the modulation symbol of each channel and the downlink reference signal and generates the transmission symbol.

The multiplexing unit 3075 may apply precoding to the transmission symbol. The precoding that the multiplexing unit 3075 applies to the transmission symbol may be applied to the downlink reference signal and/or the modulation symbol. The precoding applied to the downlink reference signal and the precoding applied to the modulation symbol may be the same or different.

The radio transmitting unit 3077 performs Inverse Fast Fourier Transform (IFFT) on the multiplexed transmission symbol and the like to generate a time symbol. The radio transmitting unit 3077 modulates the time symbol in compliance with an OFDM scheme, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, and generates a Carrier signal (Carrier, RF signal, or the like). The radio transmitting unit 3077 performs power amplification on the carrier signal and outputs the amplified signal to the transmit and receive antenna 309 for transmission.

Next, various aspects of the terminal apparatus and the base station apparatus according to the present embodiment will be described.

(1) To accomplish the object described above, aspects of the present invention are contrived to provide the following measures. Specifically, a first aspect of the present invention is a terminal apparatus including: a receiver 105 configured to receive a transport block in a PDCCH and a PDSCH scheduled by the PDCCH, and receive RRC information indicating a number of CBGs X; a controller 103 configured to determine transmit power for transmission of a PUCCH; and a transmitter 107 configured to transmit a HARQ-ACK corresponding to each of the X CBGs included in the transport block on the PUCCH, wherein the X is indicated by RRC information, and is a maximum number of CBGs per transport block, the transport block is segmented into $N_{CB}$ code blocks, a number of CBGs $N_{CBG\_ini}$ associated with a code block received in initial transmission of the transport block is given based on a smaller value of the X and the $N_{CB}$, a number of CBGs $N_{CBG\_re}$ associated with a code block received in retransmission of the transport block is given based on a field indicating retransmission information of CBGs included in the PDCCH, and transmit power for transmission of a PUCCH including a HARQ-ACK for retransmission of the transport block is given based on a number of CBGs $N_{CBG\_ini}$ associated with a code block received in initial transmission of a transport block.

(2) Further, a second aspect of the present invention is a base station apparatus including: a transmitter 307 configured to transmit a transport block in a PDCCH and a PDSCH scheduled by the PDCCH, and transmit RRC information indicating a number of CBGs X; and a receiver 305 configured to receive a HARQ-ACK corresponding to each of the X CBGs included in the transport block on the PUCCH, wherein the X is indicated by RRC information, and is a maximum number of CBGs per transport block, the transport block is segmented into $N_{CB}$ code blocks, a number of CBGs $N_{CBG\_ini}$ associated with a code block received in initial transmission of the transport block is given based on a smaller value of the X and the $N_{CB}$, a number of CBGs $N_{CBG\_re}$ associated with a code block received in retransmission of the transport block is given based on a field indicating retransmission information of CBGs included in the PDCCH, and transmit power for transmission of a PUCCH including a HARQ-ACK for retransmission of the transport block is given based on a number of CBGs $N_{CBG\_ini}$ associated with a code block received in initial transmission of a transport block.

(3) Further, a third aspect of the present invention is a terminal apparatus including: a receiver 105 configured to receive one or multiple transport blocks in a PDCCH and a PDSCH scheduled by the PDCCH in a serving cell, and receive RRC information indicating a maximum number of CBGs X in a transport block of the one or multiple transport blocks; and a transmitter 107 configured to transmit a HARQ-ACK corresponding to the PDSCH, wherein the transport block is segmented into multiple code blocks, CBGs are categorized into an empty CBG and a non-empty CBG, the empty CBG is a CBG including no code block, the non-empty CBG is a CBG including at least one code block, a CBG group includes more than one of the CBGs, in a case that all the CBGs included in the CBG group belong to the empty CBG, a NACK is generated for each of the CBGs belonging to the empty CBG, in a case that the CBG group includes at least one CBG of the CBGs belonging to the empty CBG and at least one CBG of the CBGs belonging to the non-empty CBG, a NACK is not generated for the at least one CBG of the CBGs belonging to the empty CBG, and HARQ-ACKs for CBGs corresponding to the CBG group are generated as one bundled HARQ-ACK.

(4) Further, a fourth aspect of the present invention is a base station apparatus including: a transmitter 307 configured to transmit one or multiple transport blocks in a PDCCH and a PDSCH scheduled by the PDCCH in a serving cell, and transmit RRC information indicating a maximum number of CBGs X in a transport block of the one or multiple transport blocks; and a receiver 305 configured to receive a HARQ-ACK corresponding to the PDSCH, wherein the transport block is segmented into multiple code blocks, CBGs are categorized into an empty CBG and a non-empty CBG, the empty CBG is a CBG including no code block, the non-empty CBG is a CBG including at least one code block, a CBG group includes more than one of the CBGs, in a case that all the CBGs included in the CBG group belong to the empty CBG, a NACK is generated for each of the CBGs belonging to the empty CBG, in a case that the CBG group includes at least one CBG of the CBGs belonging to the empty CBG and at least one CBG of the CBGs belonging to the non-empty CBG, a NACK is not generated for the at least one CBG of the CBGs belonging to the empty CBG, and HARQ-ACKs for CBGs corresponding to the CBG group are generated as one bundled HARQ-ACK.

(5) Further, a fifth aspect of the present invention is a terminal apparatus including: a receiver 105 configured to receive a transport block in a PDCCH and a PDSCH scheduled by the PDCCH, receive RRC information indicating a maximum number of CBGs X1, and receive RRC information indicating a maximum number of CBGs X2; and a transmitter 107 configured to transmit a HARQ-ACK of $N_{SIZE}$ bits corresponding to the PDSCH, wherein in a case that only one transport block is received, the maximum number of CBGs X1 is a maximum number of CBGs for a transport block, in a case that two transport blocks are received, the maximum number of CBGs X2 is a maximum number of CBGs for each transport block, and the $N_{SIZE}$ is given s a greater value of twice X2 and X1.

(6) Further, a sixth aspect of the present invention is a base station apparatus including: a transmitter 307 configured to transmit a transport block in a PDCCH and a PDSCH scheduled by the PDCCH, transmit RRC information indicating a maximum number of CBGs X1, and transmit RRC information indicating a maximum number of CBGs X2; and a receiver 305 configured to receive a HARQ-ACK of $N_{SIZE}$ bits corresponding to the PDSCH, wherein in a case that only one transport block is transmitted, the maximum number of CBGs X1 is a maximum number of CBGs for a transport block, in a case that two transport blocks are transmitted, the maximum number of CBGs X2 is a maximum number of CBGs for each transport block, and the $N_{SIZE}$ is given as a greater value of twice X2 and X1.

(7) Further, in the fifth aspect and the sixth aspect, in a case that the only one transport block is received and a maximum number of CBGs X1 is smaller than the $N_{SIZE}$, X1 HARQ-ACKs and ($N_{SIZE}$−X1) NACKs are generated as the HARQ-ACK.

(8) Further, in the fifth aspect and the sixth aspect, in a case that the two transport blocks are received and twice a maximum number of CBGs X2 is smaller than the $N_{SIZE}$, (2*X2) HARQ-ACKs and ($N_{SIZE}$−2*X2) NACKs are generated as the HARQ-ACK.

A program running on the terminal apparatus 1 and the base station apparatus 3 according to an aspect of the present invention may be a program that controls a Central Processing Unit (CPU) and the like (a program causing a computer to function) in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that a "computer system" mentioned here refers to a computer system built into the terminal apparatus 1 or the base station apparatus 3, and the computer system includes an OS and hardware components such as a peripheral apparatus. Furthermore, a "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the terminal apparatus 1 and the base station apparatus 3 according to the above-described embodiment may be achieved as an aggregation (apparatus group) including multiple apparatuses. Each of the apparatuses constituting such an apparatus group may include at least one of respective functions or functional blocks of the terminal apparatus 1 and the base station apparatus 3 according to the above-described embodiment. The apparatus group is required to have a complete set of functions or functional blocks of the terminal apparatus 1 and the base station apparatus 3. Furthermore, the terminal apparatus 1 and the base station apparatus 3 according to the above-described embodiment can also communicate with a base station apparatus as an aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have at least one of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
101 Higher layer processing unit
103 Controller
105 Receiver
107 Transmitter
109 Transmit and receive antenna
1011 Radio resource control unit
1013 Scheduling unit
1051 Decoding unit
1053 Demodulation unit
1055 Demultiplexing unit
1057 Radio receiving unit
1059 Channel measurement unit
1071 Coding unit
1073 Shared channel generation unit
1075 Control channel generation unit
1077 Multiplexing unit
1079 Radio transmitting unit
10711 Uplink reference signal generation unit
301 Higher layer processing unit
303 Controller
305 Receiver
307 Transmitter
309 Transmit and receive antenna
3000 Transmission process
3001 Coding processing unit
3002 Scrambling processing unit
3003 Modulation mapping processing unit
3004 Layer mapping processing unit
3005 Transmission precode processing unit
3006 Precode processing unit
3007 Resource element mapping processing unit
3008 Baseband signal generation processing unit
3011 Radio resource control unit
3013 Scheduling unit
3051 Data demodulation/decoding unit
3053 Control information demodulation/decoding unit
3055 Demultiplexing unit
3057 Radio receiving unit
3059 Channel measurement unit
3071 Coding unit
3073 Modulation unit
3075 Multiplexing unit
3077 Radio transmitting unit
3079 Downlink reference signal generation unit
401 Segmentation and CRC addition unit
4001 CRC addition unit
4002 Encoder unit
4003 Sub-block interleaver unit
4004 Bit collection unit
4005 Bit selection and pruning unit
4006 Concatenation unit
4011 Code block segmentation unit
4012 CRC addition unit

The invention claimed is:

1. A terminal apparatus comprising:
reception circuitry configured to receive one transport block by using a Physical Downlink Shared Channel (PDSCH), and receive Radio Resource Control (RRC) information indicating a maximum number X of Code Block Groups (CBGs) for the one transport block;
control circuitry configured to determine transmit power of a Physical Uplink Control Channel (PUCCH); and
transmission circuitry configured to transmit Uplink Control Information (UCI) on the PUCCH, the UCI including at least a Hybrid Automatic Repeat reQuest (HARQ)-acknowledgement (ACK) corresponding to the one transport block, wherein
the one transport block includes $N_{CB}$ code blocks,
the HARQ-ACK includes X HARQ-ACKs bits,
the control circuitry is further configured to
determine, in a case that a number of bits of the UCI does not exceed a prescribed number of bits, the transmit power of the PUCCH, based on at least a smaller value of the maximum number X and the $N_{CB}$, and
determine, in a case that the number of bits of the UCI exceeds the prescribed number of bits, the transmit power of the PUCCH, based on at least the number of bits of the UCI.

2. The terminal apparatus according to claim 1, wherein the number of bits of the UCI is based on at least the maximum number X.

3. A base station apparatus comprising:
transmission circuitry configured to transmit one transport block by using a Physical Downlink Shared Channel (PDSCH), and transmit Radio Resource Control (RRC) information indicating a maximum number X of Code Block Groups (CBGs) for the one transport block; and
reception circuitry configured to receive a Hybrid Automatic Repeat reQuest (HARQ)-acknowledgement (ACK) corresponding to the one transport block on a Physical Uplink Control Channel (PUCCH), wherein
the one transport block includes $N_{CB}$ code blocks,
the HARQ-ACK includes X HARQ-ACKs bits,
in a case that a number of bits of the UCI does not exceed a prescribed number of bits, the transmit power of the PUCCH including the UCI is given based on at least a smaller value of the maximum number X and the $N_{CB}$, and
in a case that the number of bits of the UCI exceeds the prescribed number of bits, the transmit power of the PUCCH is given based on at least the number of bits of the UCI.

4. The base station apparatus according to claim 3, wherein the number of bits of the UCI is based on at least the maximum number X.

5. A communication method for a terminal apparatus, the communication method comprising:
receiving one transport block by using a Physical Downlink Shared Channel (PDSCH); receiving Radio Resource Control (RRC) information indicating a maximum number X of Code Block Groups (CBGs) for the one transport block;
determining transmit power of a Physical Uplink Control Channel (PUCCH); and
transmitting Uplink Control Information (UCI) on the PUCCH, the UCI including at least a Hybrid Automatic Repeat reQuest (HARD)-acknowledgement (ACK) corresponding to the one transport block, wherein
the one transport block includes $N_{CB}$ code blocks,
the HARQ-ACK includes X HARQ-ACKs bits,
in a case that a number of bits of the UCI does not exceed a prescribed number of bits, the transmit power of the PUCCH is determined based on at least a smaller value of the maximum number X and the $N_{CB}$, and in a case that the number of bits of the UCI exceeds the prescribed number of bits, the transmit power of the PUCCH is determined based on at least the number of bits of the UCI.

6. A communication method for a base station apparatus, the communication method comprising:
transmitting one transport block by using a Physical Downlink Shared Channel (PDSCH);
transmitting Radio Resource Control (RRC) information indicating a maximum number X of Code Block Groups (CBGs) for the one transport block; and
receiving a Hybrid Automatic Repeat reQuest (HARQ)-acknowledgement (ACK) corresponding to the one transport block on a Physical Uplink Control Channel (PUCCH), wherein
the one transport block includes $N_{CB}$ code blocks,
the HARQ-ACK includes X HARQ-ACKs bits,
in a case that a number of bits of the UCI does not exceed a prescribed number of bits, the transmit power of the PUCCH including the UCI is given based on at least a smaller value of the maximum number X and the $N_{CB}$, and
in a case that the number of bits of the UCI exceeds the prescribed number of bits, the transmit power of the PUCCH is given based on at least the number of bits of the UCI.

* * * * *